(12) United States Patent
Salsbury et al.

(10) Patent No.: US 10,739,028 B2
(45) Date of Patent: Aug. 11, 2020

(54) THERMOSTAT WITH EFFICIENT WIRELESS DATA TRANSMISSION

(71) Applicant: Johnson Controls Technology Company, Plymouth, MI (US)

(72) Inventors: Timothy I. Salsbury, Mequon, WI (US); Carlos Felipe Alcala Perez, Milwaukee, WI (US); Homero L. Noboa, Waukesha, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 46 days.

(21) Appl. No.: 15/618,492

(22) Filed: Jun. 9, 2017

(65) Prior Publication Data

US 2018/0356111 A1 Dec. 13, 2018

(51) Int. Cl.
*F24F 11/00* (2018.01)
*F24F 11/30* (2018.01)
(Continued)

(52) U.S. Cl.
CPC .............. *F24F 11/30* (2018.01); *F24F 11/38* (2018.01); *F24F 11/62* (2018.01);
(Continued)

(58) Field of Classification Search
CPC ...... G05B 1/00; G05B 15/02; H05B 37/0272; F24F 11/30; F24F 11/62; F24F 11/56;
(Continued)

(56) References Cited

U.S. PATENT DOCUMENTS 3,763,490 A * 10/1973 Hadley ................ H01Q 3/2617
342/375
3,864,639 A * 2/1975 Musgrave ................ G01P 5/18
327/91

(Continued)

FOREIGN PATENT DOCUMENTS

GB 2540349 A * 1/2017 ......... G05D 23/1919
WO WO 2013/006219 1/2013
WO WO 2014/085137 6/2014

OTHER PUBLICATIONS

Salsbury et al., Method for Adaptive Adjustment of the Sample Rate in PRAC-PI Controllers, Oct. 12, 2012, 12 pages.
(Continued)

*Primary Examiner* — Larry L Furdge
*Assistant Examiner* — Kirstin U Oswald
(74) *Attorney, Agent, or Firm* — Foley & Lardner LLP

(57) ABSTRACT

A thermostat for transmitting data wirelessly to a controller in a building includes a temperature sensor, a processing circuit, and a wireless radio. The processing circuit is configured to receive a measured temperature value from the temperature sensor, determine a current temperature error based on the current measured temperature value and a setpoint temperature, and determine whether a difference between the current temperature error and a previous temperature error is greater than an error threshold. The processing circuit is configured to determine whether a minimum amount of time has passed since transmitting a previous measured temperature value and transmit the current measured temperature value to the controller via the wireless transmitter in response to determining that both the difference between the current temperature error and the previous temperature error is greater than the error threshold and the minimum amount of time has passed since transmitting a temperature value.

21 Claims, 42 Drawing Sheets

(51) Int. Cl.
*F24F 11/62* (2018.01)
*F24F 11/38* (2018.01)
*G05D 23/19* (2006.01)
*G08C 17/00* (2006.01)
*G08C 17/02* (2006.01)
*H04W 4/38* (2018.01)
*F24F 11/56* (2018.01)
*F24F 11/61* (2018.01)
*F24F 110/10* (2018.01)
*H04W 4/33* (2018.01)

(52) U.S. Cl.
CPC ......... *G05D 23/1905* (2013.01); *G08C 17/00* (2013.01); *G08C 17/02* (2013.01); *H04W 4/38* (2018.02); *F24F 11/56* (2018.01); *F24F 11/61* (2018.01); *F24F 2110/10* (2018.01); *H04W 4/33* (2018.02)

(58) Field of Classification Search
CPC ........ F24F 11/61; F24F 2110/10; F24F 11/38; G08C 17/02; G08C 17/00; H04W 4/33; H04W 4/38; G05D 23/1905
USPC .......................................................... 236/51
See application file for complete search history.

(56) References Cited

U.S. PATENT DOCUMENTS

| | | | | |
|---|---|---|---|---|
| 4,020,358 A * | 4/1977 | Wyland | G05D 23/1913 | 307/39 |
| 4,028,688 A * | 6/1977 | Goleman | F25D 29/008 | 340/539.26 |
| 4,110,632 A * | 8/1978 | Wyland | H02J 3/14 | 236/46 R |
| 4,150,415 A * | 4/1979 | Fichtner | H03K 17/94 | 307/129 |
| 4,228,511 A * | 10/1980 | Simcoe | G05D 23/1905 | 165/257 |
| 4,240,077 A * | 12/1980 | Hughes | G08B 17/06 | 165/253 |
| 4,356,961 A * | 11/1982 | Smith | G05D 23/1912 | 236/1 EA |
| 4,389,577 A * | 6/1983 | Anderson | G05D 23/1905 | 307/39 |
| 4,433,719 A * | 2/1984 | Cherry | G05D 23/275 | 165/265 |
| 4,557,317 A * | 12/1985 | Harmon, Jr. | G05D 23/1902 | 165/201 |
| 4,587,403 A * | 5/1986 | Shapess | G05D 23/1905 | 219/209 |
| 4,755,795 A | 7/1988 | Page | | |
| 4,776,179 A * | 10/1988 | Ta | B60H 1/00642 | 236/44 C |
| 4,860,950 A * | 8/1989 | Reeser | G05D 23/1905 | 236/51 |
| 4,948,045 A * | 8/1990 | Romano | G05D 23/1902 | 236/51 |
| 5,114,070 A * | 5/1992 | Lilja | F24F 11/76 | 236/49.3 |
| 5,115,968 A * | 5/1992 | Grald | G05D 23/1917 | 165/253 |
| 5,181,389 A * | 1/1993 | Hanson | B60H 1/00985 | 340/589 |
| 5,348,078 A * | 9/1994 | Dushane | F24F 3/044 | 165/209 |
| 5,355,305 A | 10/1994 | Seem et al. | | |
| 5,437,163 A * | 8/1995 | Jurewicz | B60H 1/3232 | 374/E1.003 |
| 5,460,006 A * | 10/1995 | Torimitsu | F25D 29/008 | 62/127 |
| 5,506,768 A | 4/1996 | Seem et al. | | |
| 5,595,342 A * | 1/1997 | McNair | G05D 23/1905 | 236/51 |
| 5,640,153 A * | 6/1997 | Hildebrand | F24F 11/006 | 340/3.9 |
| 5,651,264 A * | 7/1997 | Lo | F24F 3/065 | 62/230 |
| 5,761,083 A * | 6/1998 | Brown, Jr. | G05B 19/0421 | 700/296 |
| 5,977,957 A * | 11/1999 | Miller | G06F 1/32 | 345/174 |
| 6,061,604 A * | 5/2000 | Russ | G05B 19/0421 | 340/539.22 |
| 6,154,681 A * | 11/2000 | Drees | G05B 15/02 | 700/100 |
| 6,260,765 B1 * | 7/2001 | Natale | G05D 23/1905 | 236/47 |
| 6,349,883 B1 * | 2/2002 | Simmons | F24F 11/30 | 236/46 R |
| 6,378,315 B1 * | 4/2002 | Gelber | F25D 29/00 | 62/80 |
| 6,414,866 B2 * | 7/2002 | Huggett | H02M 1/15 | 363/124 |
| 6,513,723 B1 * | 2/2003 | Mueller | F23N 5/022 | 236/46 R |
| 6,937,909 B2 * | 8/2005 | Seem | G05B 11/42 | 318/609 |
| 7,024,336 B2 * | 4/2006 | Salsbury | F24F 11/30 | 702/182 |
| 7,145,322 B2 * | 12/2006 | Solveson | G01R 15/183 | 324/127 |
| 7,289,936 B2 | 10/2007 | Singhal et al. | | |
| 7,454,269 B1 * | 11/2008 | Dushane | G05D 23/1902 | 700/276 |
| 7,505,877 B2 | 3/2009 | Salsbury | | |
| 7,522,071 B2 | 4/2009 | Caselli et al. | | |
| 7,537,171 B2 | 5/2009 | Mueller et al. | | |
| 7,809,472 B1 * | 10/2010 | Silva | F24F 3/065 | 700/277 |
| 7,827,813 B2 | 11/2010 | Seem | | |
| 8,022,822 B2 * | 9/2011 | Liang | H04L 45/48 | 340/539.1 |
| 8,096,140 B2 | 1/2012 | Seem | | |
| 8,306,669 B1 * | 11/2012 | Smith | F24H 9/2071 | 700/286 |
| 8,376,242 B1 * | 2/2013 | Uselton | G05D 23/1905 | 236/51 |
| 8,446,530 B2 | 5/2013 | Bellers | | |
| 8,473,080 B2 * | 6/2013 | Seem | F25B 49/027 | 700/28 |
| 8,495,888 B2 * | 7/2013 | Seem | F24F 11/0001 | 62/186 |
| 8,620,628 B2 | 12/2013 | Yu et al. | | |
| 8,797,199 B1 * | 8/2014 | Goodnow | G05B 19/042 | 341/142 |
| 8,971,173 B1 | 3/2015 | Choudhury et al. | | |
| 9,225,793 B2 * | 12/2015 | Dutta | H04L 67/12 | |
| 9,395,708 B2 * | 7/2016 | Perez | G05B 13/042 | |
| 9,644,856 B1 * | 5/2017 | Francis | G05B 15/02 | |
| 2001/0038316 A1 * | 11/2001 | Kondoh | G05B 5/01 | 331/17 |
| 2002/0012323 A1 * | 1/2002 | Petite | G01D 4/004 | 370/252 |
| 2002/0019712 A1 * | 2/2002 | Petite | G08C 17/02 | 702/61 |
| 2002/0019725 A1 | 2/2002 | Petite | | |
| 2003/0034898 A1 * | 2/2003 | Shamoon | G08C 17/02 | 340/12.22 |
| 2003/0040279 A1 * | 2/2003 | Ballweg | G05D 23/1905 | 455/66.1 |
| 2003/0066897 A1 * | 4/2003 | Carner | G05D 23/1905 | 236/51 |
| 2003/0073461 A1 * | 4/2003 | Sinclair | H05B 47/12 | 455/557 |
| 2003/0227220 A1 * | 12/2003 | Biskup, Jr. | G05D 23/1905 | 307/116 |

(56) References Cited

U.S. PATENT DOCUMENTS

| | | | |
|---|---|---|---|
| 2004/0064203 A1* | 4/2004 | Bornside | G05B 7/02 700/78 |
| 2004/0064204 A1* | 4/2004 | Frutiger | G05B 11/42 700/78 |
| 2005/0077365 A1* | 4/2005 | DeLuca | F23N 5/203 236/46 R |
| 2005/0221514 A1 | 10/2005 | Pasadyn et al. | |
| 2006/0071087 A1* | 4/2006 | Kates | G05D 23/1905 236/1 B |
| 2006/0097063 A1* | 5/2006 | Zeevi | F24F 11/30 236/49.3 |
| 2007/0070888 A1 | 3/2007 | Raman et al. | |
| 2007/0119958 A1* | 5/2007 | Kates | F24F 3/044 236/1 B |
| 2007/0228183 A1* | 10/2007 | Kennedy | F24F 11/30 236/1 C |
| 2007/0258508 A1 | 11/2007 | Werb et al. | |
| 2008/0082180 A1* | 4/2008 | Blevins | G05B 11/42 700/29 |
| 2008/0083234 A1* | 4/2008 | Krebs | G05D 23/1932 62/129 |
| 2008/0083834 A1* | 4/2008 | Krebs | B60H 1/00892 237/2 A |
| 2008/0099570 A1* | 5/2008 | Krebs | F23N 5/203 236/46 R |
| 2009/0001181 A1* | 1/2009 | Siddaramanna | F24F 11/30 236/46 R |
| 2009/0065595 A1* | 3/2009 | Kates | F24F 3/0442 236/49.3 |
| 2009/0216379 A1* | 8/2009 | Smith | G05D 23/1919 700/275 |
| 2009/0216382 A1* | 8/2009 | Ng | F24F 11/30 700/278 |
| 2010/0070086 A1* | 3/2010 | Harrod | G05B 19/042 700/276 |
| 2010/0070088 A1* | 3/2010 | Josserand | F24F 11/30 700/277 |
| 2010/0106309 A1* | 4/2010 | Grohman | G05D 27/02 700/276 |
| 2010/0125368 A1* | 5/2010 | Bailey | F25B 49/02 700/276 |
| 2010/0125369 A1* | 5/2010 | Douglas | F25B 47/02 700/276 |
| 2010/0163634 A1* | 7/2010 | Klein | F24D 19/1048 236/94 |
| 2010/0204808 A1 | 8/2010 | Thiele | |
| 2011/0013516 A1 | 1/2011 | Black et al. | |
| 2012/0072032 A1* | 3/2012 | Powell | F24F 11/30 700/278 |
| 2012/0170639 A1 | 7/2012 | Salsbury | |
| 2012/0221150 A1* | 8/2012 | Arensmeier | G05B 23/0224 700/276 |
| 2012/0271460 A1* | 10/2012 | Rognli | G05D 23/1934 700/276 |
| 2012/0273581 A1* | 11/2012 | Kolk | G05D 23/1905 236/91 D |
| 2012/0305661 A1* | 12/2012 | Malchiondo | F24F 11/30 236/44 A |
| 2013/0015955 A1 | 1/2013 | Luong | |
| 2013/0066474 A1* | 3/2013 | Coogan | G05D 23/1905 700/278 |
| 2013/0073094 A1* | 3/2013 | Knapton | G05B 13/02 700/278 |
| 2013/0154810 A1* | 6/2013 | Ferren | G06F 3/0383 340/12.3 |
| 2013/0197676 A1 | 8/2013 | Salsbury et al. | |
| 2013/0221117 A1* | 8/2013 | Warren | G05D 23/19 236/1 C |
| 2013/0346460 A1* | 12/2013 | Bruneau | G05B 11/42 708/300 |
| 2014/0096946 A1* | 4/2014 | Rognli | F24D 19/1084 165/209 |
| 2014/0101420 A1* | 4/2014 | Wu | G06F 1/3206 713/1 |
| 2014/0135998 A1* | 5/2014 | Cao | G05D 23/1934 700/278 |
| 2014/0215642 A1 | 7/2014 | Huxham | |
| 2014/0257528 A1* | 9/2014 | Perez | G05B 13/042 700/46 |
| 2014/0297210 A1* | 10/2014 | Kamel | H02J 13/0006 702/62 |
| 2014/0301406 A1 | 10/2014 | Le Tutour | |
| 2014/0312127 A1* | 10/2014 | Rylski | G05D 23/1905 236/51 |
| 2014/0313032 A1* | 10/2014 | Sager | G06F 3/04842 340/539.17 |
| 2014/0316743 A1 | 10/2014 | Drees et al. | |
| 2015/0127173 A1* | 5/2015 | Chinnaiyan | F24F 11/30 700/276 |
| 2015/0167996 A1* | 6/2015 | Fadell | F24F 11/62 700/276 |
| 2015/0167999 A1* | 6/2015 | Seem | F24F 11/30 700/276 |
| 2015/0211779 A1* | 7/2015 | Brandt | F25D 21/006 62/80 |
| 2015/0293508 A1 | 10/2015 | Piaskowski et al. | |
| 2015/0316907 A1* | 11/2015 | Elbsat | G05B 19/418 700/275 |
| 2015/0327010 A1* | 11/2015 | Gottschalk | G05B 15/02 455/456.1 |
| 2015/0369508 A1* | 12/2015 | Rosen | F24D 19/1084 165/237 |
| 2016/0003493 A1* | 1/2016 | Katz | F24F 11/30 700/275 |
| 2016/0098020 A1* | 4/2016 | Salsbury | G05B 11/42 700/32 |
| 2016/0116178 A1* | 4/2016 | Vega | F24F 11/52 700/276 |
| 2016/0150350 A1* | 5/2016 | Ingale | H04W 4/70 370/255 |
| 2016/0201933 A1* | 7/2016 | Hester | F24D 19/1084 700/276 |
| 2016/0231755 A1* | 8/2016 | Ajax | G05B 15/02 |
| 2017/0023272 A1 | 1/2017 | Erickson et al. | |
| 2017/0031334 A1* | 2/2017 | Medelius | G05D 23/1905 |
| 2017/0053068 A1* | 2/2017 | Pillai | G06Q 50/10 |
| 2017/0118067 A1 | 4/2017 | Vedula | |
| 2017/0180395 A1 | 6/2017 | Stransky-Heilkron | |
| 2017/0293293 A1 | 10/2017 | Brownie et al. | |
| 2018/0253569 A1 | 9/2018 | Swierk et al. | |

OTHER PUBLICATIONS

Seem, A New Pattern Recognition Adaptive Controller with Application to HVAC Systems, 1998, 14 pages.

Swan, The Language of BACnet-Objects, Properties and Services, http://www.bacnet.org/Bibliography/ES-7-96/ES-7-96.htm, retrieved on Apr. 21, 2017, 11 pages.

Vasyutynskyy et al., A Comparative Study of PID Control Algorithms Adapted to Send-on-Delta Sampling, 2010, 18 pages.

Search Report and Written Opinion for International Application No. PCT/US2017/012399, dated Mar. 27, 2017, 14 pages.

\* cited by examiner

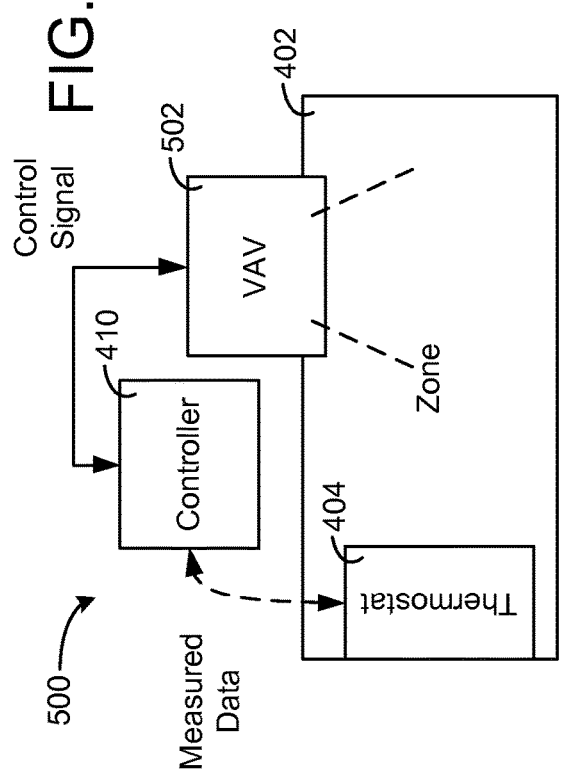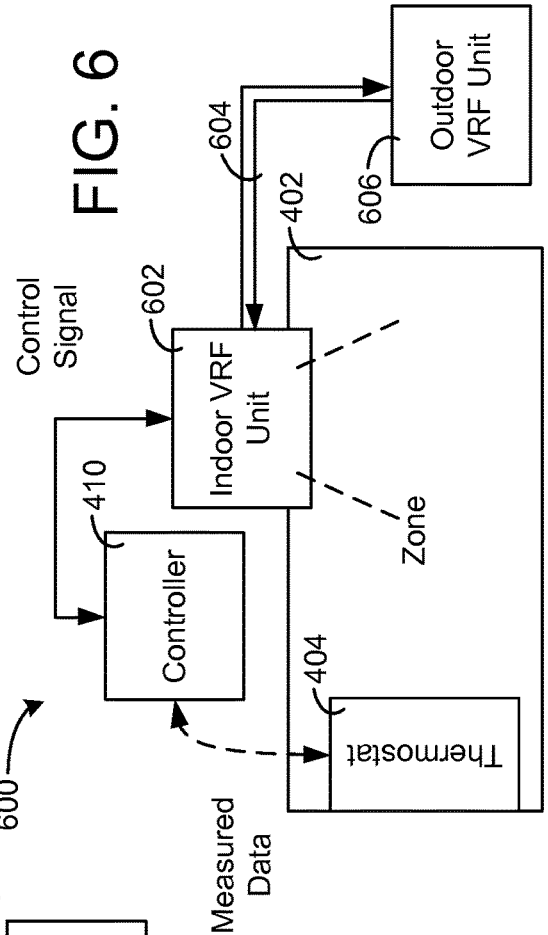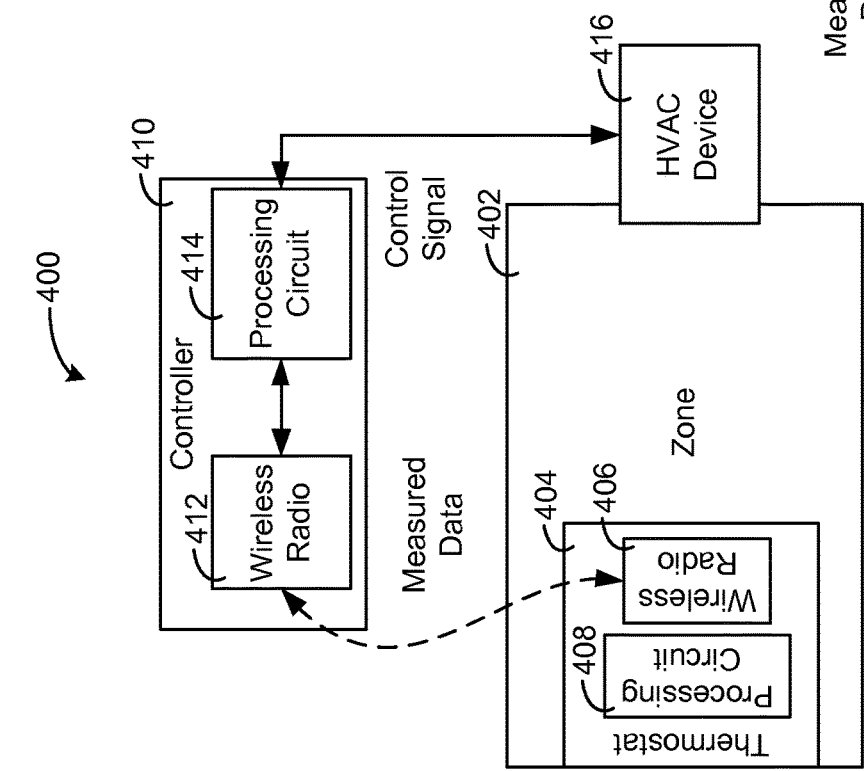

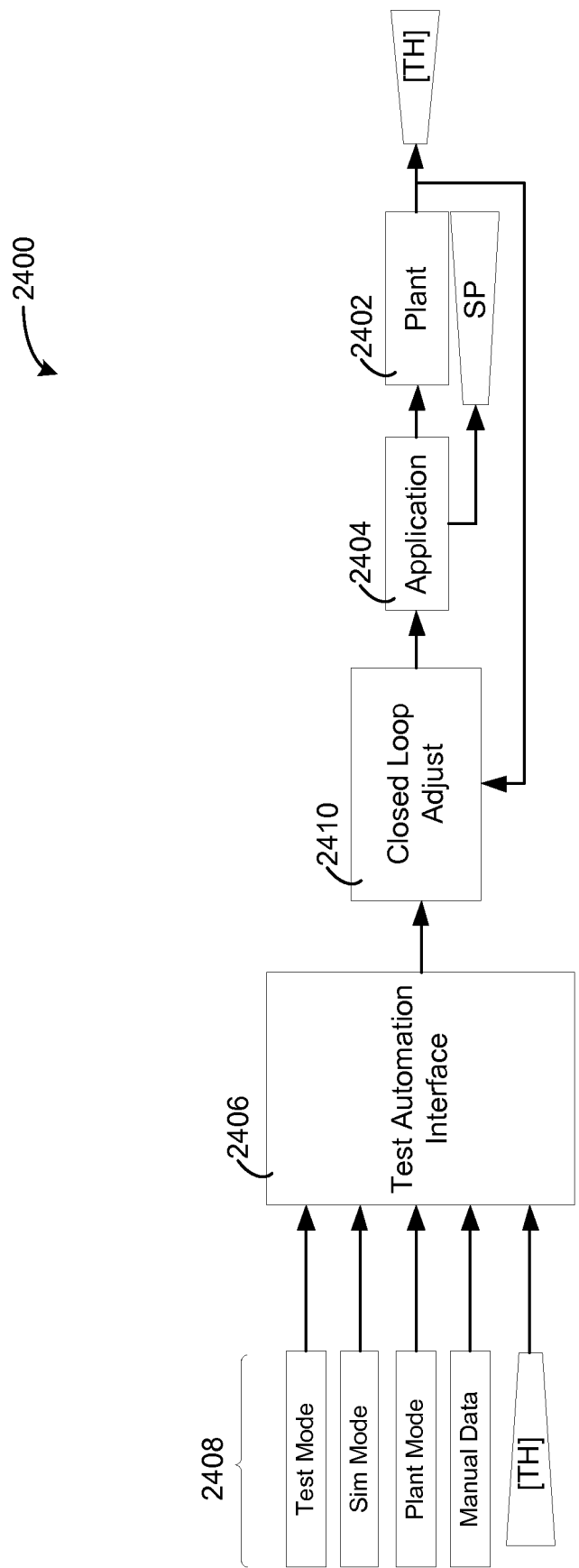

US 10,739,028 B2

THERMOSTAT WITH EFFICIENT WIRELESS DATA TRANSMISSION

BACKGROUND

The present disclosure relates generally to a thermostat for a building space. The present disclosure relates more particularly to a thermostat that communicates using wireless data transmission.

In many building systems, thermostats must communicate setpoints, temperatures, and other data to other devices, such as equipment controllers, in a building. Some thermostats utilize wireless radios to perform this communication of data. Thermostats that have wireless radios can connect to various networks or other devices via their wireless radios. These thermostats may not rely on wired means for communication. While thermostats with wireless radios may not require physical wires to communicate with other devices, the thermostat may use an increased amount of power due to wireless transmissions of the wireless radio.

In some cases, wireless thermostats are battery powered. Thermostats that are battery powered may require their batteries to be replaced periodically. A wireless radio of a wireless thermostat may have a large power draw and may be largely responsible for the depletion of the batteries of the wireless thermostat as compared to other power drawing components of the thermostat. For this reason, batteries of a wireless thermostat may need to be replaced frequently. Further, as the batteries of the wireless thermostat deplete, the wireless range of the wireless radio may also decrease, affecting the performance of the wireless radio and potentially affecting conditioning of a building.

SUMMARY

One implementation of the present disclosure is a thermostat for transmitting data wirelessly to a controller in a building. The thermostat includes a temperature sensor configured to measure a current temperature value of the building, a wireless radio configured to transmit data from the thermostat to the controller, and a processing circuit. The processing circuit is configured to receive a measured temperature value of the building from the temperature sensor, determine a current temperature error based on the current measured temperature value and a setpoint temperature, and determine whether a difference between the current temperature error and a previous temperature error is greater than an error threshold. The processing circuit is configured to determine whether a minimum amount of time has passed since transmitting a previous measured temperature value to the controller and transmit the current measured temperature value to the controller via the wireless transmitter in response to determining that both the difference between the current temperature error and the previous temperature error is greater than the error threshold and the minimum amount of time has passed since transmitting a temperature value to the controller.

In some embodiments, the processing circuit is configured to determine whether a maximum amount of time has passed since transmitting the temperature value to the controller and transmit the current measured temperature value to the controller via the wireless transmitter in response to determining that the maximum amount of time has passed.

In some embodiments, the temperature value transmitted by the wireless radio is a filtered temperature value that is a filtered version of the current measured temperature value. The processing circuit can be configured to determine the filtered temperature value based on the current measured temperature value and a deadband filter and transmit the filtered temperature value to the controller via the wireless transmitter.

In some embodiments, the processing circuit is configured to determine the filtered temperature value based on the current measured temperature value and the deadband filter by setting the filtered temperature value equal to the setpoint temperature in response to determining that the current measured temperature value is within a temperature band. In some embodiments, the temperature band includes temperature values between the setpoint temperature plus half a deadband threshold and the setpoint temperature minus half the deadband threshold. The processing circuit can be configured to determine the filtered temperature value based on the current measured temperature value and the deadband filter by setting the filtered temperature value equal to a shifted temperature value in response to determining that the current measured temperature value is not within the temperature band.

In some embodiments, the processing circuit is configured to determine the shifted temperature value by subtracting half the deadband threshold from the current measured temperature value if the current measured temperature value is greater than a maximum of the temperature band. In some embodiments, the processing circuit is configured to determine the shifted temperature value by adding half the deadband threshold to the current measured temperature value if the current measured temperature value is less than a minimum of the temperature band.

In some embodiments, the processing circuit is configured to cause the wireless radio to operate in an operating power mode in response to determining that the measured temperature value should be sent to the controller and cause the wireless radio to operate in a low power mode after transmitting the measured temperature value to the controller.

In some embodiments, the processing circuit is configured to filter the current measured temperature value with a deadband filter and use the filtered current measured temperature value to determine a filtered current temperature error based on the filtered current measured temperature value and a setpoint temperature and determine whether a difference between the filtered current temperature error and a previous filtered temperature error is greater than the error threshold. In some embodiments, the processing circuit is configured to transmit the filtered current measured temperature value to the controller via the wireless radio in response to determining that both a difference between the filtered current temperature error and the previous filtered temperature error is greater than the error threshold and the minimum amount of time has passed since transmitting the temperature value to the controller.

Another implementation of the present disclosure is a method for efficiently transmitting data wirelessly to a controller in a building. The method includes receiving, by the thermostat, a current measured temperature value of the building from a temperature sensor, determining, by the thermostat, a current temperature error based on the current measured temperature value and a setpoint temperature, determining, by the thermostat, whether a difference between the current temperature error and a previous temperature error is greater than an error threshold, and determining, by the thermostat, whether a minimum amount of time has passed since transmitting a previous temperature value to the controller. The method further includes transmitting, by the thermostat, the measured temperature value to the controller via a wireless radio in response to determining, by the thermostat, that both the difference between the current temperature error and the previous temperature error is greater than the error threshold and the minimum amount of time has passed since transmitting a temperature value to the controller.

In some embodiments, the method further includes determining, by the thermostat, whether a maximum amount of time has passed since transmitting the temperature value to the controller and transmitting the current measured temperature value to the controller via the wireless radio in response to determining that the maximum amount of time has passed.

In some embodiments, the method further includes determining, by the thermostat, a filtered temperature value based on the current measured temperature value and a deadband filter, and transmitting, by the thermostat, the filtered temperature value to the controller via the wireless radio. In some embodiments, the temperature value transmitted by the wireless radio is the filtered temperature value that is a filtered version of the current measured temperature value In some embodiments, the method includes determining, by the thermostat, the filtered temperature value based on the current measured temperature value and the deadband filter includes setting, by the thermostat, the filtered temperature value equal to the setpoint temperature in response to determining that the current measured temperature value is within a temperature band. In some embodiments, the temperature band includes temperature values between the setpoint temperature plus half a deadband threshold and the setpoint temperature minus half the deadband threshold. In some embodiments, the method includes determining, by the thermostat, the filtered temperature value based on the current measured temperature value and half the deadband filter. In some embodiments, the method includes setting, by the thermostat, the filtered temperature value equal to a shifted temperature value in response to determining that the current measured temperature value is not within the temperature band.

In some embodiments, the method includes determining, by the thermostat, the shifted temperature value by subtracting, by the thermostat, half the deadband threshold from the current measured temperature value if the current measured temperature value is greater than a maximum of the temperature band or adding, by the thermostat, half the deadband threshold to the current measured temperature value if the current measured temperature value is less than a minimum of the temperature band.

In some embodiments, the method includes causing, by the thermostat, the wireless radio to operate in an operating power mode in response to determining that the measured temperature value should be sent to the controller and causing, by the thermostat, the wireless radio to operate in a low power mode after transmitting the measured temperature value to the controller.

In some embodiments, the method further filtering, by the thermostat, the current measured temperature with a deadband filter. In some embodiments, the method further includes using, by the thermostat, the filtered current measured temperature to determine a filtered current temperature error based on the filtered current measured temperature value and the setpoint temperature and determine whether a difference between the filtered current temperature error and a previous filtered temperature error is greater than the error threshold. In some embodiments, the method further includes transmitting, by the thermostat, the filtered current measured temperature value to the controller via the wireless radio in response to determining, by the thermostat, that both a difference between the filtered current temperature error and the previous temperature error is greater than the error threshold and the minimum amount of time has passed since transmitting the temperature value to the controller.

In some embodiments, the transmitted temperature is an unfiltered temperature value. In some embodiments, the method further includes filtering, by the controller, the unfiltered temperature value with a deadband filter and controlling, by the controller, an HVAC device to affect a change in temperature of the building based on the filtered temperature and a control method. In some embodiments, an execution time of the control method is longer than a rate at which the processing circuit of the thermostat receives a measured temperature of the building from the temperature sensor.

Another implementation of the present disclosure is a system for transmitting data wirelessly in a building, the system includes a thermostat and a controller. The thermostat includes a temperature sensor configured to measure a current temperature value of the building, a wireless radio configured to transmit data from the thermostat to the controller, and a processing circuit. The processing circuit is configured to receive a measured temperature value of the building from the temperature sensor, determine whether a difference between the current temperature value and a previous temperature is greater than a threshold, determine whether a minimum amount of time has passed since transmitting a temperature value to the controller, and transmit the current temperature value to the controller via the wireless transmitter. The processing circuit is configured to transmit the current temperature value to the controller via the wireless radio in response to determining that both the difference between the current temperature value and the previous temperature is greater than the threshold and the minimum amount of time has passed since transmitting the temperature value to the controller. The processing circuit is further configured to determine whether a maximum amount of time has passed since transmitting the temperature value to the controller. The processing circuit is configured to transmit the current measured temperature value to the controller via the wireless radio in response to determining that the maximum amount of time has passed.

In some embodiments, the temperature value transmitted by the wireless radio is a filtered temperature value that is a filtered version of the current measured temperature value. In some embodiments, the processing circuit of the thermostat is configured to determine the filtered temperature value based on the current measured temperature value and a deadband filter by setting the filtered temperature value equal to the setpoint temperature in response to determining that the current measured temperature value is within a temperature band and setting the filtered temperature value equal to a shifted temperature value in response to determining that the current measured temperature value is not within the temperature band. In some embodiment, the temperature band includes temperature values between the setpoint plus half a deadband threshold and the setpoint minus half the deadband threshold. In some embodiments, the processing circuit is configured to transmit the filtered temperature value to the controller via the wireless transmitter.

In some embodiments, the processing circuit of the thermostat is configured to determine the shifted temperature value by subtracting half the deadband threshold from the current measured temperature value if the current measured temperature value is greater than a maximum of the temperature band or adding half the deadband threshold to the current measured temperature value if the current measured temperature value is less than a minimum of the temperature band.

In some embodiments, the processing circuit of the thermostat is configured to cause the wireless radio to operate in an operating power mode in response to determining that the measured temperature value should be sent to the controller and cause the wireless radio to operate in a low power mode after transmitting the measured temperature value to the controller.

In some embodiments, the transmitted measured temperature is an unfiltered temperature value. In some embodiments, the controller includes a processing circuit configured to filter the unfiltered temperature value with a deadband filter and control an HVAC device to affect a change in temperature of the building based on the filtered temperature and a control method. In some embodiments, a rate at which the control method executes is longer than a rate at which the processing circuit of the thermostat receives a measured temperature of the building from the temperature sensor.

In some embodiments, a thermostat for transmitting data wirelessly to a controller in a building includes a temperature sensor configured to measure a temperature of the building, a wireless radio configured to transmit data from the thermostat to the controller, and a processing circuit. The processing circuit can be configured to receive a measured temperature of the building from the temperature sensor, determine whether the difference of the temperature value and a previously measured temperature value is greater than a predefined amount, and determine whether a minimum amount of time has passed since transmitting any measured temperature value to the controller. In some embodiments, the processing circuit is configured to transmit the measured temperature value to the controller via the wireless transmitter in response to determining that both the difference of the measured temperature error and the previously measured temperature value is greater than a predefined amount and the period of time is greater than a minimum amount of time. The processing circuit can be configured to determine whether a maximum amount of time has passed since transmitting any measured temperature value to the controller and transmit the measured temperature value to the controller via the wireless transmitter in response to determining that the maximum amount of time has passed.

BRIEF DESCRIPTION OF THE DRAWINGS

FIG. 4 is a block diagram of a thermostat communicating wirelessly to a controller, according to an exemplary embodiment.

FIG. 5 is a block diagram of the thermostat of FIG. 4 communicating to the controller of FIG. 4 to control a variable air volume (VAV) device, according to an exemplary embodiment.

FIG. 6 is a block diagram of the thermostat of FIG. 4 communicating to the controller of FIG. 4 to control a variable refrigerant flow (VRF) device, according to an exemplary embodiment.

FIG. 24 is a block diagram of a model for simulating proportional and one-stage systems with various transmission methods, according to an exemplary embodiment.

DETAILED DESCRIPTION

Overview

Figure 1:
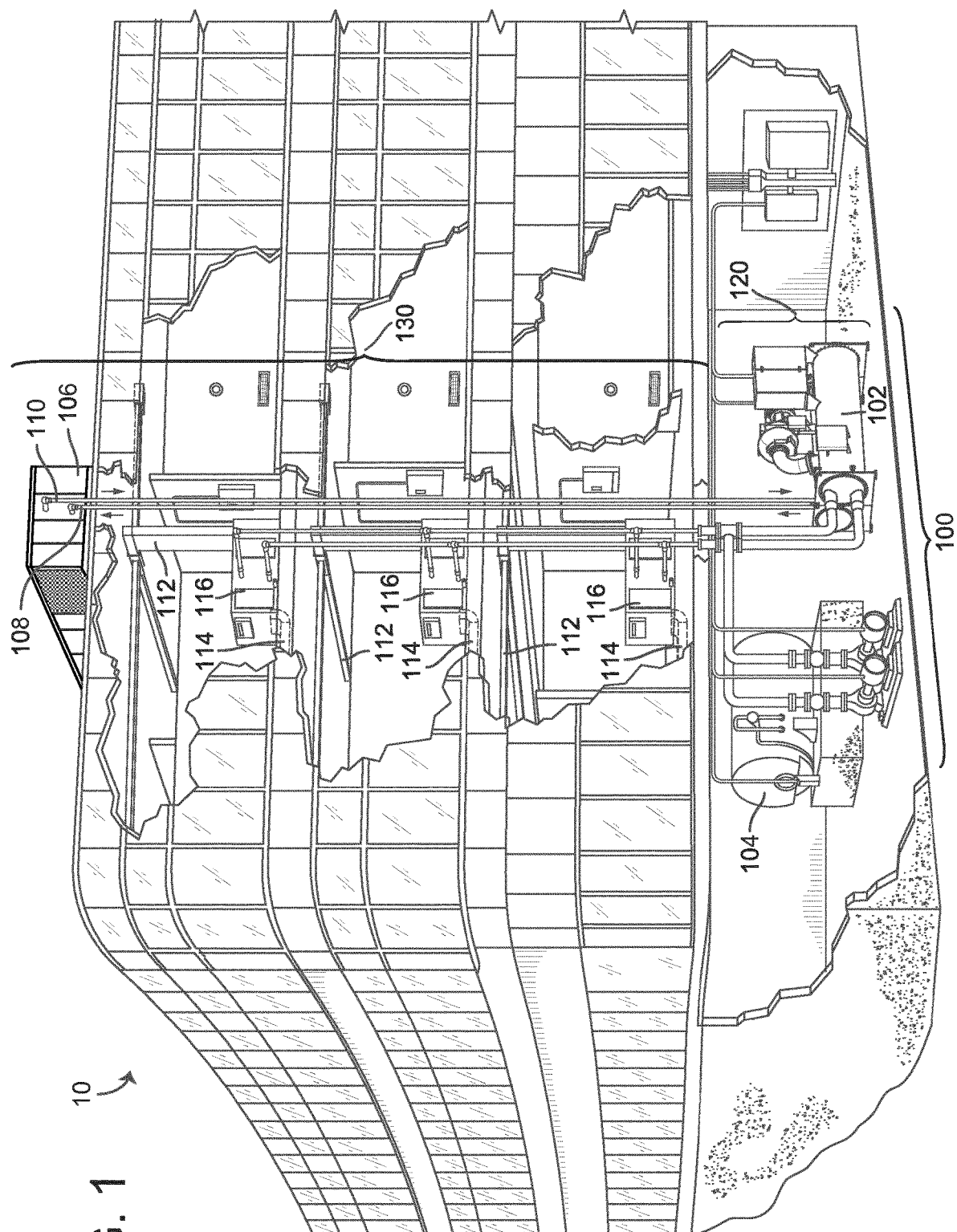
FIG. 1 is a drawing of a building equipped with a HVAC system, according to an exemplary embodiment.

Referring generally to the FIGURES, a thermostat with efficient data transmission is shown, according to various exemplary embodiments. The thermostat described herein is a wireless thermostat, a thermostat that communicates via a wireless radio. Various thermostats and efficient data transmission methods are described in U.S. application Ser. No. 10/217,655 filed Aug. 13, 2002 and U.S. patent application Ser. No. 10/990,897 (now U.S. Pat. No. 7,537,171) filed May 26, 2009, the entireties of which are incorporated by reference herein. Using a wireless thermostat may be optimal due to easy installation and flexibility in re-configuring spaces. In various embodiments, the thermostat is battery powered and uses batteries to power a processing circuit of the thermostat in addition to the wireless radio. The wireless radio depletes the charge stored by the battery and can be largely responsible for requiring a user to replace the batteries of the thermostat and thus results in higher maintenance costs. In various embodiments, the thermostat must wirelessly transmit a measured temperature value to a controller to cause the controller to control HVAC equipment to cause an environmental change in a building. Causing the environmental change may include causing the ambient temperature of the building to be equal to and/or approach a setpoint temperature.

A method, referred to herein as a send-on-delta (SOD) method, can be used by the processing circuit of the wireless radio to minimize depletion of the battery of the thermostat. By using the SOD method described herein, the thermostat can be configured to cause the wireless radio to transmit data efficiently, i.e., only when necessary. For example, one embodiment of the SOD method may be transmitting a measured temperature value whenever a temperature error (e.g., difference of the measured temperature and the setpoint) minus a previous error of a previous measurement cycle of the thermostat, is greater than a predefined amount and a predefined amount of time has passed since transmitting any temperature measurement to a controller. By using the SOD method, the thermostat may minimize the number of times that the thermostat needs to transmit data in a period of time. Further, the thermostat can keep the wireless radio in a low power mode when no transmissions are necessary and wake up the wireless radio and cause the wireless radio to operate in an operating power mode whenever the SOD method determines a temperature value should be transmitted to the controller.

In addition to the SOD method described herein, the thermostat may utilize a deadband filter. The deadband filter may be a filter that takes a temperature input and generates a temperature output. The temperature output may be equal to a setpoint value if the temperature input is within a range of temperature values. If the input temperature is outside the range of temperatures, the output of the deadband filter may be a shifted version of the input temperature, a version that is closer to the setpoint temperature. The deadband filter eliminates potential cycling and instability that can occur with the SOD method and also allows a control (e.g., PI, PID PRAC-PI, etc.) to operate in its normal manner, i.e., the control uses a fixed sample period. The deadband filter may prevent integration problems that may occur when using the SOD method. An integration problem may be understood based on the following example.

A thermostat using the SOD method described herein may transmit a measured temperature of a zone to a controller. The transmitted temperature may be 73 degrees Fahrenheit. The setpoint for the building may be 70 degrees Fahrenheit. The controller can determine that there is a 3 degrees Fahrenheit error in temperature (i.e., a 3 degree difference between the measured temperature and the setpoint) and operate HVAC equipment in the building to drive the ambient temperature of the building down. Because the SOD method may not frequently transmit temperature to the controller, the controller may continue to use the most recent transmittal, 73 degrees Fahrenheit, and continue to operate using a temperature error of 3 degrees. However, the ambient temperature of the building may actually be at the setpoint, or may even be lower since the controller is controlling the HVAC equipment to lower the ambient temperature of the zone.

In some embodiments, by using the SOD method with a deadband filter, at least two improvements to the thermostat can be realized. One improvement may be that the thermostat minimizes power draw of a battery or other power source by only transmitting temperature values to the controller when necessary. The other improvement may be preventing the controlling from improperly integrating the error of temperature values received by the thermostat via a deadband filter. In various embodiments, one or both of the thermostat and the controller can implement the deadband filter and prevent the thermostat from improperly integrating any temperature error.

Another potential approach for minimizing battery drain of the wireless thermostat, aside from the method, is to slow the transmission of data to an established periodic rate. In this approach, the transmission rate would still need to be fast enough to capture the dynamic response of the system under control and would require knowledge of how the system performs (e.g., the system dynamics). Assuming that a rate fast enough to capture the dynamic response of the system under control was used, the period may still be long enough to lead to poor control by the controller due to long amounts of time between receiving, by the controller, temperature values from the thermostat.

As an example, a room might be subjected to a rapid change in load conditions when a large number of occupants enter or leave the space i.e., the ambient temperature of the room may rapidly change. A controller associated with the room may not be able to react appropriately to the changes in the temperature conditions until a new temperature value (e.g., a temperature value representative of the rapid load change) is transmitted to the controller by a wireless thermostat. This slow response of the controller, due to the period of time between transmitting samples, may cause discomfort to occupants of the space. Further, for temperature control, the size of the space and its materials mostly determine the dynamic characteristics of the space, these factors can vary significantly from space to space. Setting the transmission rate to the slowest level is therefore costly from a configuration perspective because the rate will need to be tailored to each room.

By using the SOD approach, the short comings of slowing down the sample rate with no addition operational features (as described in the two preceding paragraphs) can be overcome. The SOD method does not require expert knowledge of a space, that is, because the method is dynamic and responds to temperature error, a transmission interval does not need to be tailored to each individual space that the wireless thermostat may be deployed. Further, because the method causes the wireless thermostat to transmit temperature data to the controller both periodically and when error of the system increases, long intervals of not transmitting any temperature data to the controller, even when there is a rapid change in temperature of a zone, are avoided. Further benefits to the method are described herein.

Building Management System and HVAC System

Figure 2:
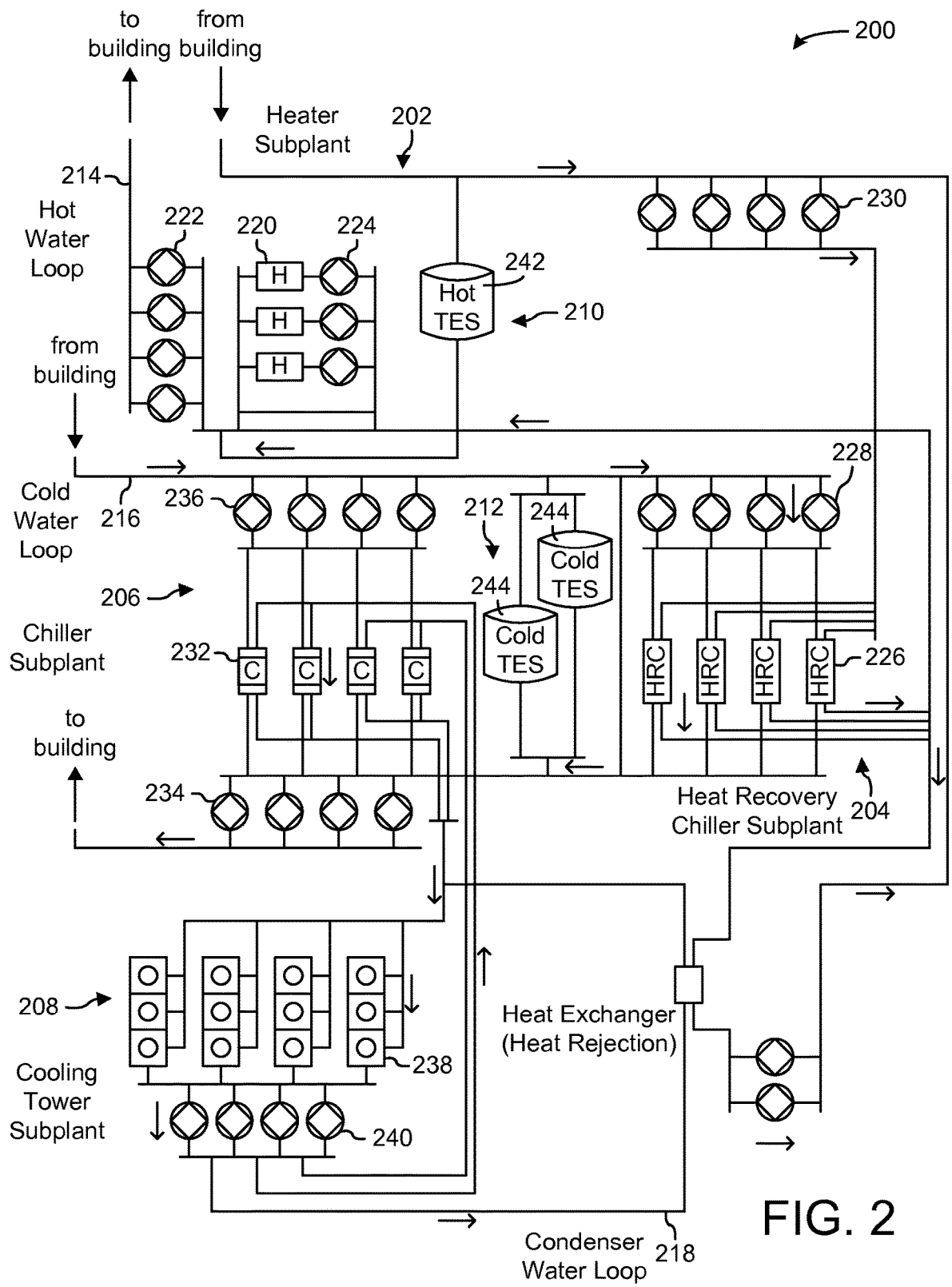
FIG. 2 is a block diagram of a waterside system that may be used in conjunction with the building of FIG. 1, according to an exemplary embodiment.
Figure 3:
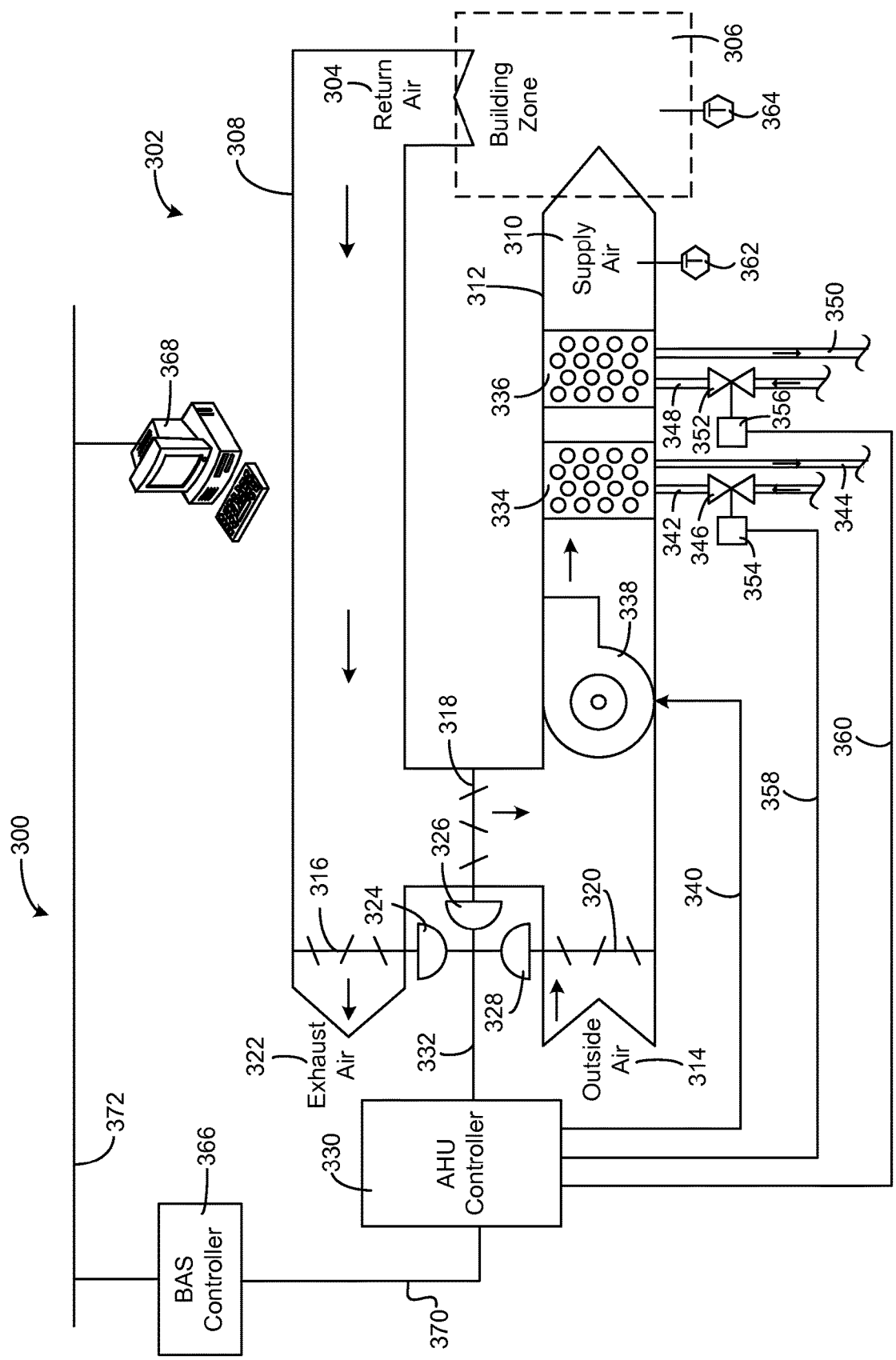
FIG. 3 is a block diagram of an airside system that may be used in conjunction with the building of FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Efficient Data Transmission Thermostat

Referring now to FIG. 4, a block diagram of system 400 including a thermostat communicating wirelessly to a controller is shown, according to an exemplary embodiment. System 400 is shown to include zone 402. Zone 402 may be a zone of a building such as building 10 as described with reference to FIG. 1. Zone 402 may include one or more rooms, offices, lobbies, and/or other areas of a building that may require heating, cooling, and/or otherwise environmental control.

Thermostat 404 is shown to be located within zone 402. Thermostat 404 may be any thermostat, remote sensor, Wi-Fi sensor, Zigbee Sensor, or other device that can be configured to receive a setpoint from an occupant of zone 402 and/or measure a temperature of a zone (e.g., zone 402). Thermostat 404 is shown to include processing circuit 408 and wireless radio 406. Processing circuit 408 may perform one or more operations causing wireless radio 406 to transmit data to controller 410. Processing circuit 408 may include one or more processors and/or memory devices. Processing circuit 408 is described with further reference to FIG. 9A.

Controller 410 can be any building controller or other device that can cause HVAC device 416 to affect an environmental condition in zone 402 (e.g., AHU controller 330 and/or BMS controller 366). HVAC device 416 may be a residential outdoor unit, a furnace, a heat pump, an air conditioner, a variable air volume (VAV) unit (e.g., VAVs 116), a boiler (e.g., boiler 104), a chiller (e.g., chiller 102), an air handler and/or roof top unit (e.g., AHU 106) and/or any other HVAC device described herein. Controller 410 is shown to include wireless radio 412 and a processing circuit 414 both of which are described with further reference to FIG. 9A.

Controller 410 is shown to communicate wirelessly with thermostat 404 via wireless radio 412. Wireless radio 412 can be configured to receive measured temperature values, setpoint values, and/or other data that wireless radio 406 can be configured to transmit to wireless radio 412. Processing circuit 414 of controller 410 can be configured to generate control signals for HVAC device 416. In some embodiments, wireless radio 412 receives a measured temperature value from thermostat 404 and causes HVAC device 416 to cause a change in the environmental conditions of zone 402 based on the measured temperature values.

Referring now to FIG. 5, a system 500 is shown including thermostat 404 and controller 410 controlling a variable air volume (VAV) unit, according to an exemplary embodiment. In FIG. 5, thermostat 404 is shown to communicate wirelessly to controller 410. In some embodiments, based on data received from thermostat 404, (e.g., measured temperature values of zone 402) controller 410 can control VAV 502 to cause environmental conditions of zone 402 to meet an environmental setpoint. VAV 502 may be a device that includes a damper that controls the airflow associated with zone 402. In this respect, controller 410 can be configured to generate control signals for the damper of VAV 502 and/or any other actuator of VAV 502. In some embodiments, VAV 502 is a VAV such as one of VAVs 116 as described with further reference to FIG. 1.

Referring now to FIG. 6, a system 600 is shown including thermostat 404 and controller 410 controlling a variable refrigerant flow (VRF) device 602. In FIG. 6, thermostat 404 can be configured to send temperatures, setpoints, and other data associated with zone 402 to controller 410. Based on the information received from thermostat 404, controller 410 can be configured to generate control signals for indoor VRF unit 602. Indoor VRF unit 602 may send and receive refrigerant from outdoor VRF unit 606 via refrigerant conduits 604. Based on the refrigerant received from outdoor VRF unit 606, indoor VRF unit 602 can be configured to heat and/or cool zone 402 via the refrigerant. Indoor VRF unit 602 and outdoor VRF unit 606 may be part of and/or make up a two pipe system or a three pipe system for zone 402 and the building that includes zone 402 (e.g., building 10). Based on the data received from thermostat 404, controller 410 can cause indoor VRF unit 602 to affect a change in the environmental conditions of zone 402.

Figure 7A:
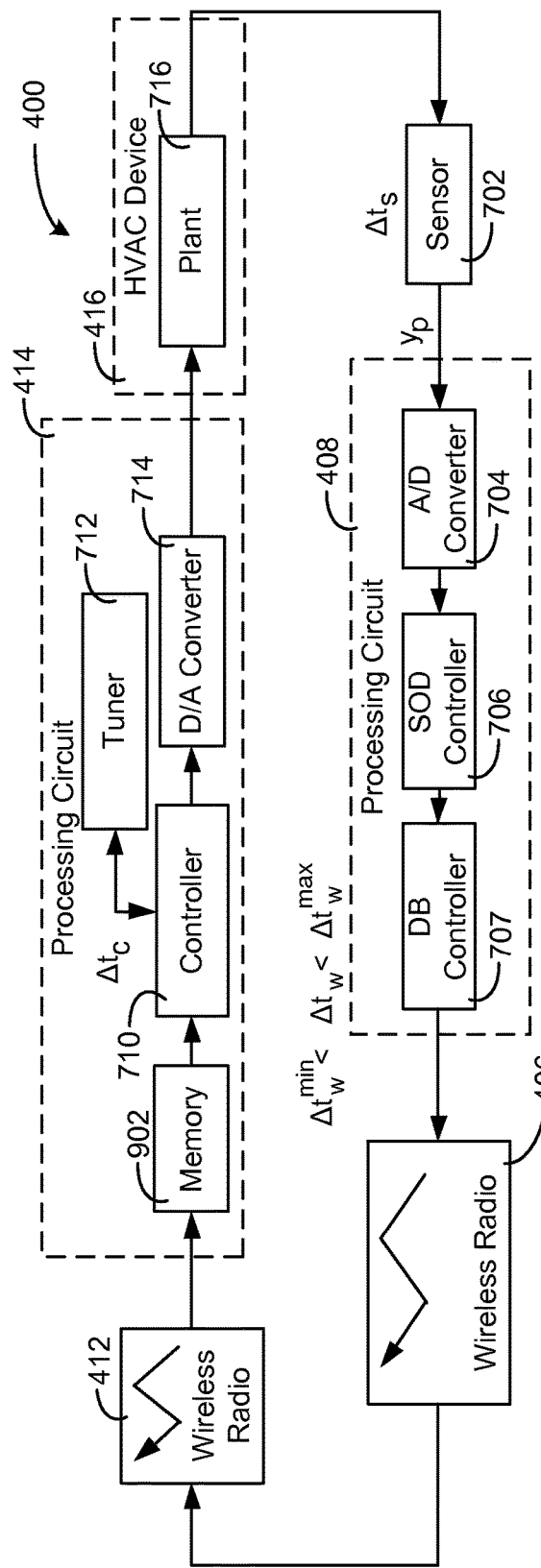
FIG. 7A is a block diagram of a control process for transmitting measured data from the thermostat of FIG. 4 to the controller of FIG. 4, according to an exemplary embodiment.
Figure 7B:
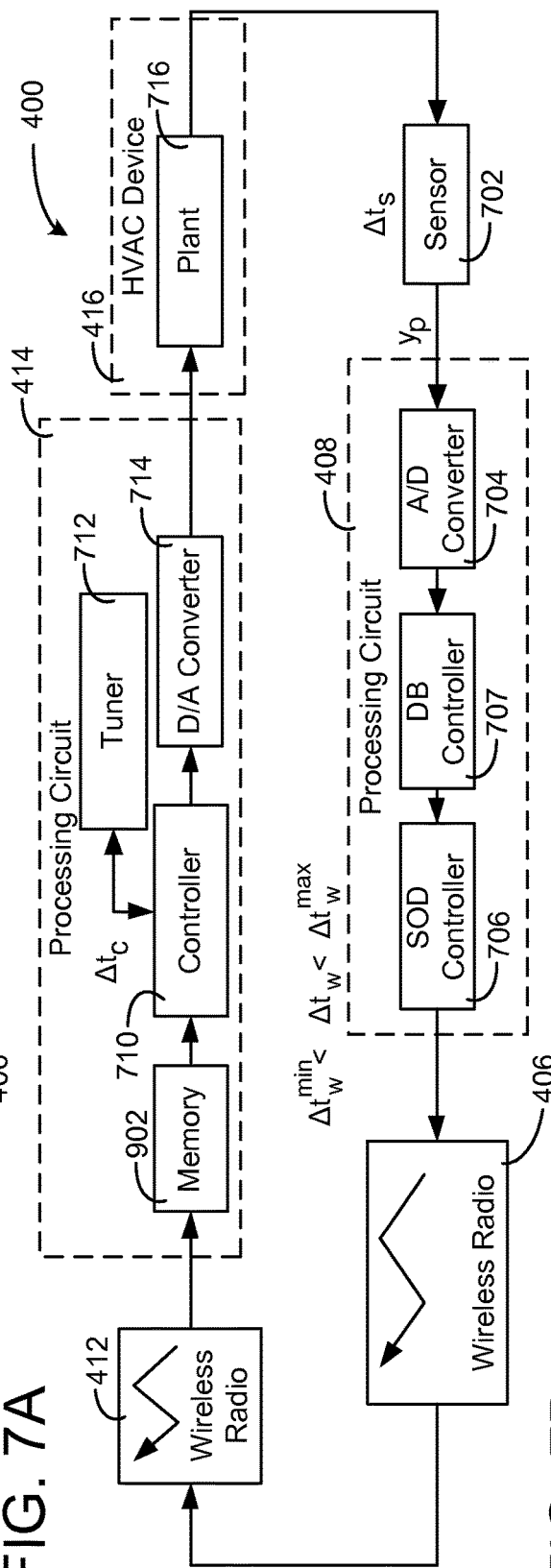
FIG. 7B is a block diagram of a control process for transmitting measured data from the thermostat of FIG. 4 to the controller of FIG. 4 where a deadband filter is implemented before determining whether a temperature value should be transmitted to the controller of FIG. 4, according to an exemplary embodiment.
Figure 8:
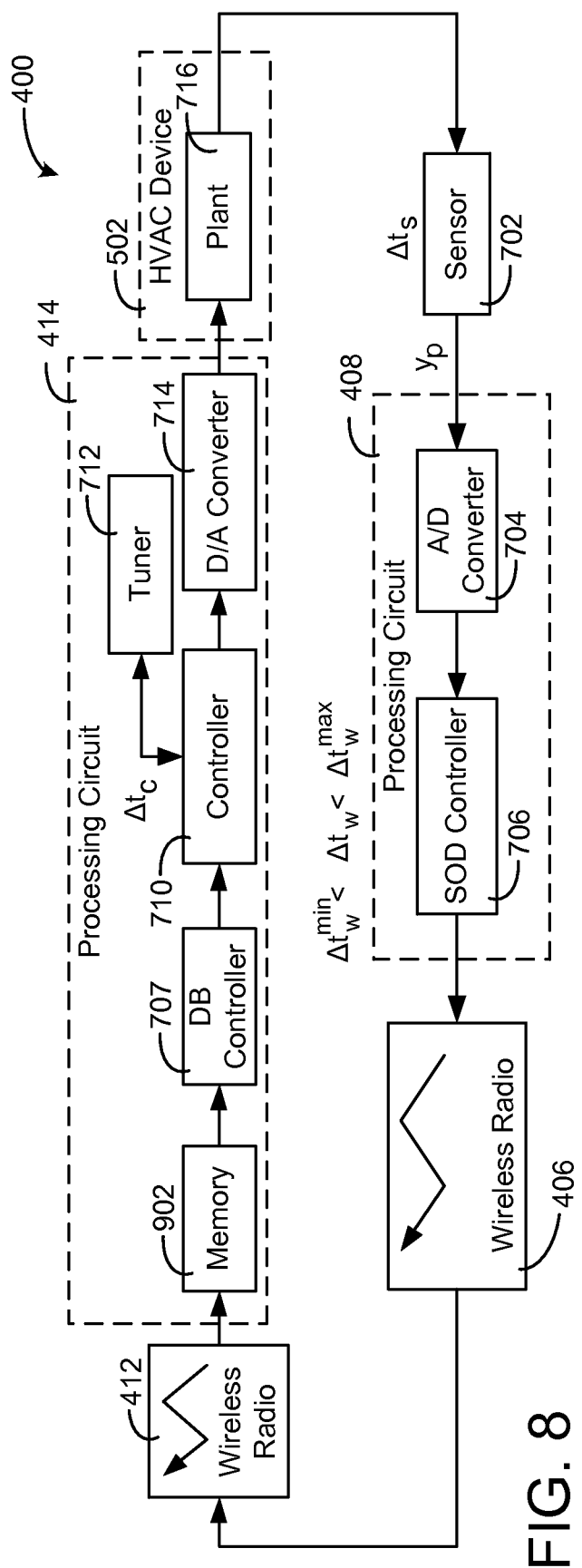
FIG. 8 is a block diagram of a control process for transmitting measured data from the thermostat of FIG. 4 to the controller of FIG. 4 where the controller of FIG. 4 utilizes a deadband filter, according to an exemplary embodiment.

Referring now to FIGS. 7A-8, block diagrams illustrating the operation of processing circuit 408 within thermostat 404 and processing circuit 414 within controller 410 are shown, according to an exemplary embodiment. FIGS. 7A-8 illustrate embodiments of the SOD method and systems and devices for implementing the SOD method. The SOD method involves sending data only when a measured variable (e.g., ambient temperature) has changed by a certain amount from a previous value. The SOD method can monitor ambient temperature to determine if the ambient temperature has changed a predefined amount since a previous sample, previous ambient temperature $y_p$. In various embodiments, the SOD method involves determining the error between the measured variable and the desired setpoint $e=r-y_p$ and transmitting the measured temperature when a current error changes a predefined amount from a previously calculated error. In some embodiments, the SOD method involves determining a change in temperature between a current temperature and a previous temperature. If the difference between the current temperature and the previous temperature is greater than a predefined amount, the current temperature is transmitted. When using changes in temperature and/or error, the predefined amount may be based on factors such as equipment size, room size, minimum on/off times for the equipment, etc.

With respect to FIG. 7A, sensor 702 is shown. Sensor 702 may measure a temperature, a humidity, an air quality, and/or any other environmental condition associated with zone 402 as described with reference to FIGS. 4-6. Processing circuit 408 may receive raw measurements (e.g., resistance values, voltage values, current values, capacitance measurements, etc.) that analog to digital (A/D) converter 704 can be configured to receive from sensor 702 and convert into a digital value representative of the raw measurement.

In some embodiments, processing circuit 408 (e.g., A/D converter 704) measures sensor 702 at a predefined interval, $\Delta t_s$. In some embodiments, A/D converter 704 measures sensor 702 by sampling a value of sensor 702 at the predefined interval, $\Delta t_s$. In some embodiments, processing circuit 408 receives a measurement of sensor 702 from sensor 802 at the predefined interval, $\Delta t_s$. The sensor 702 may be configured to send the measurement to processing circuit 408 at the predefined interval $\Delta t_s$. The time $\Delta t_s$ may be a time period that is shorter than an execution time, $\Delta t_c$, of controller 710. A/D converter 704 can convert the measurement from sensor 702 to a digital value and provide the digital value to SOD controller 706.

Send-on-delta (SOD) controller 706 can be configured to receive the measured value from A/D converter 704. In some embodiments, SOD controller 706 can be configured to determine whether the measured value should be transmitted to processing circuit 414. SOD controller 706 can be configured to send the measured temperature to processing circuit 414 in response to determining that two conditions are met. One condition may be that a minimum amount of time has passed since transmitting a measured temperature to processing circuit 414. The other condition may be that a difference between the current error (e.g., a setpoint minus the current value of the measured variable) and a previous error (e.g., the setpoint minus the previous value of the measured variable sent to processing circuit 414) is greater than a predefined amount (e.g., an error threshold). A previous error may be an error value calculated for a previously measured temperature value. In this way, processing circuit 408 periodically measures a temperature value of sensor 702 at a predefined interval, $\Delta t_s$, an may also calculate an error value for the measured temperature value at the predefined interval, $\Delta t_s$.

SOD controller 706 can be configured to send the measured temperature to processing circuit 414 in response to determining that a maximum amount of time has passed since transmitting a measured temperature to processing circuit 414. Deadband (DB) controller 707 can be configured to apply a deadband filter to any measured value that SOD controller 706 determines should be transmitted to processing circuit 414. The deadband filter may be a filter that takes a temperature input and generates a temperature output. The temperature output may be equal to a setpoint value if the temperature input is within a range of temperature values. If the input temperature is outside the range of temperatures, the output of the deadband filter may be a shifted version of the input temperature, a version that is closer to the setpoint temperature. Processing circuit 408 can be configured to wirelessly transmit the filtered value via wireless radio 406 to processing circuit 414.

In some embodiments, deadband controller 707 is configured to set the filtered temperature to a setpoint value when the absolute value of the setpoint temperature minus the temperature received from SOD controller 706 is less than or equal to half a deadband threshold. In response to determining that the absolute value of the setpoint minus the temperature received from SOD controller 706 is greater than half the deadband threshold, deadband controller 707 can be configured to set the filtered temperature to an adjusted version of the temperature received from SOD controller 706. The equation below illustrates the deadband filter that may be implemented by deadband controller 707.

$$y_w = \begin{cases} r & \text{if } |r - y_p| \leq \frac{1}{2}DB \\ r - \text{sign}(r - y_p)\left(|r - y_p| - \frac{1}{2}DB\right) & \text{if } |r - y_p| > \frac{1}{2}DB \end{cases}$$

Processing circuit 414 can receive the transmitted measurement from wireless radio 406 via wireless radio 412. Via a controller 710, processing circuit can generate a control signal for HVAC device 416. Controller 710 can be a proportional control method, a proportional integral (PI) control method, a proportional integral derivative (PID) control method, and/or any other control method, feedback control method, open loop control method, or combination thereof. Via a digital to analog (D/A) converter 714, processing circuit 414 can be configured to send a control signal to HVAC device 416. Tuner 712 may be configured to tune controller 710. For example, if controller 710 includes a PI controller, tuner 712 can be configured to adjust the parameters of the PI controller. In some embodiments, tuner 712 is a pattern recognition adaptive control (PRAC). The PRAC may be a PRAC as described with further reference to U.S. patent application Ser. No. 08/291,283 (now U.S. Pat. No. 5,506,768) filed Aug. 16, 1994 and U.S. patent application Ser. No. 07/968,583 (now U.S. Pat. No. 5,355,305) filed Oct. 29, 1992, the entireties of which are incorporated by reference herein.

Controller 710, responsible for controlling HVAC device 416, may retrieve a transmitted value from a memory buffer (e.g., a memory component of processing circuit 414) at a time period $\Delta t_c$ to be used in controlling HVAC device 416. Processing circuit 414 is shown to include memory 902. Memory 902 can be configured to act as a memory buffer for processing circuit 414. Memory 902 is described with further reference to FIG. 9. In some embodiments, once a filtered temperature value is sent by wireless radio 406 to wireless radio 412. Wireless radio 412 can provide the filtered temperature value to processing circuit 414 which can store the filtered temperature value in a memory buffer that feeds the value to controller 710 at a next execution time of controller 710.

HVAC device 416 can receive a control signal generated by controller 710 from D/A converter 714. Specifically, plant 716 may receive a control signal from D/A converter 714 and can be controlled based on the control signal. In some embodiments, plant 716 is an actuator such as a valve, a damper, a fan, a motor, a compressor, and/or any other plant. In the case that HVAC device 416 is a VAV (e.g., VAV 502 and/or VAVs 116), plant 716 may be a damper that controller 710 can command open, closed, and/or partially open to various degrees. Based on changes made to plant 716, sensor 702 may measure environmental changes in zone 402 based on the control signals sent to plant 716 from controller 710. In this regard, processing circuit 408 and processing circuit 414 can continue to operate until zone 402 reaches a setpoint temperature.

Referring now to FIG. 7B, the processing circuits of thermostats 402 and controller 410 are shown to control an environmental condition of zone 402 with DB controller 707 being implemented before SOD controller 706, according to an exemplary embodiment. In FIG. 7A, temperature values that SOD controller 706 determines should be transmitted to processing circuit 414 may be close enough to a setpoint that DB controller 707 may output the setpoint. In this regard, if two consecutive temperature values that SOD controller 706 determines should be transmitted are close enough to the setpoint, DB controller 707 outputs the setpoint for both temperature values. Wireless radio 406 may transmit the setpoint to wireless radio 412 twice. To avoid sending the same value twice and being energy inefficient, FIG. 7B illustrates and embodiment where DB controller 707 is implemented before SOD controller 706.

In FIG. 7B, any measurements made by sensor 702 may first be filtered by DB controller 707 and then passed to SOD controller 706. In this regard, if two values are filtered to the setpoint by DB controller 707, SOD controller 706 may not determine that any change in measured temperature has occurred and thus wireless radio 406 may transmit less temperature values to wireless radio 412.

Referring now to FIG. 8, the processing circuits of thermostats 402 and controller 410 are shown to control an environmental condition of zone 402 with a deadband filter being used in processing circuit 414, according to an exemplary embodiment. FIG. 8 is similar to FIG. 7A. However, in FIG. 8, DB controller 707 is not implemented by processing circuit 408 but is rather implemented by processing circuit 414. For example, processing circuit 408 may cause wireless radio 406 to send a measured value of sensor 702 based on the timing and error conditions of SOD controller 706. However, processing circuit 408 may not filter the measured value before sending the measured value to processing circuit 414. Instead, processing circuit 414 may receive the measured value and use DB controller 707 to filter the measured value before sending the measured value to control 710.

FIG. 8 may be an embodiment for system 400 when processing circuit 408 of thermostat 404 does not store and/or receive a setpoint value. In this case, processing circuit 408 cannot compare a measured value of sensor 702 to a setpoint to determine if there is a predefined amount of error. In this embodiment, SOD controller 706 may determine if the measured value has changed from a previous measured value by a predefined amount and a minimum amount of time since transmitting a measured value to processing circuit 414 has passed. Further, SOD controller 706 can determine if a maximum amount of time has passed since transmitting a measured value to processing circuit 414. In this embodiment, processing circuit 414 may store a setpoint value. For this reason, processing circuit 414 can use a DB controller 707 to filter the received measurement and controller 710 can be configured to control plant 716 based on the filtered value.

Figure 9A:
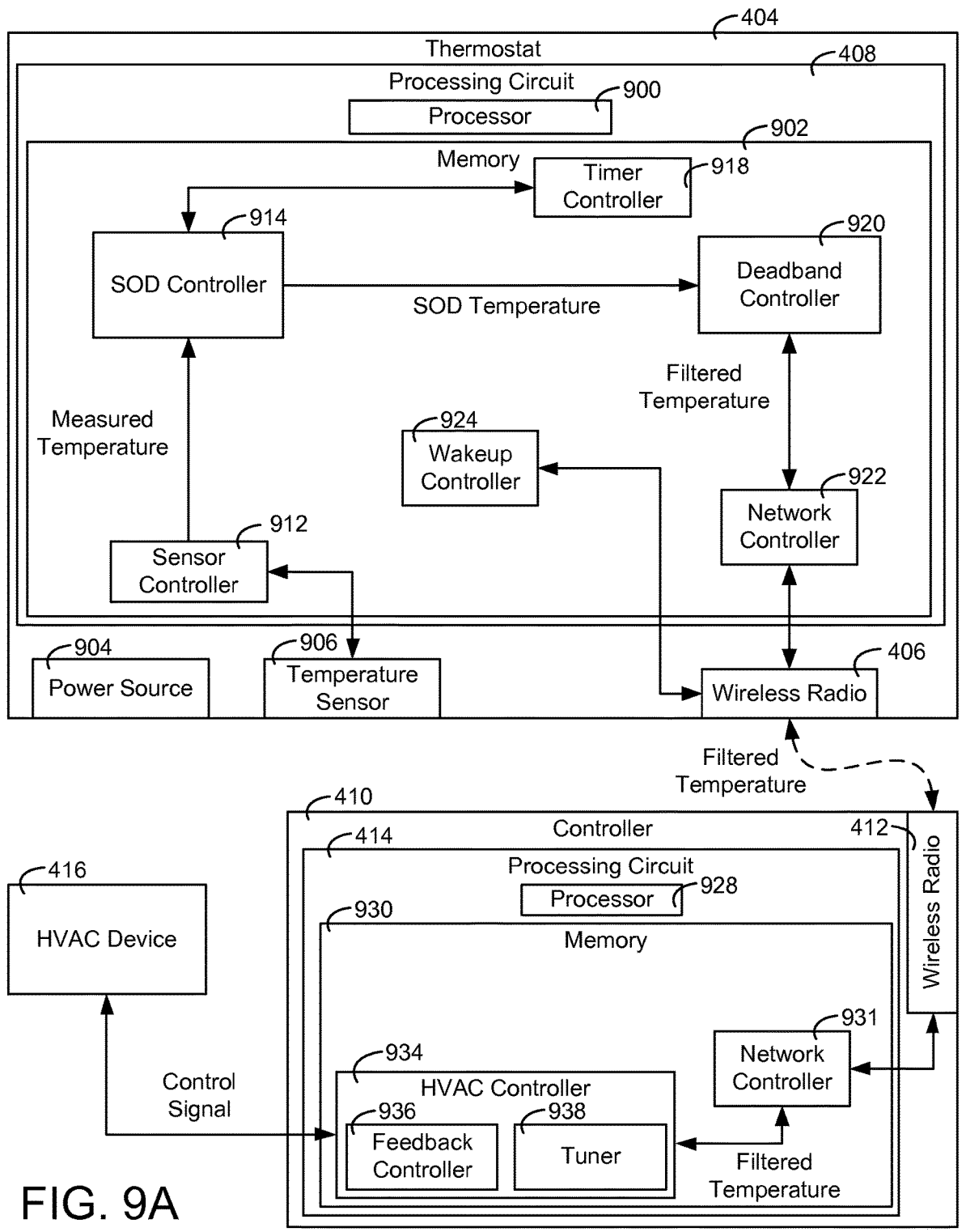
FIG. 9A is a block diagram of the thermostat of FIG. 4 in greater detail shown to include a send-on-delta (SOD) controller, according to an exemplary embodiment.

Referring now to FIG. 9A, thermostat 404 as described with reference to FIG. 4 is shown in greater detail, according to an exemplary embodiment. Processing circuit 408 as described with reference to FIG. 4 and elsewhere herein is shown to include processor 900 and memory 902. Processing circuit 408 can be configured to perform some and/or all of the functionality of thermostat 404. Processing circuit 408 is shown to include a processor 900 and memory 902. Processor 900 can be a general purpose or specific purpose processor, an application specific integrated circuit (ASIC), one or more field programmable gate arrays (FPGAs), a group of processing components, or other suitable processing components. Processor 900 may be configured to execute computer code and/or instructions stored in memory 902 or received from other computer readable media (e.g., CDROM, network storage, a remote server, etc.).

Memory 902 can include one or more devices (e.g., memory units, memory devices, storage devices, etc.) for storing data and/or computer code for completing and/or facilitating the various processes described in the present disclosure. Memory 902 can include random access memory (RAM), read-only memory (ROM), hard drive storage, temporary storage, non-volatile memory, flash memory, optical memory, or any other suitable memory for storing software objects and/or computer instructions. Memory 902 can include database components, object code components, script components, or any other type of information structure for supporting the various activities and information structures described in the present disclosure. Memory 902 can be communicably connected to processor 900 via processing circuit 408 and can include computer code for executing (e.g., by processor 900) one or more processes described herein.

Thermostat 404 is shown to include power source 904, temperature sensor 906, and wireless radio 406. Power source 904 may be one or a combination of a battery and a permanent power source. Power source 904 can be a battery and can be configured to store and release a charge. In some embodiments, power source 904 can be configured to power thermostat 404. In some embodiments, power source 904 is a rechargeable battery, a one-time use battery, a capacitor, and/or any other energy storing device. Power source 904 can store charge which can be used to power thermostat 404. Power source 904 may be any type or combination of batteries, capacitors (e.g., super capacitors), and/or any other energy storage device. In some embodiments, the battery is a nickel cadmium (Ni—Cd) battery and/or a nickel-metal hydride (Ni-MH) battery. In various embodiments, the battery is a lithium ion battery and/or a lithium polymer battery.

Temperature sensor 906 may be configured to measure the ambient temperature of a building (e.g. building 10) and/or the temperature of a zone (e.g., zone 402). While FIG. 9A is described with reference to measuring temperature via temperature sensor 906 and transmitting the measured temperature to controller 410 to control HVAC device 416, it should be understood that any type of value (e.g., humidity, air quality, air volumetric flow, battery charge level, etc.) can be measured by any sensor of thermostat 404 and can be sent to controller 410 via the methods described herein. Temperature sensor 906 may be a sensor outputting an analog signal (e.g., sinusoid, square wave, PWM wave, etc.) indicative of a temperature value.

In some embodiments, temperature sensor 906 has a measureable value (e.g. current, voltage, resistance) that sensor controller 912 can be configured to measure to determine a temperature value measured by temperature sensor 906. Temperature sensor 906 may be a thermocouple, a thermistor, a resistance temperature detector and/or any combination thereof. In some embodiments, temperature sensor 906 may be a temperature module outputting a digital value. Temperature sensor 906 may communicate a digital and/or analog value to sensor controller 912. In some embodiments, temperature sensor 906 may be deployed in a location remote to thermostat 404 or may be located inside an enclosure of thermostat 404. Temperature sensor 906 may be any other type or combination of temperature sensor.

Wireless radio 406 can be configured to send data to controller 410 and receive data from controller 410. Specifically, wireless radio 406 can be configured to communicate with wireless radio 412. In some embodiments, wireless radio 406 is a radio configured to communicate via Wi-Fi, Zigbee (e.g., Zigbee IP, Zigbee Pro Green Power), Bluetooth, 2G, 3G, LTE, a local area network (LAN), a metropolitan area network (MAN), a wide area network (WAN) (e.g., the Internet), adhoc wireless communication, and/or any other type of wireless network. Wireless radio 406 can be configured to send a filtered temperature value to wireless radio 412.

Sensor controller 912 can be configured to receive a digital and/or analog value from temperature sensor 906. In some embodiments, sensor controller 912 periodically samples temperature sensor 906 for a temperature value. In some embodiments, sensor controller 912 samples temperature sensor 906 at a predefined sampling period. In some embodiments, sensor controller 912 includes an analog to digital converter (e.g., A/D converter 704) that can be configured to convert an analog value received from temperature sensor 906 to a digital value. In some embodiments, sensor controller 912 measures a value such as resistance, current, voltage, step value, etc. that is a function of ambient temperature. In this regard, sensor controller 912 can be configured to determine a digital value representative of the measured temperature value. Sensor controller 912 may provide send-on-delta (SOD) controller 914 with the measured temperature value.

SOD controller 914 can be configured to receive a measured temperature from sensor controller 912 and determine if the measured temperature should be transmitted by wireless radio 406 to controller 410. SOD controller 914 may be the same and/or similar to SOD controller 706 as described with reference to FIGS. 7A-8. SOD controller 914 can be configured to communicate with timer controller 918. Based on time data received from timer controller 918, SOD controller 914 can be configured to cause wireless radio 406 to send the measured temperature to controller 410 if a maximum amount of time has passed since transmitting a measured temperature value and/or if a temperature error has changed by at least a predefined amount as compared to a previous temperature error and a minimum amount of time has passed since transmitting a measured temperature value.

The illustration below depicts the steps SOD controller 914 can be configured to perform to determine if a temperature value should be transmitted to controller 410.

Initialization $y_p \leftarrow y_{p,cur}$ $e_{prev} \leftarrow r - y_{p,cur}$ $t_{prev} \leftarrow t_{cur}$ Send-On-Delta $e_{cur} \leftarrow r - y_{p,cur}$ $\Delta t_w \leftarrow t_{cur} - t_{prev}$ if $((|e_{cur} - e_{prev}| > \Delta e)$ and $(\Delta t_w \geq \Delta t_w^{min}))$ or $(\Delta t_w \geq \Delta t_w^{max})$ then $y_p \leftarrow y_{p,cur}$ $e_{prev} \leftarrow e_{cur}$ $t_{prev} \leftarrow t_{cur}$ end if $y_w \leftarrow y_p$ SOD controller 914 may store a setpoint value, r. The setpoint may be received from a user via an user interface (e.g., a potentiometer, a touch screen, a set of buttons, etc.) of thermostat 404 and/or may be received wirelessly from another device (e.g., a smartphone). The value $y_p$ may be a value stored by SOD controller 914 that is a previously measured temperature of temperature sensor 906. The value $y_{p,cur}$ may be a current measurement of temperature sensor 906 while $e_{prev}$ may be a previous setpoint error and $e_{cur}$ is a current setpoint error. The step $y_w \leftarrow y_p$ may represent transmitting the current measured temperature and/or determining that the current measured temperature should be transmitted when the condition if $((|e_{cur} - e_{prev}| > \Delta e)$ and $(\Delta t_w \geq \Delta t_w^{min}))$ or $(\Delta t_w \geq \Delta t_w^{max})$ is true.

The value $\Delta t_w$, may be the length of time since transmitting a temperature value from thermostat 404 to controller 410. For this reason, $t_{cur}$ may be a current time while $t_{prev}$ may be a time associated with a previous transmission of a temperature value from thermostat 404 to controller 410. The value $\Delta t_w^{min}$ may be a minimum amount of time while $\Delta t_w^{max}$ may be a maximum amount of time. If less than the minimum amount of time $\Delta t_w^{min}$ has passed since the temperature was last transmitted to controller 410, in some embodiments, the temperature is not transmitted to controller 410 regardless of the change in temperature value since the last transmission. The value $\Delta t_w^{max}$ may represent a maximum amount of time that when passed, SOD controller 914 should transmit a temperature value to controller 410 regardless of the value of the temperature value.

The steps under initialization may be performed only when thermostat 404 is powered on and/or when SOD controller 914 is activated. The steps under Send-On-Delta may be the steps that SOD controller 914 is configured to perform to determine if a measured temperature value should be transmitted to controller 410. SOD controller 914 is further described in FIG. 9B. During an initialization, i.e., when thermostat 404 is turned on, SOD controller 914 can be configured to set the previously measured temperature to the currently measured temperature. Further, during the initialization, SOD controller 914 can be configured to set the previous error $e_{prev}$ to the difference of the setpoint and the currently measured temperature $(r - y_{p,cur})$.

In other embodiments, SOD controller 914 can be configured to determine whether to send the measured temperature value to controller 410 based on temperature and not on a setpoint error. This may be used in a case when thermostat 404 does not store a setpoint value e.g., when thermostat 404 is a remote sensor. In this case, controller 410 may store the setpoint value. Further, in this case, thermostat 404 may not use deadband controller 920. Instead, controller 410 may implement deadband controller 920. This is illustrated with further reference to FIG. 8. SOD controller 914 can be configured to compare a measured temperature to a previously measured temperature and determine if the difference in the two temperatures is greater than a predefined amount. In response to determining that the difference in temperatures is greater than the predefined amount, SOD controller 914 can be configured to send the measured temperature to controller 410. SOD controller 914 may further determine that a minimum amount of time has passed in addition to determining that the temperature difference is greater than a predefined amount. Further, in response to determining that a maximum amount of time has passed, SOD controller 914 can be configured to cause thermostat 404 to transmit the measured temperature to controller 410.

The steps below illustrate the steps which SOD controller 914 may use when thermostat 404 does not store a setpoint value.

Initialization $y_p \leftarrow y_{p,cur}$ $t_{prev} \leftarrow t_{cur}$

Send-On-Delta $\Delta t_w \leftarrow t_c - t_{prev}$ if $((|y_{p,cur} - y_p| > \Delta y_p)$ and $(\Delta t_w \geq \Delta t_w^{min}))$ or $(\Delta t_w \geq \Delta t_w^{max})$ then $y_p \leftarrow y_{p,cur}$ $t_{prev} \leftarrow t_{cur}$ end if $y_w \leftarrow y_p$ The value $y_p$ may represent a previously measured temperature value while the value $y_{p,cur}$ may represent the currently measured temperature value. The value $y_p$ may be the value transmitted to controller 410 in response to the below if-condition being true. The value $\Delta y_p$ may represent a maximum absolute difference of the two temperatures. During an initialization, i.e., when thermostat 404 is turned on, SOD controller 914 can be configured to set the previously measured temperature to the currently measured temperature and set a currently measured time to a previously measured time. The step $y_w \leftarrow y_p$ may represent transmitting the current measured temperature or determining that the current measured temperature should be transmitted when the condition if $((|y_{p,cur} - y_p| > \Delta y_p)$ and $(\Delta t_w \geq \Delta_w^{min}))$ or $(\Delta t_w \geq \Delta t_w^{max})$ is true.

Timer controller 918 can be configured to keep time. In some embodiments, timer controller 918 is a real-time clock and/or any other timer. In some embodiments, timer controller 918 includes one or more digital timers (e.g., timer counters) such as an 8-bit timer, a 16-bit timer, a 32-bit timer, etc. Timer controller 918 may communicate timing information to SOD controller 914. In some embodiments, the timing information is a date and time, the amount of time that has passed in a particular interval, and/or any other timing data. Timer controller 918 can provide any component of memory 902 with timing functionality and/or time data.

Deadband controller 920 can be configured to filter any temperature value that it receives from SOD controller 914. Deadband controller 920 can be configured to implement a deadband filter on temperature values received from SOD controller 914. In some embodiments, deadband controller 920 includes an anti-spike filter and/or a $2^{nd}$ order Bessel filter. The deadband filter may be used to avoid integration problems of HVAC controller 934 of controller 410 and prevent cycling of HVAC device 416. These problems happen when HVAC controller 934 "sees" that HVAC device 416 has controlled a space close to a setpoint and new samples take a long time to arrive at controller 410. In this case, a control method of HVAC controller (e.g., a PI controller) may integrate the error, which will grow. HVAC controller 934 may compensate for the error even though HVAC device 416 has almost caused the space to reach the setpoint.

Any measured temperature value that SOD controller 914 determines should be transmitted to controller 410 can be filtered by deadband controller 920 prior to being transmitted to controller 410. Deadband controller 920 may use a deadband filter to filter the temperature it receives from SOD controller 914. In some embodiments, deadband controller 920 is configured to set the filtered temperature to a setpoint value when the absolute value of the setpoint temperature minus the temperature received from SOD controller 914 is less than or equal to half a deadband threshold. In response to determining that the absolute value of the setpoint minus the temperature received from SOD controller 914 is greater than half the deadband threshold, deadband controller 920 can be configured to set the filtered temperature to an adjusted version of the temperature received from SOD controller 914. The equation below illustrates the deadband filter that may be implemented by deadband controller 920.

$$y_w = \begin{cases} r & \text{if } |r - y_p| \leq \frac{1}{2}DB \\ r - \text{sign}(r - y_p)\left(|r - y_p| - \frac{1}{2}DB\right) & \text{if } |r - y_p| > \frac{1}{2}DB \end{cases}$$

The following illustration demonstrates the operations that deadband controller 920 can be configured to perform to determine a filtered temperature.

$e_{db} \leftarrow r - y_{in}$ if $|e_{db}| \leq \frac{1}{2}DB$ then $e_{db} \leftarrow 0$ else $e_{db} \leftarrow \text{sign}(e_{db})\left(|e_{db}| - \frac{1}{2}DB\right)$ end if $y_{out} \leftarrow r - e_{db}$ The value $e_{db}$ may be difference between a temperature setpoint, r, and an input temperature, $y_{in}$. The value DB may be a deadband range. In the first line, the deadband error $e_{db}$ is shown to be calculated. The deadband error may be the difference of a temperature setpoint and the temperature value received from SOD controller 914. Referring to the next line, deadband controller 920 can be configured to determine if the absolute value of the deadband error is less than or equal to the deadband range. In response to determining that the absolute value of the deadband error is less than or equal to half the deadband range, the deadband error is set to zero. Otherwise, referring to the fourth line, deadband controller 920 can be configured to set the deadband error to the sign (e.g., positive integer one or negative integer one) of the deadband error multiplied by the absolute value of the deadband error minus half the deadband range. Referring to the last line, deadband controller 920 can be configured to set the filtered temperature, $y_{out}$, the output, to the setpoint value minus the deadband error.

In some embodiments, deadband controller 920 can be configured to subtract half the deadband range, DB, from the current measured temperature value, $y_{in}$, if the current measured temperature value is greater than a maximum of a temperature band. The temperature band may be the range of one half DB above a setpoint value and one half DB below the setpoint value. Further, deadband controller 920 can be configured to add one half the deadband range DB to the current measured temperature value, $y_{in}$, if the current measured temperature value, $y_{in}$, is greater than a maximum of the temperature band. This may be a logical implementation of the steps outlined above. In some embodiments, controller 410 is a multi-staged controller operating a staged system. In these embodiments, controller 410 may have a deadband filter. Deadband controller 920 may set the deadband range DB of deadband controller 920 to zero when controller 410 has a deadband filter.

Network controller 922 can be configured to control wireless radio 406 and cause wireless radio 406 to communicate with controller 410. In this regard, network controller 922 may execute instructions to cause wireless radio 406 to communicate via Wi-Fi, Zigbee (e.g., Zigbee IP, Zigbee Pro Green Power), Bluetooth, 2G, 3G, LTE, a local area network (LAN), a metropolitan area network (MAN), a wide area network (WAN) (e.g., the Internet), adhoc wireless communication, and/or any other type of wireless network. Network controller 922 can be configured to cause wireless radio 406 to send a filtered temperature received from deadband controller 920 to controller 410.

Wakeup controller 924 can be configured to cause wireless radio 406 to operate in various modes. In some embodiments, wakeup controller 924 can be configured to cause wireless radio 406 to operate in a sleep mode or otherwise a low power mode. Whenever wireless radio 406 is not transmitting data (e.g., a filtered temperature) to controller 410, wakeup controller 924 can be configured to cause wireless radio 406 to operate in the sleep mode. Whenever wireless radio 406 needs to transmit a filtered temperature to controller 410, wakeup controller 924 can be configured to "wakeup" wireless radio 406 by causing wireless radio 406 to operate in a full power and/or normal (e.g., operating) power mode.

Controller 410 is shown to include processing circuit 414 and wireless radio 412. Processing circuit 414 may be the same and/or similar to processing circuit 408. Processor 928 may be the same and/or similar to processor 900 while memory 930 may be the same and/or similar to memory 902. Wireless radio 412 may be the same and/or similar to wireless radio 406. Wireless radio 412 can be configured to communicate with thermostat 404. In this regard, wireless radio 412 is configured to send data to and/or receive data from thermostat 404. Wireless radio 412 can be configure to receive a filtered temperature from wireless radio 406.

Memory 930 is shown to include HVAC controller 934 and network controller 931. Network controller 931 may be the same as and/or similar to network controller 922. In some embodiments, network controller 931 can be configured to cause wireless radio 412 to communicate with wireless radio 406. Network controller 931 can be the same and/or similar to network controller 922. Network controller 931 may include instructions for operating wireless radio 412 and may provide received data to the various components of controller 410 in addition to sending data to thermostat 404 via wireless radio 412. In some embodiments, wireless radio 412 can be configured to transmit data to wireless radio 406 and/or receive data from wireless radio 406. In some embodiments, network controller 931 can be configured to receive a filtered temperature via wireless radio 412.

HVAC controller 934 can be configured to control HVAC device 416. In some embodiments, HVAC controller 934 can be configured to control a plant of HVAC device 416 (e.g., plant 716). In some embodiments, the plant is an actuator of HVAC device 416. In some embodiments, the actuator is one and/or a combination of a valve, a motor, a compressor, a valve, and/or any other type of actuator. Controlling the actuator may affect an environmental change based on the filtered temperature received from thermostat 404.

HVAC controller 934 is shown to include feedback controller 936 and tuner 938. Feedback controller 936 can be a proportional (P) control method, a proportional integral (PI) control method, a proportional integral derivative (PID) control method, and/or any other combination of control methods (e.g., feedback, feedforward). HVAC controller 934 can be configured to perform any single or multi-stage control process. Tuner 938 can be configured to tune the various control parameters of feedback controller 936 by adjusting the parameters over time to maintain optimal operation of feedback controller 936 and hence HVAC device 416. Tuner 938 may be a PRAC and/or a pulse modulation adaptive controller (PMAC). Feedback controller 936 may be the same as and/or similar to controller 710 as described with further reference to FIGS. 7A-8 and tuner 938 may be the same as and/or similar to tuner 712 as described with further reference to FIGS. 7A-8.

Figure 9B:
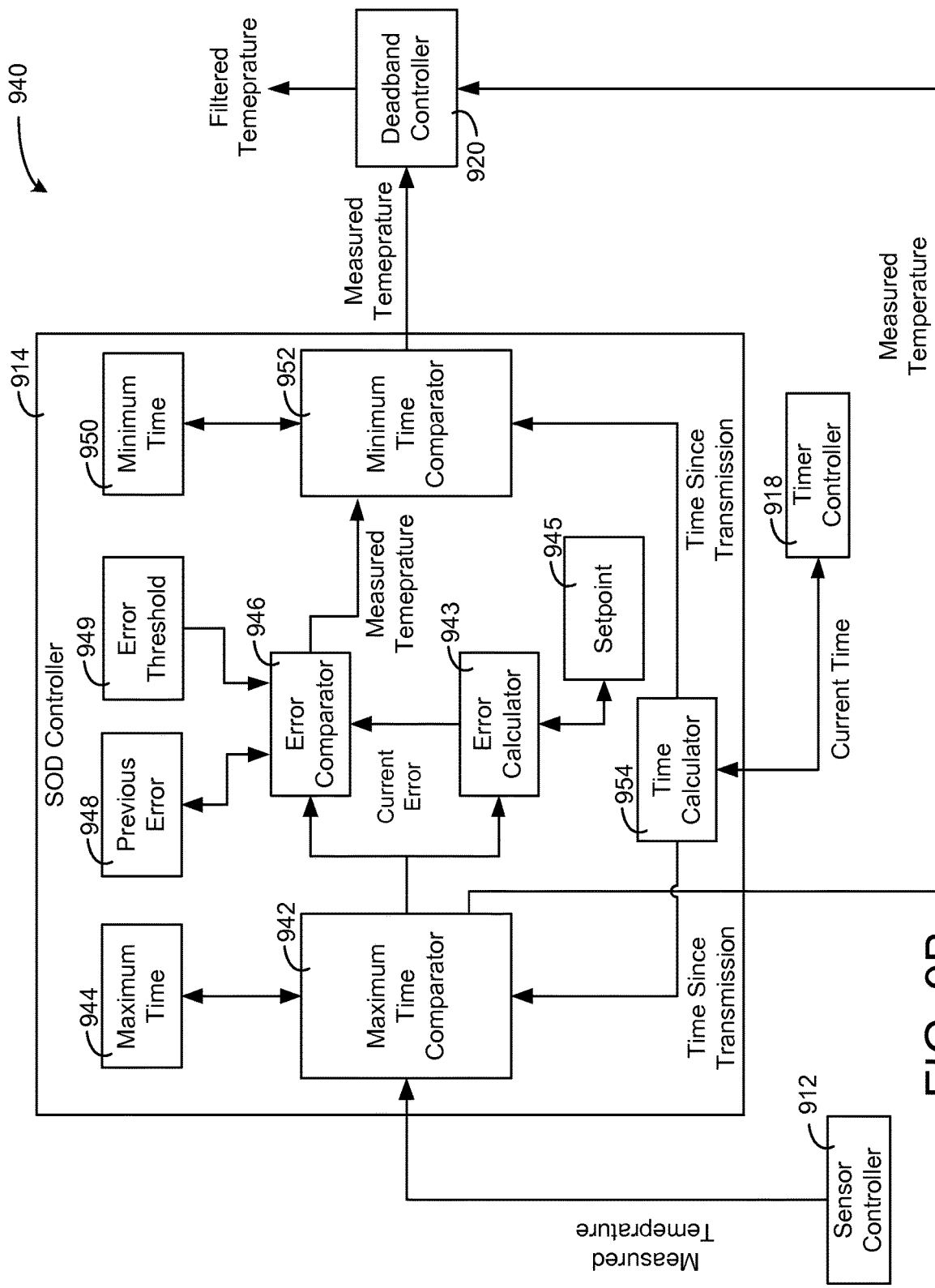
FIG. 9B is a block diagram of the SOD controller of FIG. 9A in greater detail, according to an exemplary embodiment.

Referring now to FIG. 9B, SOD controller 914 as discussed with reference to FIG. 9A is shown in greater detail, according to an exemplary embodiment. SOD controller 914 is shown to include maximum time comparator 942. Maximum time comparator 942 can be configured to receive a measured temperature from sensor controller 912 that sensor controller 912 samples (e.g., measures) at a predefined interval. Maximum time comparator 942 may receive a time value, maximum time 944 that SOD controller 914 stores and a time since last transmission from time calculator 954. In response to determining that the time since last transmission is greater than maximum time 944, maximum time comparator 942 can be configured to provide deadband controller 920 with the measured temperature to be transmitted to controller 410.

Maximum time comparator 942 can be configured to the measured temperature to error comparator 946 and error calculator 943. Error calculator 943 can be configured to determine an amount of error based on the measured temperature and setpoint 945 stored by SOD controller 914. In some embodiments, setpoint 945 is received by thermostat 404 via a dial, touchscreen, or other input. In various embodiments, setpoint 945 is transmitted to thermostat 404. For example, if the setpoint is 70 degrees Fahrenheit and the measured temperature is 75 degrees Fahrenheit, the error is 5 degrees Fahrenheit. Error calculator 943 can be configured to provide error comparator 946 with the current error. Error comparator 946 can be configured to determine if the measured temperature should be provided to minimum time comparator 952 based on the current error, the previous error 948, and an error threshold 949. Error comparator 946 can be configured to determine if the current error minus the previous error is greater than error threshold 949. In response to determining that this is true, error comparator 946 can be configured to provide the measured temperature to minimum time comparator 952. Error comparator 946 can be configured to update previous error 948 with the current error determined by error calculator 943 whenever error comparator 946 makes a comparison of calculated error and previous error 948 against error threshold 949.

Minimum time comparator 952 can be configured to receive minimum time 950 which may be a minimum time value, and time since a last transmission from time calculator 954. Minimum time comparator 952 can be configured to determine that a minimum time has passed since transmitting a measured temperature to controller 410. Minimum time comparator 952 can be configured to compare minimum time 950 to the time since last transmission. In response to determining that the time since last transmissions is greater than the minimum time 950, minimum time comparator 952 can be configured to provide deadband controller 920 with the measured temperature.

Time calculator 954 can be configured to determine a time since last transmission based on a current time received from timer controller 918. Time calculator 954 may store two values, a current time, $t_{cur}$, and a previous time, $t_{prev}$. The current time may be the time received from timer controller 918. Time calculator 954 can be configured to update the previous time with the current time whenever one of maximum time comparator 942 and/or minimum time comparator 952 provide deadband controller 920 with a temperature value to transmit to controller 410. Time calculator 954 can be configured to compute a time since transmission, $\Delta t_w$, by taking the difference of the current time and the previous time. Time calculator 954 can be configured to provide the time since transmission to maximum time comparator 942 and minimum time comparator 952. Upon initialization, i.e., when thermostat 404 is turned on, time calculator 954 can be configured to set the previous time to the current time.

Figure 10:
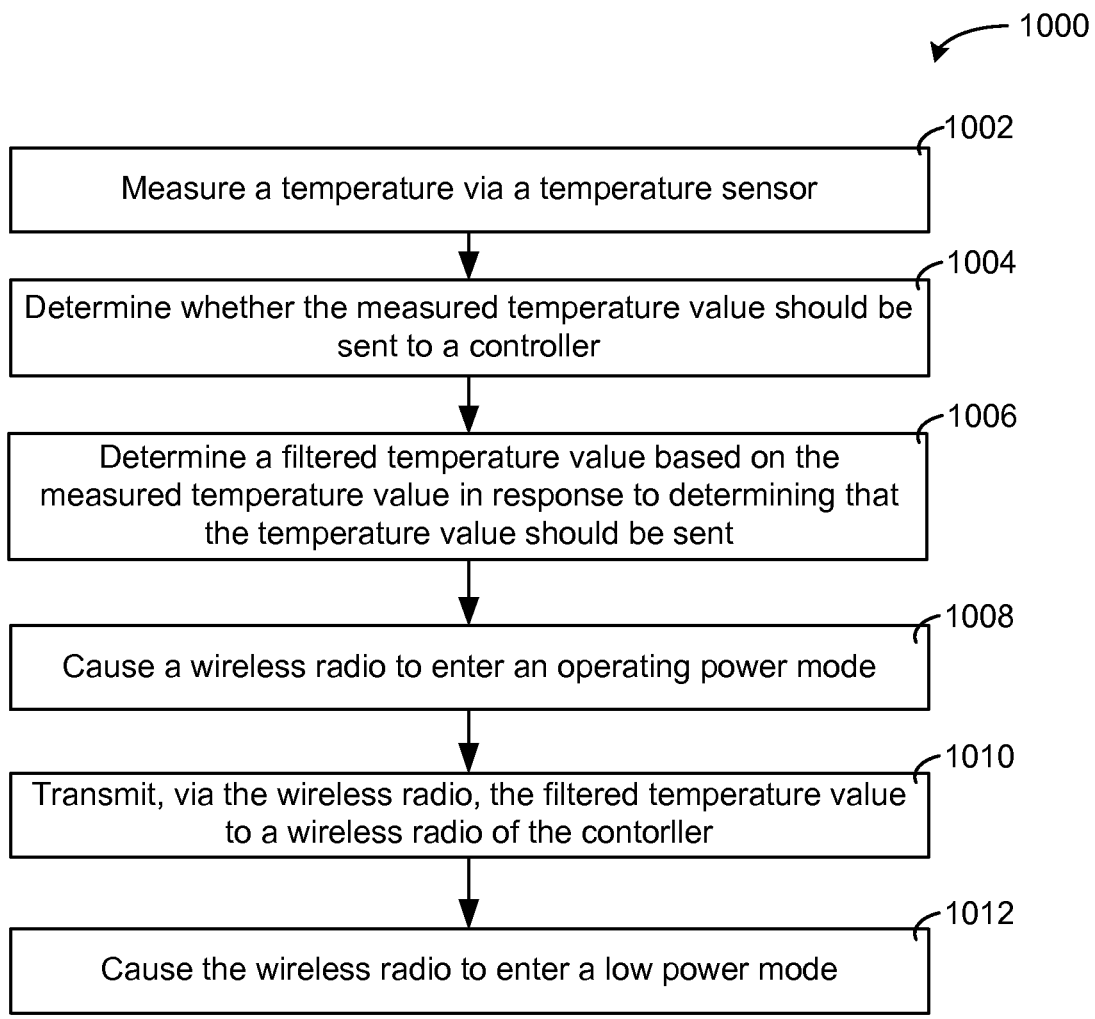
FIG. 10 is a flow diagram of a process for operating the thermostat of FIGS. 9A-9B to transmit a measured temperature to the controller of FIG. 4, according to an exemplary embodiment.

Referring now to FIG. 10, a flow diagram of a process 1000 is shown for efficiently transmitting data from thermostat 404 to controller 410. Thermostat 404 and controller 410 can be configured to perform process 1000. However, any computing device described herein can be configured to perform process 1000. In step 1002, thermostat 404 can be configured to measure a temperature value of a temperature sensor (e.g., temperature sensor 906). In step 1004, thermostat 404 can determine whether the measured temperature should be sent to controller 410. In step 1006, thermostat 404 can be configured to filter the measured temperature (e.g., with a deadband filter) in response to determining that the measured temperature value should be sent to controller 410. Steps 1002-1006 are described in further detail with reference to FIGS. 11-12.

In step 1008, thermostat 404 can cause wireless radio 406 to operate in a normal power level operating mode. A normal power operating mode may be an active mode in which wireless radio 406 is configured to transmit wireless signals. Specifically, wakeup controller 924 can "wakeup" wireless radio 406. In step 1010, thermostat 404 can cause wireless radio 406 to wirelessly transmit a data packet including and/or indicating the filtered temperature of step 1006 to wireless radio 412 of controller 410. In step 1012, wakeup controller 924 can be cause wireless radio 406 to operate in a low power mode. This low power mode may be a "sleep" power mode wherein wireless radio 406 draws a minimal amount of current from power source 904.

Figure 11:
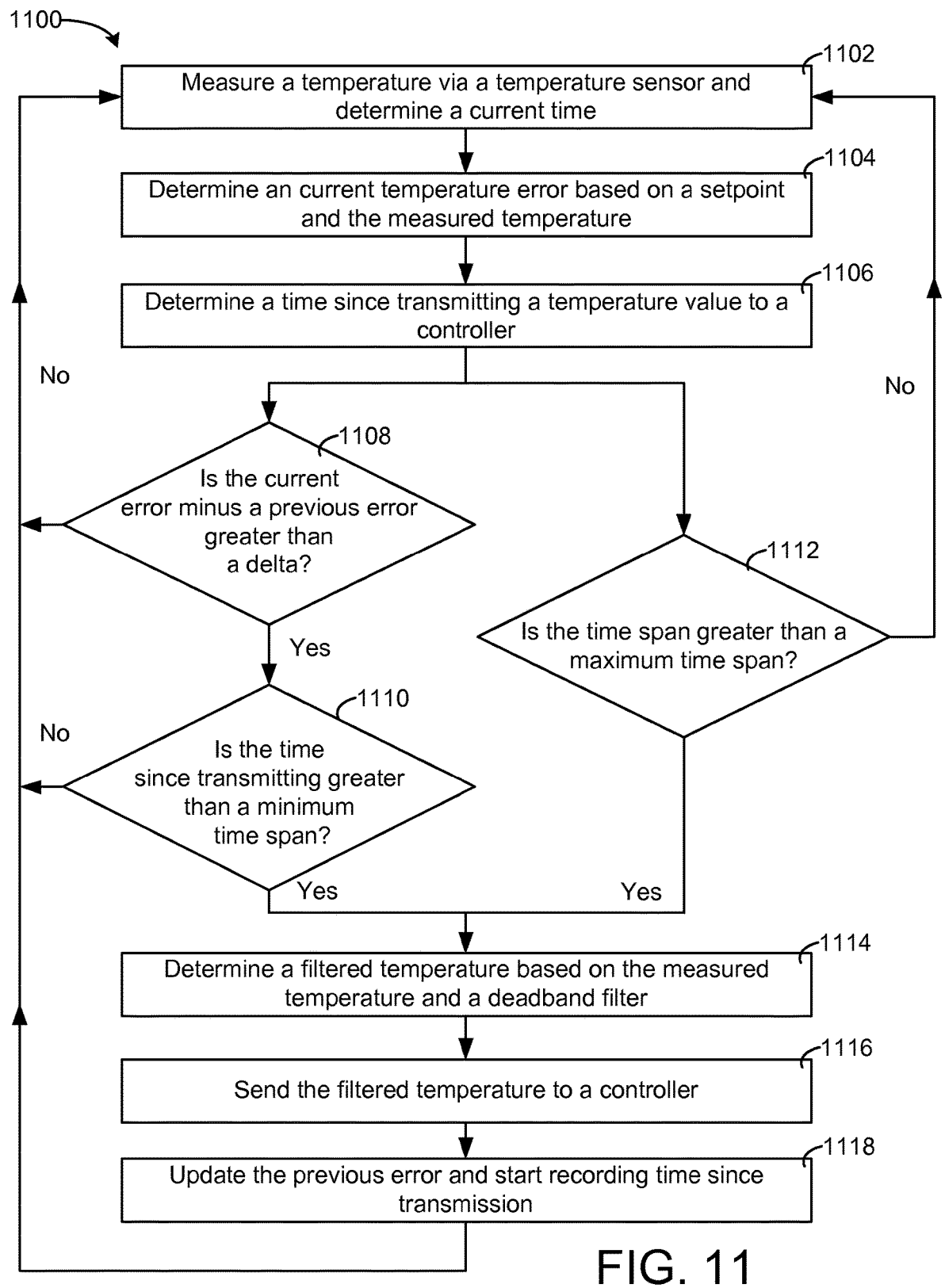
FIG. 11 is a flow diagram of a process for determining whether to transmit a measured temperature to the controller of FIG. 4, according to an exemplary embodiment.

Referring now to FIG. 11, a process 1100 for transmitting measured temperature data from thermostat 404 to controller 410 is shown, according to an exemplary embodiment. Process 1100 illustrates steps 1004 and 1006 of process 1000 of FIG. 10 in greater detail. Thermostat 404 and controller 410 can be configured to perform process 1100. However, any computing device described herein can be configured to perform process 1100. In step 1102, sensor controller 912 can measured a temperature value via temperature sensor 906. Step 1102 may be the same and/or similar to step 1002 of FIG. 10.

In step 1104, error calculator 943 can determine a current error based on the measured temperature of step 1102 and setpoint 945. In step 1106, time calculator 954 can determine how much time has passed since transmitting a temperature value to controller 410. In step 1108, error comparator 946 can determine if the current error determined is greater than a delta (e.g., maximum error such as error threshold 949). If the current error is greater than the delta (e.g., maximum error), process 1100 proceeds to step 1110. In step 1110, minimum time comparator 952 determines if a minimum amount of time has passed since transmitting a temperature value to controller 410. In response to determining that the minimum amount of time has passed, process 1100 proceeds to step 1114, otherwise, process 1100 proceeds to step 1102. Minimum time comparator 952 can compare an amount of time since transmission from time calculator 954 to minimum time 950 to determine if the appropriate amount of time has passed since transmitting a temperature value to controller 410.

In step 1112, maximum time comparator 942 can determine if a maximum amount of time has passed. If a maximum amount of time has passed, thermostat 404 sends the measured temperature value of step 1102 to controller 410. In step 1112, maximum time comparator 942 can determine if the appropriate amount of time has passed by comparing the time since transmission received from time calculator 954 to maximum time 944. In response to determining that the maximum amount of time has passed, process 1100 proceeds to step 1114, otherwise, process 1100 proceeds to step 1102.

Figure 12:
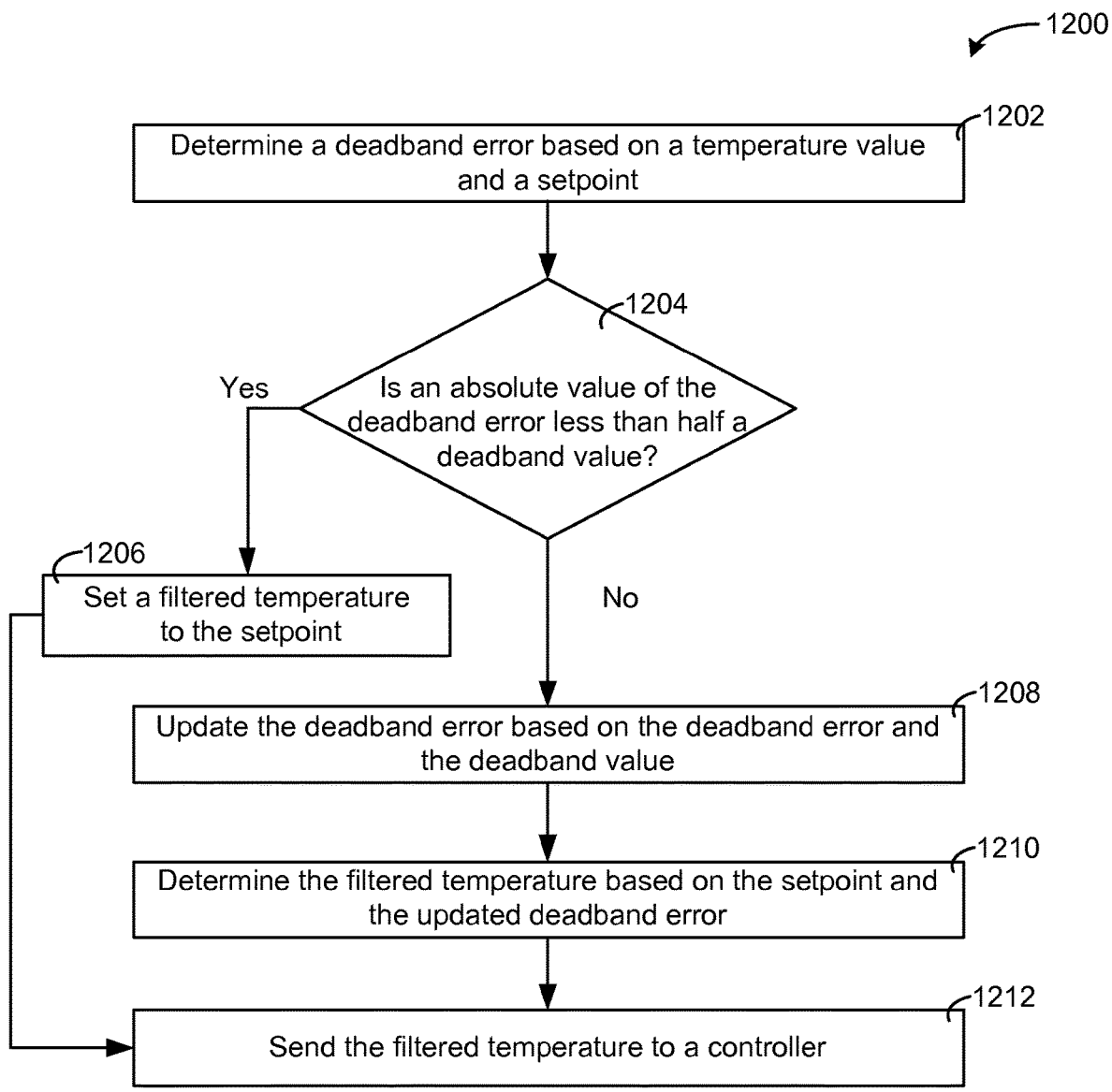
FIG. 12 is a flow diagram of filtering a measured temperature value with the thermostat of FIG. 9 via a deadband filter, according to an exemplary embodiment.

In step 1114, deadband controller 920 can determine a filtered temperature from the measured temperature received from either minimum time comparator 952 or maximum time comparator 942. Deadband controller 920 can apply a deadband filter such as the deadband filter described with reference to FIG. 13A and elsewhere herein. Process 1200 as described with reference to FIG. 12 illustrates step 1114 in greater detail. In step 1116, wireless radio 406 can transmit the filtered temperature determined in step 1112 to controller 410. In Step 1118, the previous error 948 can be updated by error comparator 946 with the measured error. Further, time calculator 954 can begin recording the time since transmitting the filtered temperature value of step 1116. In some embodiments, time calculator 954 updates a previous time value for use in calculating time since transmitting a temperature value to controller 410.

Referring now to FIG. 12, a process 1200 for determining a filtered temperature value with deadband controller 920 as described with further reference to FIGS. 9A-9B and elsewhere herein. Process 1200 may describe step 1114 of FIG. 11 as described with further reference to FIG. 11. In step 1202, deadband controller 920 can determine a deadband error value based on a temperature value such as the measured temperature value of step 1102 of process 1100 as described with further reference to FIG. 11. The deadband error may be a setpoint (e.g., setpoint 945 minus a measured temperature value. In step 1204, deadband controller 920 determines if an absolute value of the deadband error determine in step 1202 is less than or equal to half a deadband value. In response to determining that the absolute value of the deadband error is less than or equal to half the deadband value, deadband controller 920 performs step 1206, otherwise, deadband controller 920 performs step 1208.

In step 1206, deadband controller 920 sets a filtered temperature, a temperature to be wireless transmitted to controller, to the setpoint value. Deadband controller 920 then performs step 1212. In step 1208, deadband controller 920 updates the deadband error determined in step 1202 based on the deadband error of step 1202 and the deadband range. Deadband controller 920 sets the deadband error to be equal to the sign of the deadband error of step 1202 (e.g., positive integer one or negative integer one) multiplied by the absolute value of the deadband error of step 1202 minus half the deadband value. In step 1210, deadband controller determines the filtered temperature value based on the setpoint value and the updated deadband error. In some embodiments, deadband controller 920 determines the filtered temperature to be the setpoint value minus the updated deadband error. Deadband controller 920 can proceed to step 1212 after performing step 1210.

Figures 13A, 13B:
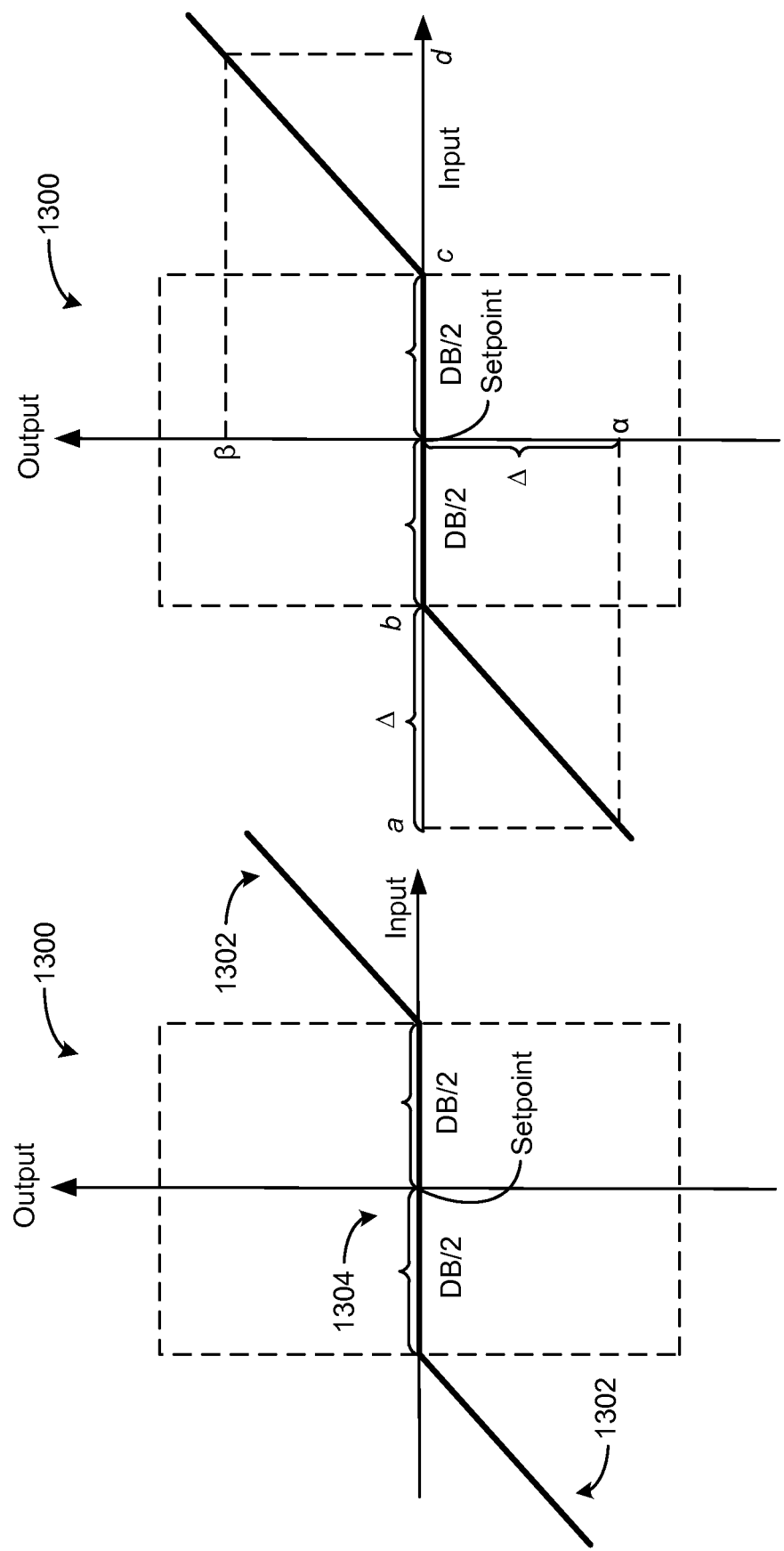
FIG. 13A is an illustration of a deadband filter that can be used by the thermostat of FIG. 9 or the controller of FIG. 4 to filter a measured temperature value, according to an exemplary embodiment.
FIG. 13B is an illustration of a deadband filter filtering temperature values that are determined to be transmitted by a SOD method, according to an exemplary embodiment.

Referring now to FIG. 13A, a graph illustrating a deadband filter 1300 such as the deadband filter implemented by deadband controller 920 is shown, according to an exemplary embodiment. Deadband filter 1300 is shown to have two sections. Slope section 1302 and setpoint section 1304. The vertical axis of the graph shown in FIG. 13 represents output of deadband filter 1300. The horizontal axis of deadband filter 1300 represents the input to the deadband filter 1300 (e.g., measured temperature). As can be seen, in FIG. 13, the horizontal axis is positioned at the setpoint value. For this reason, if the input falls within a positive offset or negative offset (e.g., half a deadband value) from the origin, the output of the filter is the setpoint. If the input is outside setpoint section 1304, the output is linear a function of the input.

As an example, referring to the piecewise function below, $y_{out}$ is the output of deadband filter 1300 while $y_{in}$ is the input of deadband filter 1300. The top portion of the piecewise function below represents setpoint section 1304. The bottom portion of the piecewise function below represents slope section 1302 of deadband filter 1300 shown in FIG. 13.

$$y_{out} = \begin{cases} r & \text{if } |r - y_{in}| \leq \frac{1}{2}DB \\ r - \text{sign}(r - y_{in})\left(|r - y_{in}| - \frac{1}{2}DB\right) & \text{if } |r - y_{in}| > \frac{1}{2}DB \end{cases}$$

Referring now to FIG. 13B, deadband filter 1300 is shown to illustrate a case where two consecutive transmissions are both the setpoint, according to an exemplary embodiment. In some embodiments, a deadband filter outputs the setpoint as a value to be transmitted for two consecutive measured temperature values, thus, the same value may be transmitted twice. This may not significantly impact control performance, however, it may be unnecessary to transmit the same value twice. In some embodiments, like the embodiment shown in FIG. 7B, the order that the SOD method and the deadband filter can be reversed. By first filtering measured temperature values with a deadband filter (e.g., DB controller 707), and then determining based on the filtered temperatures which temperature values to send via the SOD method (e.g., SOD controller 706), cases where the same value is transmitted twice can be avoided.

In FIG. 13B, deadband filter 1300 is shown with various markers, α, β, a, b, c, and d. Markers a, b, c, and d represent inputs which have corresponding outputs α, setpoint, setpoint, and β. Inputs a, b, c, and d are shown to be separated by Δ. The term Δ may be a maximum temperature change or maximum error change that is used in the SOD method. Assuming that the SOD method is being implemented before deadband filter 1300 (e.g., as illustrated in FIG. 7A) the first temperature input to the deadband filter 1300 is a, the corresponding output to be transmitted is α. After the input changes by Δ, the second temperature input to deadband filter 1300 is b which has a corresponding output of the setpoint. After another change by Δ, the third input to deadband filter 1300 is c which a corresponding output of the setpoint. After another change by Δ the third temperature input to deadband filter 1300 is d which has a corresponding output of β. As can be seen, inputs b and c have the same output, the setpoint.

If deadband filter 1300 is implemented before the SOD method, as illustrated in FIG. 7B, the first input a to the deadband filter 1300 would result in an output of α which the SOD method would transmit. The next input, b, to the deadband filter would result in an output of the setpoint. The SOD method would determine that the temperature has changed by and/or by more than Δ and the setpoint would be transmitted. When deadband filter 1300 receives input c, deadband filter 1300 would output the setpoint. Since the last input to the SOD method was the setpoint, the SOD method would determine that no value should be transmitted, i.e., there is no difference between the two setpoint values that would cause the SOD method to transmit the setpoint a second time. The third input to the deadband filter 1300, d, would result in an output of β from the deadband filter 1300 which the SOD method would see as a change greater than Δ from the setpoint. In this regard, with the deadband filter 1300 being implemented before the SOD method as illustrated in FIG. 7B, only three temperature values may be transmitted. However, with the deadband filter 1300 being implemented after the SOD method as illustrate din FIG. 7A, four temperature values may be transmitted.

Figure 13C:
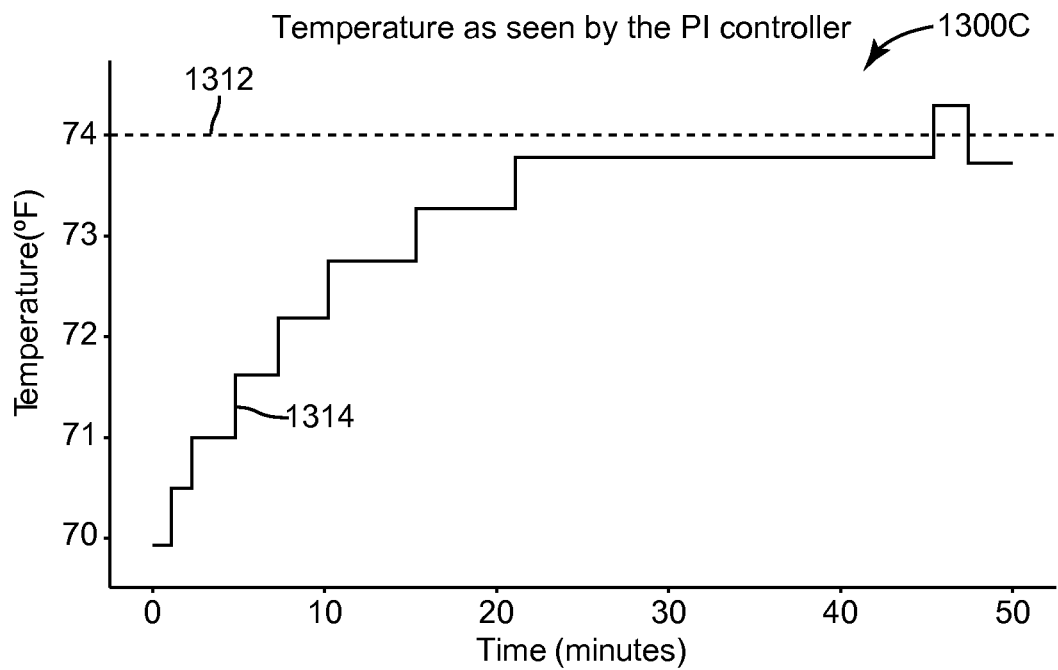
FIG. 13C is a graph of temperature values transmitted to a controller without being filtered by a deadband controller, according to an exemplary embodiment.
Figure 13D:
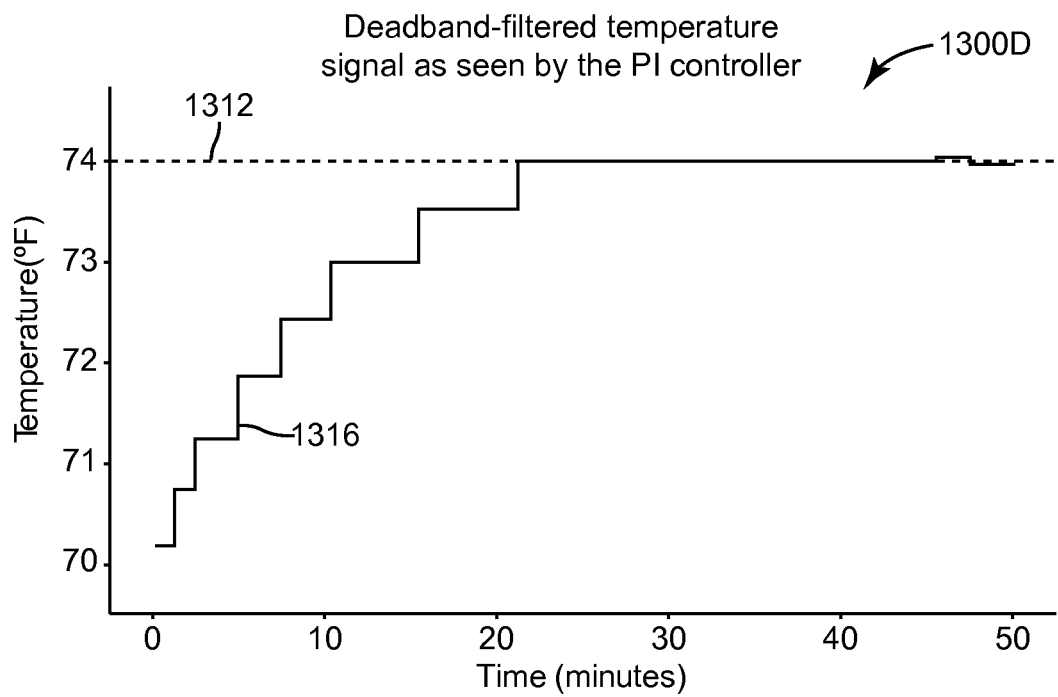
FIG. 13D is a graph of temperature values transmitted to a controller where the transmitted temperature values are filtered by a deadband controller, according to an exemplary embodiment.

Referring now to FIGS. 13C-D, graphs 1300C and 1300D illustrate the use of a deadband filter are shown, according to exemplary embodiments. In FIG. 13C, no deadband filter is used. As can be seen, the setpoint 1312 is at 74 degrees Fahrenheit. In FIG. 13C, the measured temperature 1314 is shown to remain below setpoint 1312 for a long period of time, about 25 minutes. Since there is substantial error between setpoint 1312 and the measured temperature 1314, any temperature value transmitted from thermostat 404 to controller 410 will have the same substantial error. Since transmissions of the temperature value is periodic and/or whenever the temperature has changed by a predefined amount, controller 410 may see an amount of error that it continues to attempt to compensate for. This may create additional error.

FIG. 13D illustrates the use of a deadband filter. Filtered temperature 1316 may be measured temperature 1314 that is filtered by a deadband filter. As can be seen in FIG. 13D, just after 20 minutes, filtered temperature 1316 is equal to setpoint 1312. This may be caused by the deadband filter. This reduction in error may prevent controller 410 from creating artificial error and may avoid any unnecessary integrations of a PI controller of controller 410. In FIGS. 13C-13D the delta (e.g., the maximum amount of change in temperature before sending a temperature value) may be 0.5 degrees Fahrenheit which may also be the same as the deadband range (e.g., DB) of the deadband used to filter measured temperature 1314.

Figure 13E:
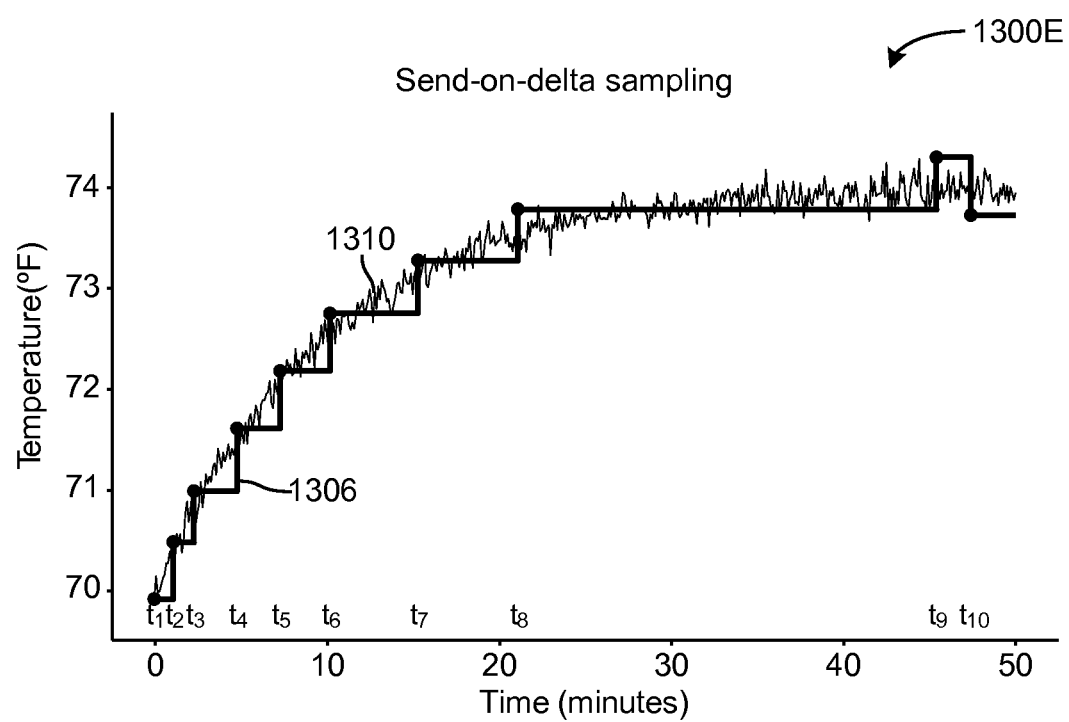
FIG. 13E is a graph illustrating wireless transmissions of a SOD method, according to an exemplary embodiment.

Referring now to FIG. 13E, graph 1300E illustrates the reduction in transmitted temperature values by thermostat 404 using the SOD method, according to an exemplary embodiment. Ambient temperature 1310 is shown to change from 70 degrees Fahrenheit to approximately 74 degrees Fahrenheit over fifty minutes. However, as can be seen by markers $t_1$, $t_2$, $t_3$, $t_4$, $t_5$, $t_6$, $t_7$, $t_8$, $t_9$, and $t_{10}$, thermostat 404 only transmits ten total temperature values it measures over the fifty minute period. In FIG. 13C, the SOD method uses a maximum temperature change, Δ. If the measured temperature change has changed by Δ, thermostat 404 transmits the measured temperature value to controller 410. As can be seen, the difference in temperature of $t_1$ and $t_2$ may be Δ, thus $t_2$ may be transmitted. This same difference may occur between $t_2$ and $t_3$, $t_3$ and $t_4$, $t_4$ and $t_5$, $t_5$ and $t_6$, $t_6$ and $t_7$, $t_7$ and $t_8$, $t_8$ and $t_9$, and between $t_9$ and $t_{10}$. Between $t_8$ and $t_9$, the measured temperature does not change and thus approximately 25 minutes pass without transmitting a temperature value to controller 410.

In FIG. 13E, thermostat 404 transmits ten temperature values to controller 410. If thermostat 404 was transmitting temperature values every minute, this would be a total of fifty transmissions. In FIG. 13C, using the SOD method results in an 80% reduction in transmitted temperature values.

Simulation Model and Simulation Results

Figure 14:
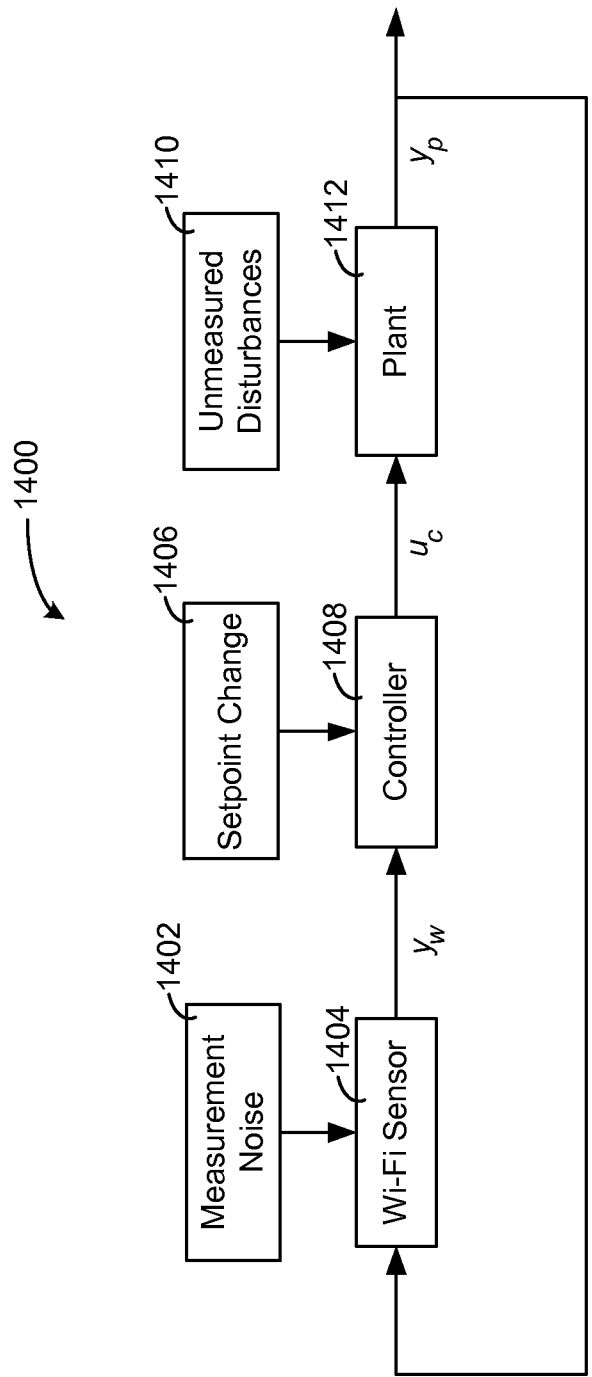
FIG. 14 is a block diagram of a simulation model, according to an exemplary embodiment.

Referring now to FIG. 14, a model 1400 modeling the systems and methods described herein for use in simulating the functionality of the systems and methods described herein is shown, according to an exemplary embodiment. The results of the simulation performed with model 1400 are shown in FIGS. 15-19. This simulation compares the performance of the systems and methods (e.g., the SOD method) described herein with fixed sampling configurations.

Plant 1412 may be any kind of device in the physical world (e.g., actuator). In the simulation, plant 1412 can represented with a transfer function such as the transfer function shown below. The parameters $\tau_p$ and L are the time constant and time delay of plant 1412, respectively. Typical values for these parameters when representing a zone temperature model may be $\tau_p$=900 seconds and L=30 seconds.

$$P(s) = \frac{1}{(1 + \tau_p s)} e^{-Ls}$$

As shown, plant 1412 is perturbed with setpoint changes 1406 (e.g., a step change in a setpoint) and unmeasured disturbances 1410. These perturbations are cyclic signals introduced at intervals long enough to achieve a steady state condition. In the simulation, controller 1408 was a PRAC-PI control method operating with different sampling rates. The rates tested were 1, 2, 4, 6, 8 and 10 minute sampling rates. Different noise levels (i.e., measurement noise 1402) were added to the output measurements of Wi-Fi sensor 1404 in the simulation. Wi-Fi sensor 1404 in the physical world may be any kind of wireless sensor, thermostat, or other device that measures temperature and wirelessly transmits the measured temperature to a controller. In the simulation, measurement noise 1402 was Gaussian noise sequences with standard deviations of 0.001, 0.01, and 0.1. In the simulation, the SOD method was compared against a baseline case. The baseline case was a case where the measurements were sampled at a fixed interval. Another case tested was adaptively changing the sampling rate depending on the time constant, $\tau_p$, of plant 1412.

The SOD method was tested using four different $\Delta t_w^{max}$ values (e.g., maximum time 944). The values tested were 4, 8, 10 and 60 minutes. The value for $\Delta e$ (e.g., error threshold 949) used in the simulation was $\Delta e$=0.1. The value for deadband range used in the simulation was DB=0.05. In the simulation, optimal parameters for the PI controller of controller 1408 were divided by 2 to produce initial values for the controller gain and integral time. This was done to test whether the PRAC-PI controller has acceptable performance despite starting with sub-optimal parameters.

The value $\Delta t_w^{min}$ used in the simulation was set to the sampling rate used by the PRAC-PI controller. In all the simulations run with model 1400, the conditions were kept constant and the type of sampling method used was changed so that the types of sampling methods could be compared.

Figure 15:
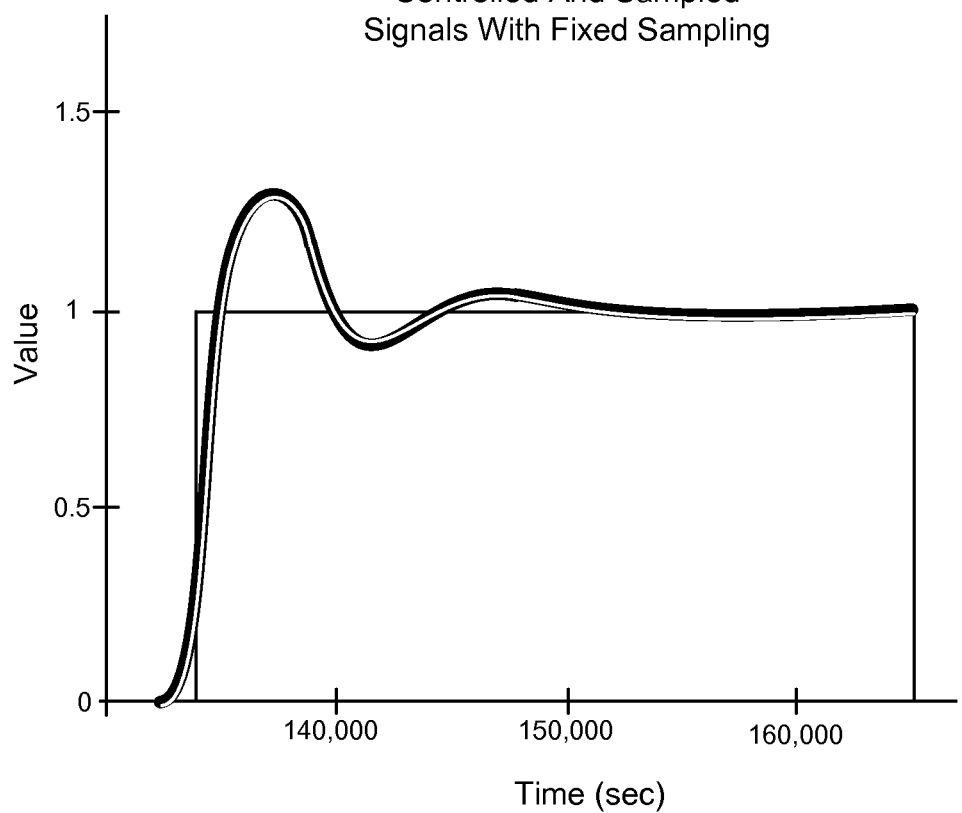
FIG. 15 is a chart of simulation results of a fixed sampling method performed with the simulation model of FIG. 14, according to an exemplary embodiment.
Figure 16:
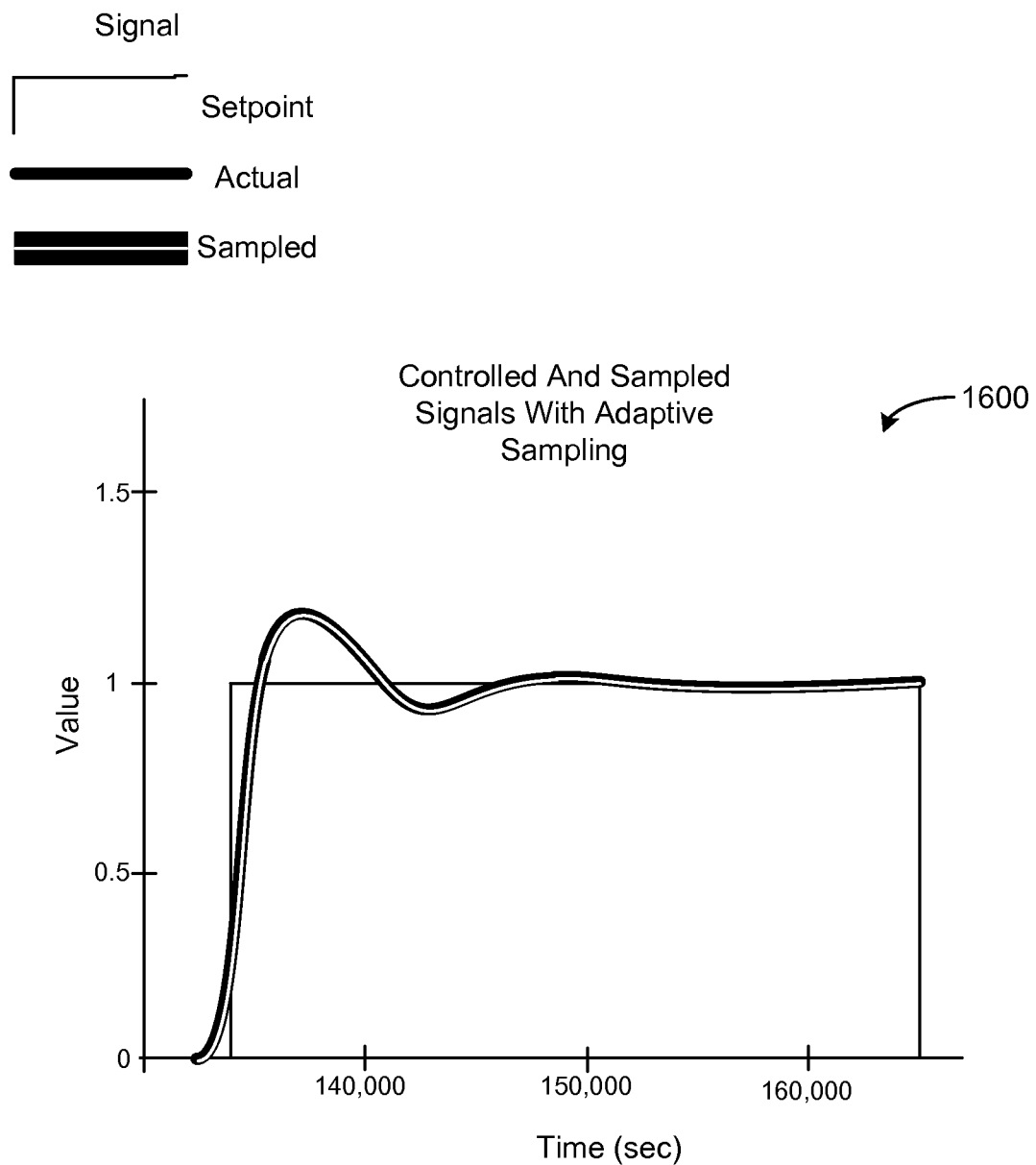
FIG. 16 is a chart of simulation results of an adaptive sampling method performed with the simulation model of FIG. 14, according to an exemplary embodiment.
Figure 17:
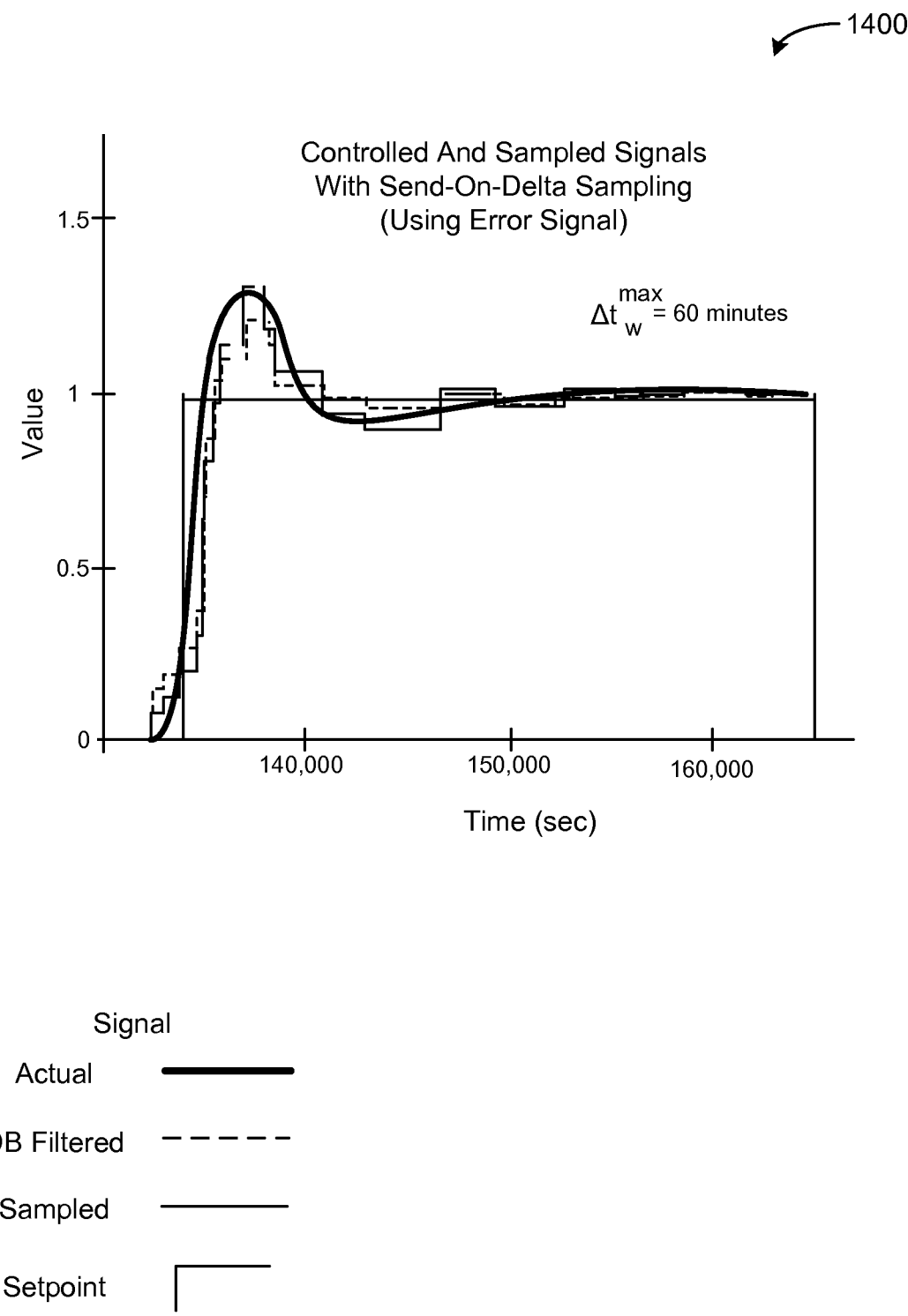
FIG. 17 is a chart of simulation results of a send-on-delta method utilizing setpoint error performed with the simulation model of FIG. 14, according to an exemplary embodiment.

Referring now to FIGS. 15-19, the simulation results performed with model 1400 as described with reference to FIG. 14 is shown. FIGS. 16-17 show the controlled and sampled signals for the baseline with a fixed sampling rate of 1 minute, an adaptive sampling approach, and the send-on-delta method with $\Delta t_w^{max}$=60 minutes.

Referring more particularly to FIGS. 15-16, graph 1500 illustrates a fixed sampling method for model 1400 while graph 1600 is shown illustrating an adaptive sampling method for model 1400. Fixed sampling may be transmitting a temperature value from Wi-Fi sensor 1404 at a fixed period. Adaptive sampling may be transmitting the temperature value from Wi-Fi sensor 1404 to controller 1408 whenever the temperature value or a temperature error value changes by a predefined amount. As can be seen, the adaptive sampling method illustrated in graph 1600 outperformed the fixed sampling method illustrated in graph 1500. The actual temperature, represented by the bold line, is closer to the setpoint value in graph 1600 as compared to graph 1500.

Figure 18:
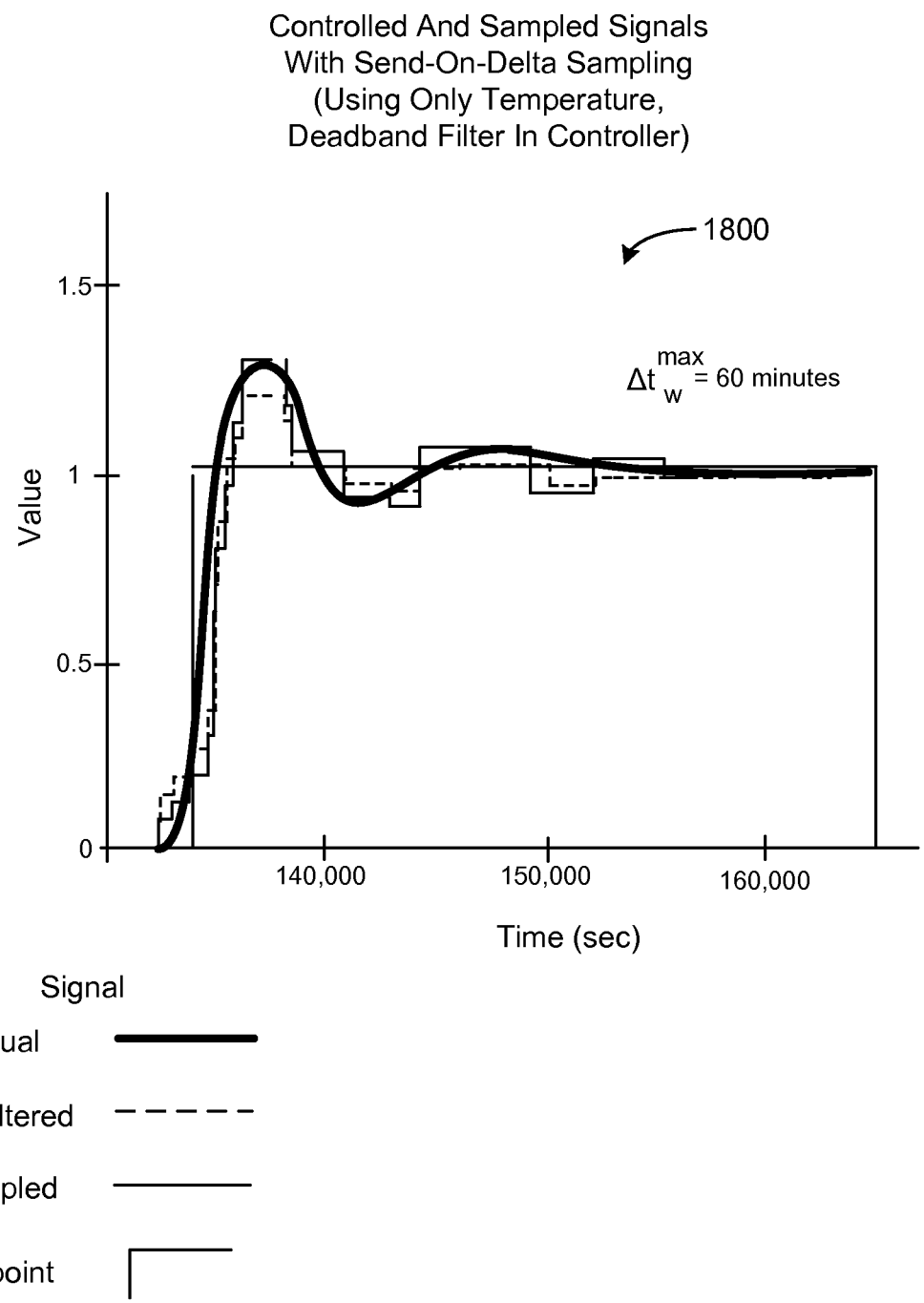
FIG. 18 is a chart of simulation results of a send-on-delta method utilizing temperature with a controller implementing a deadband filter with the simulation model of FIG. 14, according to an exemplary embodiment.

Referring more particular to FIGS. 17-18, FIGS. 17-18 illustrates the SOD method operating based on setpoint error, plot 1700, and on the temperature measurement with the deadband filter being implemented by controller 1408, plot 1800 respectively. In FIGS. 15-16, it can be seen that in the baseline and adaptive sampling case, the measured variable reaches the setpoint. In these cases, the baseline case has a sample rate of 1 minute, while the adaptive sampling case produces a sample rate of approximately 2 minutes. In FIGS. 17-18, in the send-on-delta case plant 1412 output gets very close to the setpoint, but does not reach it completely. This is due to the effects of $\Delta e$ and DB. The average sample rate in this case is 20 minutes. This is a large reduction in the transmission rate of the signals which may result in higher energy efficiency for thermostats that use the SOD method. This reduction in signal transmission rates happens because when the plant is almost at setpoint, the sensor does not send signals until the maximum waiting period has been reached. Plot 1800 also illustrates that the signal is sent to the controller at a fast rate when a disturbance enters the plant, which in this case was setpoint change 1406.

Figure 19:
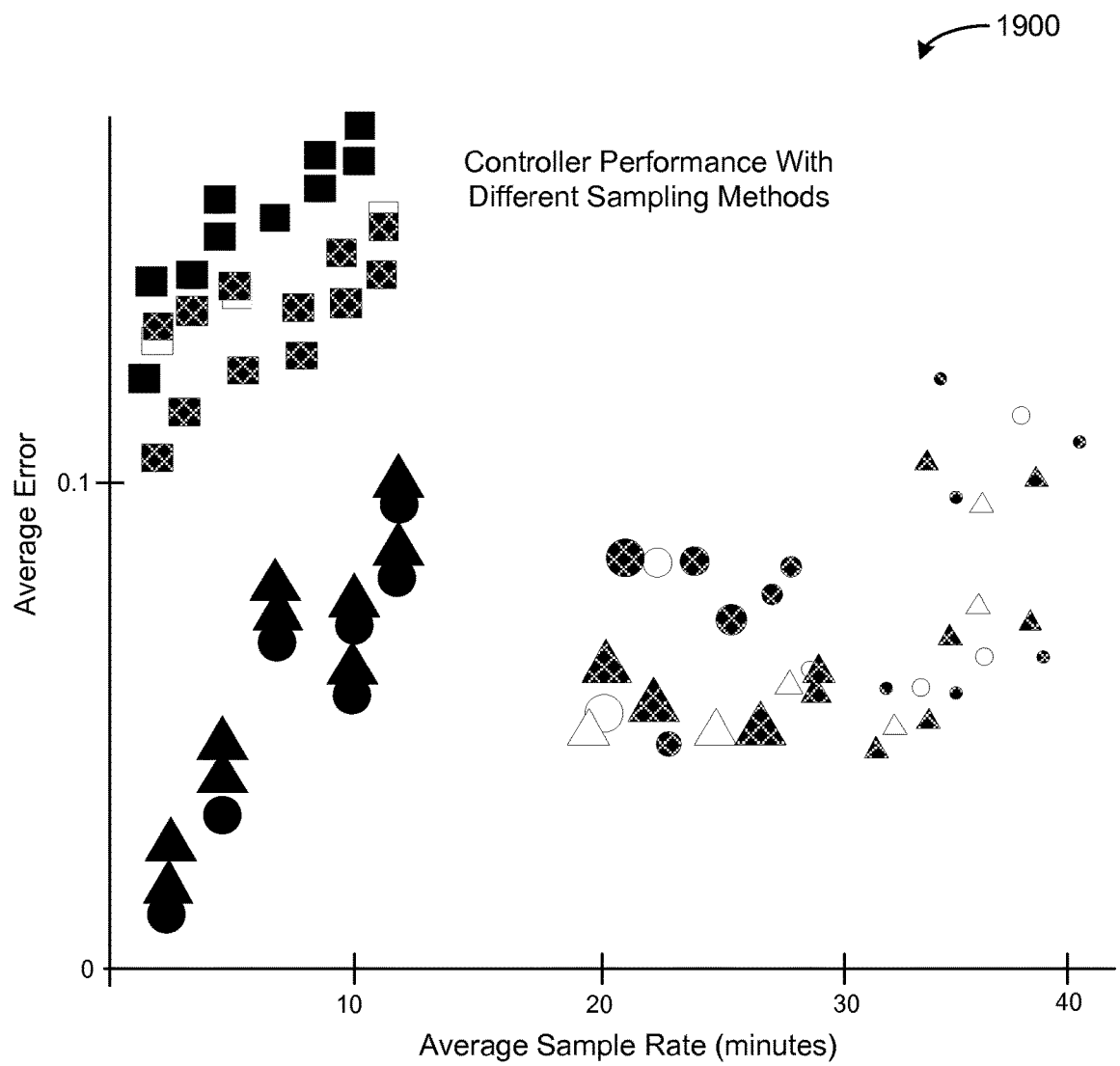
FIG. 19 is a chart of simulation results of the simulation model of FIG. 14 illustrating the performance of various data transmission methods, according to an exemplary embodiment.

Referring more particularly to FIG. 19, plot 1900 illustrates the performance of the baseline (e.g., fixed interval sampling represented by the black markers), the SOD method with $\Delta t_w^{max}$=60 minutes (e.g., "SOD60" represented by the white markers), and the SOD method with $\Delta t_w^{max}$=60 minutes and a deadband filter in the controller (e.g., "SOD60NoSP" represented by the lined markers).

Plot 1900, illustrates the performance achieved by the controller with the different sampling configuration. The x-axis shows the average sample rate in minutes for all three methods while the y-axis shows the amount of average setpoint error. The shape of the markers on plot 1900 (e.g., circle, triangle, square) represents the noise level used. A circle represents 0.001 standard deviation for the noise used in the simulation, a triangle represents 0.01 standard deviation of the noise used in the simulation, while the square represents 0.1 standard deviation of the noise used in the simulation. The size of each marker illustrates how much an actuator (e.g., plant 1412) moved based on each of the three methods.

Plot 1900 shows that most of the results for the SOD method with $\Delta t_w^{max}$=60 minutes (i.e., SOD60) have average sample rates above 20 minutes, and an average error around 0.1. The performance of the SOD method $\Delta t_w^{max}$=60 minutes as compared with other methods indicates that the performance of the SOD method does not suffer in terms of performance.

Based on the simulation results shown in plot 1900, the largest errors happened when the noise levels were large (i.e., 0.1 standard deviation) relative to the size of setpoint changes 1406 and unmeasured disturbances 1410. Plot 1900 also shows the SOD method applied to the temperature only with the deadband is performed by controller 1408 (i.e., SOD60NoSP). These results can be seen to be very similar to the method using the error signal (i.e., SOD60). Overall, the SOD method based on error and/or temperature showed a high performance.

Additional Simulation and Results

Referring again to FIG. 14 model 1400 can be used to perform additional testing. A simulation may be performed with model 1400 to compare the performance of the SOD method and fixed sampling methods. Plant 1412 of model 1400 may approximate the dynamic behaver of the ambient temperature of a particular zone. Controller 1408 may be a PI controller with adaptive tuning provided by a PRAC controller. Model 1400 shows three types of perturbations, measurement noise 1402, setpoint changes 1406, and unmeasured disturbances 1410.

Measurement noise 1402 may be normally distributed sequences with zero mean and a standard deviation of 0.001, 0.01, and 0.1 for noise levels. Setpoint change 1406 may be setpoint changes that are unit square wave signals that have periods that are long enough to allow model 1400 to achieve a steady state. The period may be a function of the process time constant and the sampling rate used in the fixed sampling algorithm. In this simulation the DB may be equal to 0.1. The rates tested were 1, 2, 4, 6, 8 and 10 minute sampling rates for fixed sampling.

A simulation was performed with model 1400 for four test cases. The "Fixed" test case refers to fixed sampling. The SOD method and a deadband filter in Wi-Fi sensor 1404 is referred to as "$SOD_1$." Operating the SOD method in Wi-Fi sensor 1404 with no setpoint information and a deadband filter in controller 1408 is referred to as "$SOD_2$." Operating the SOD method with no deadband in the controller and not setpoint information in Wi-Fi sensor 1404 is referred to as "$SOD_3$." For these four cases, A (e.g., a maximum error or maximum temperature difference) was 0.1, $\Delta t_w^{max}$ was set to sixty minutes and $\Delta t_w^{min}$ was set equal to the sampling rate of the "Fixed" method.

In this simulation, a total of 144 different simulations were performed. This was due to the fact that four sampling methods were tested (i.e., Fixed, $SOD_1$, $SOD_2$, $SOD_3$), six sampling rates were tested, two different disturbances were used, and three different noise levels were used. The results of the 144 different simulations are shown in FIGS. 20-23.

Referring now to FIGS. 20-23 the performance results of the Fixed, $SOD_1$, $SOD_2$, and $SOD_3$ methods are shown in graphs 2000-2300. In graphs 2000-2300, the x-axis shows the average transmission intervals while the y-axis shows the performance metric, which is specific to each of graphs 2000-2300. In graph 2000 the performance metric is average setpoint error while in graph 2100 the performance metric is the ratio of setpoint error in each of $SOD_1$, $SOD_2$, $SOD_3$ methods compared to the Fixed method. In graph 2200 the performance is ratio of average actuator effort as compared to the Fixed method while in graph 2300 the performance metric is the ratio of average actuator effort as compared to $SOD_1$.

In FIGS. 20-23 the shape of each marker represents the type of disturbance used in the simulation. The circles correspond to setpoint changes while the triangles correspond to unmeasured process disturbances. The size of each marker represents the standard deviation of measurement noise 1402. The smallest markers correspond to a standard deviation of 0.001, the medium size points correspond to a standard deviation of 0.01, while the largest points correspond to a standard deviation of 0.1.

Figure 20:
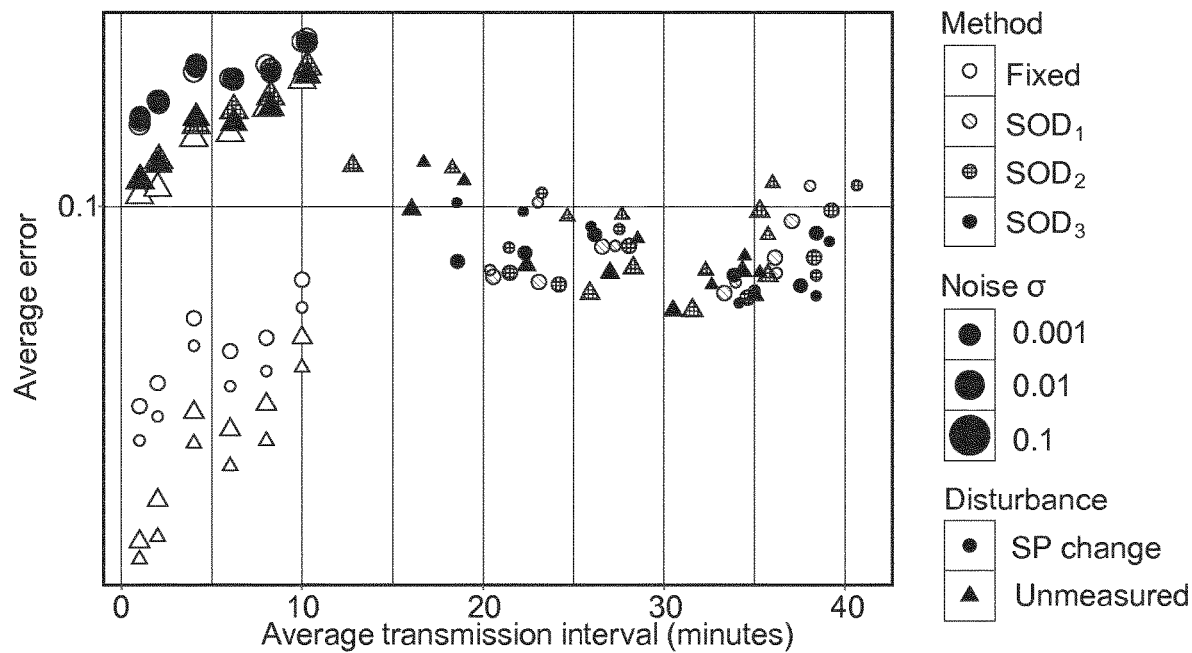
FIG. 20 is a graph of simulation results of the model of FIG. 14 illustrating average error of various data transmission methods, according to an exemplary embodiment.

Referring more particularly to FIG. 20, graph 2000 illustrates the average setpoint errors for the various methods tested, Fixed, $SOD_1$, $SOD_2$, and $SOD_3$. The Fixed method is shown to have the lowest error with a transmission interval around 1 minute and low noise levels (e.g., 0.001 and 0.01). For higher noise levels (e.g., 0.1), the average setpoint error increased for the Fixed method. For low noise levels (e.g., 0.001 and 0.01) the SOD methods, $SOD_1$, $SOD_2$, $SOD_3$, have average transmission intervals between 20 and 40 minutes with an average setpoint error generally below 0.1. For large noise levels (e.g., 0.1), the average error for the SOD methods, $SOD_1$, $SOD_2$, $SOD_3$, and the Fixed method were approximately the same. This is further illustrated in FIG. 21.

Figure 21:
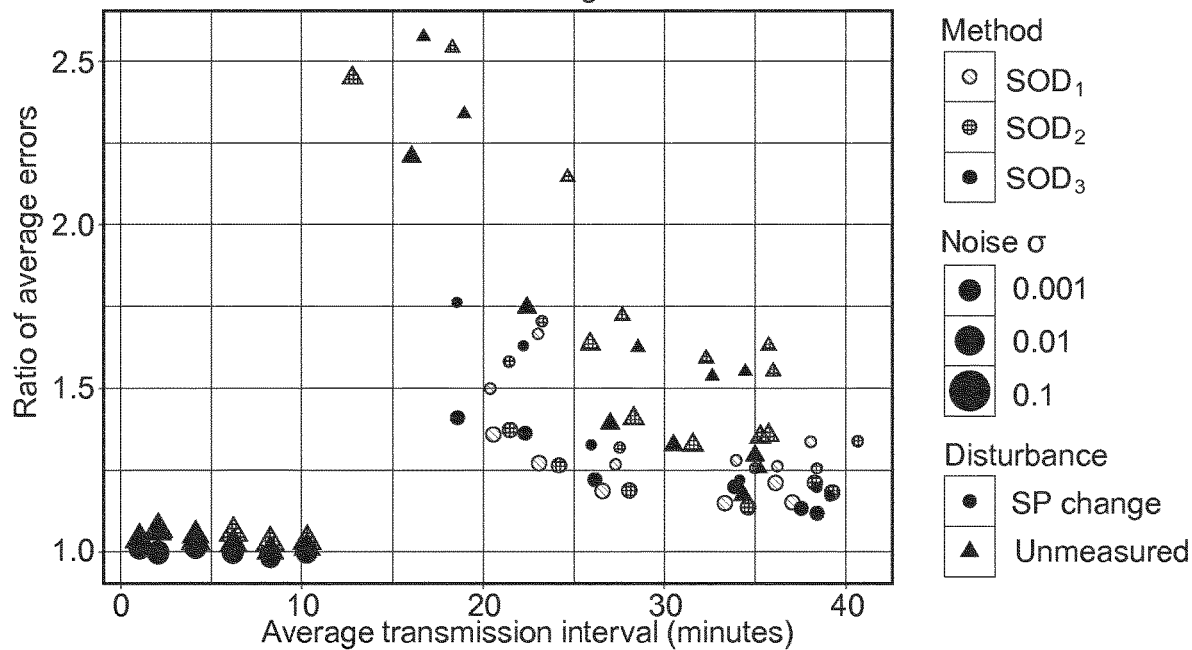
FIG. 21 is a graph of simulation results of the model of FIG. 14 illustrating average error of various data transmission methods as compared to a baseline transmission method, according to an exemplary embodiment.

Referring more particularly to FIG. 21, graph 2100 illustrates the ratio of the average setpoint error for the SOD methods as compared to the Fixed method. For large noise levels (e.g., 0.1), the SOD methods were approximately 1 for all disturbance types, i.e., were the average setpoint error was approximately the same for the SOD methods as for the Fixed method. For smaller noise levels (e.g., 0.001 and 0.01) the ratio increases above 1. The ratio of average setpoint errors is the largest when there are unmeasured disturbances in the simulation (e.g., the triangle markers around the 2.5). As can be seen in FIG. 21, the ratio of setpoint errors is similar for all SOD methods. However, as illustrated in FIGS. 22-23, the SOD methods cause different amounts of actuator effort.

Figure 22:
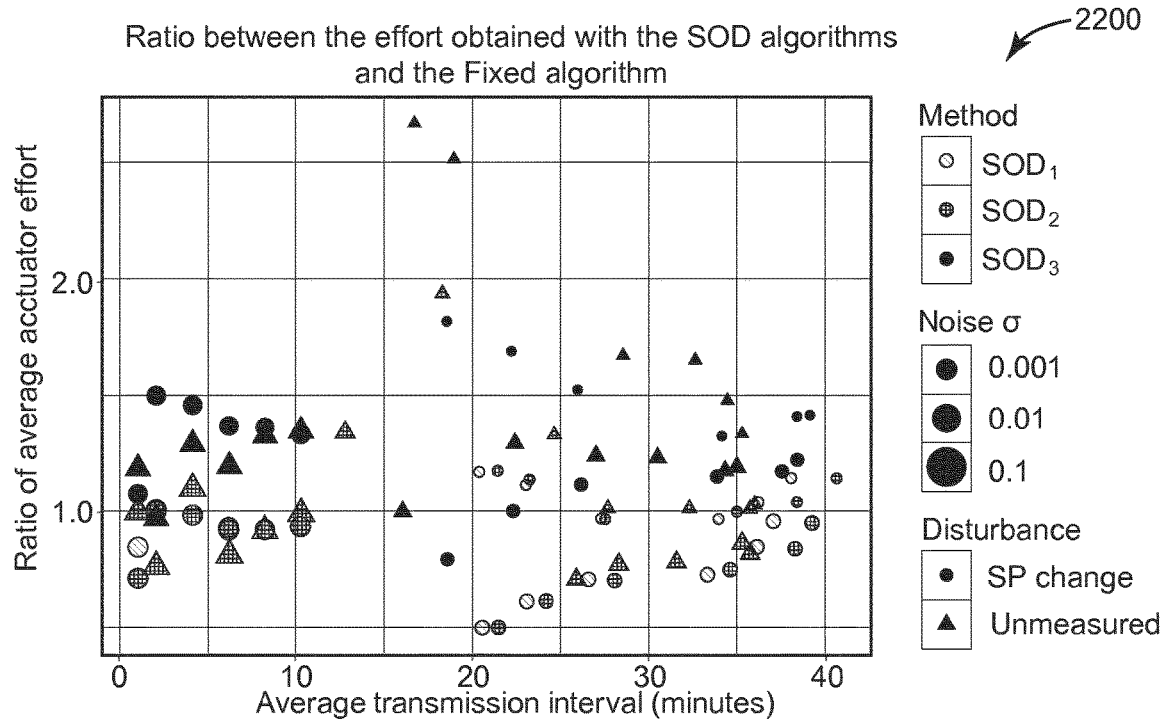
FIG. 22 is a graph of simulation results of the model of FIG. 14 illustrating average actuator effort of various data transmission methods as compared to a baseline transmission method, according to an exemplary embodiment.

Referring more particularly to FIG. 22, in graph 2200 the ratio of average actuator effort of the SOD methods as compared to the Fixed method is shown. As can be seen, there is a difference between the ratio of average actuator effort between the SOD algorithms that use the deadband filter (i.e., $SOD_1$ and $SOD_2$) and the SOD method that does not use the deadband filter (i.e., $SOD_3$). The effort ratios for $SOD_1$ and $SOD_2$ are generally below 1 in graph 2200 while the ratio of average actuator effort for $SOD_3$ is generally above 1 in graph 2200.

Figure 23:
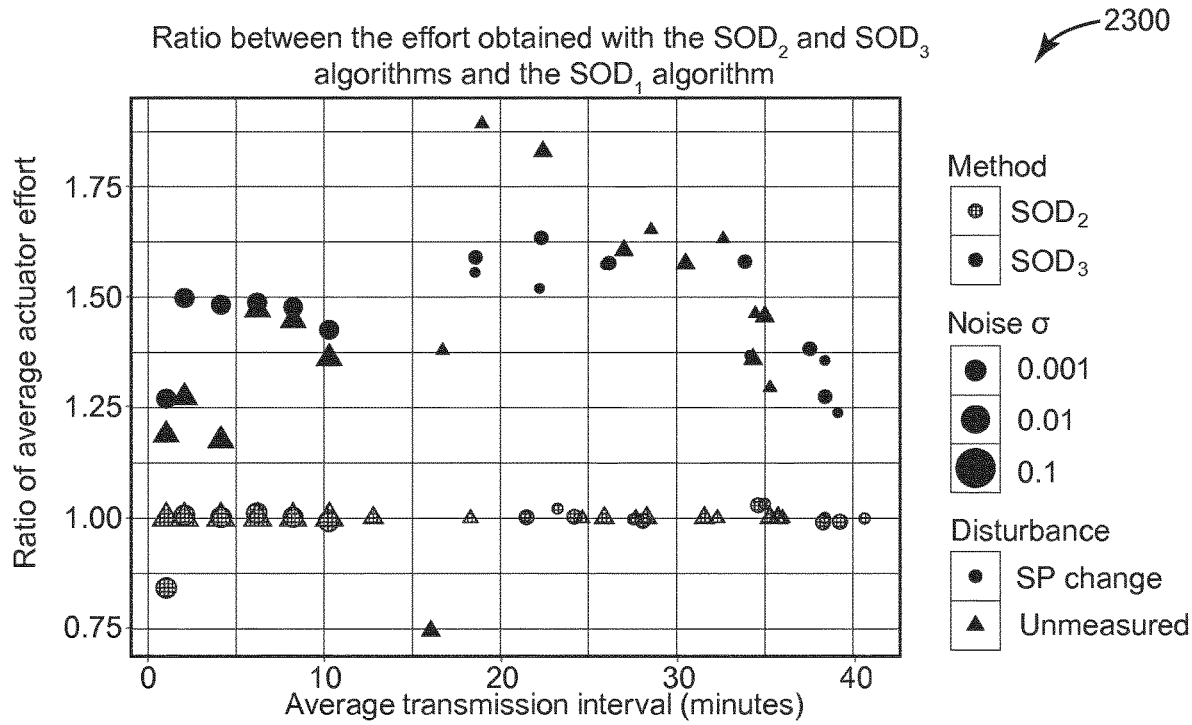
FIG. 23 is a graph of simulation results of the model of FIG. 14 illustrating average actuator effort of various data transmission methods as compared to another data transmission method, according to an exemplary embodiment.
Figure 25A:
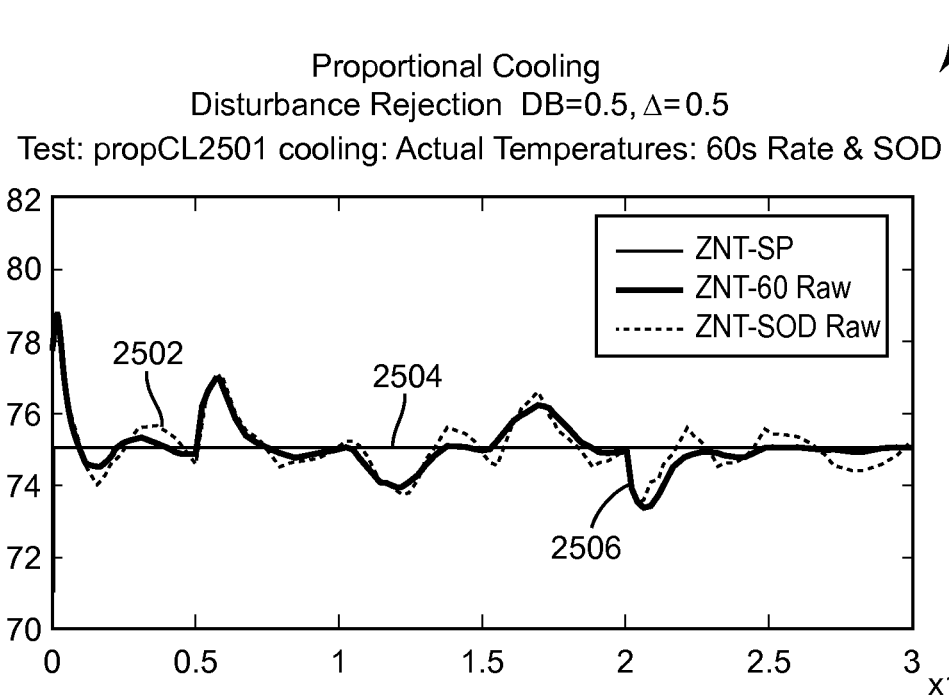
FIGS. 25A-D are graphs illustrating a disturbance rejection test results of the model of FIG. 24 for proportional cooling, according to an exemplary embodiment.
Figure 25B:
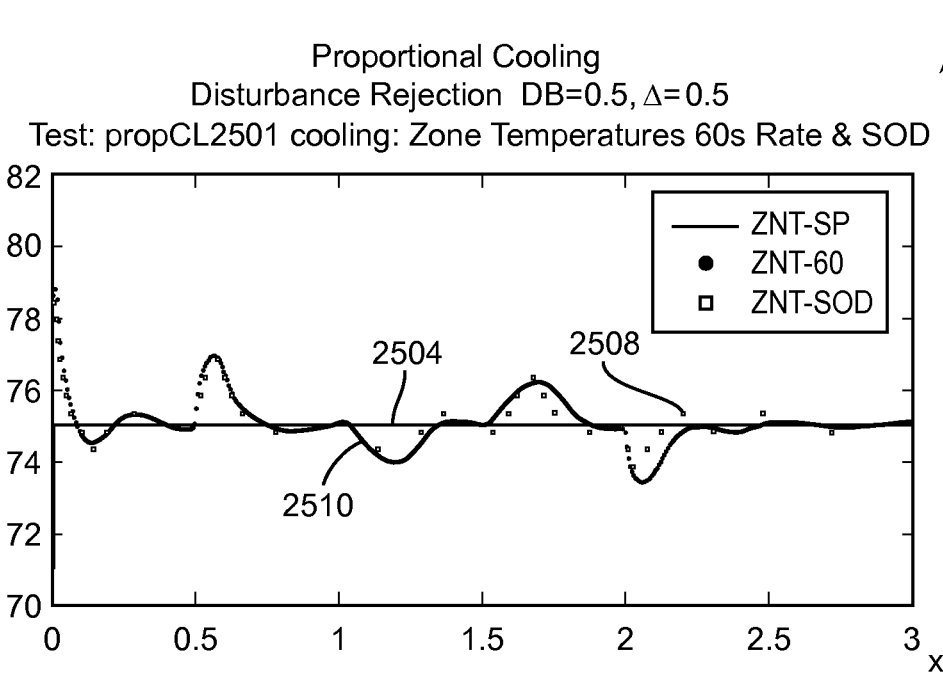
Figure 25C:
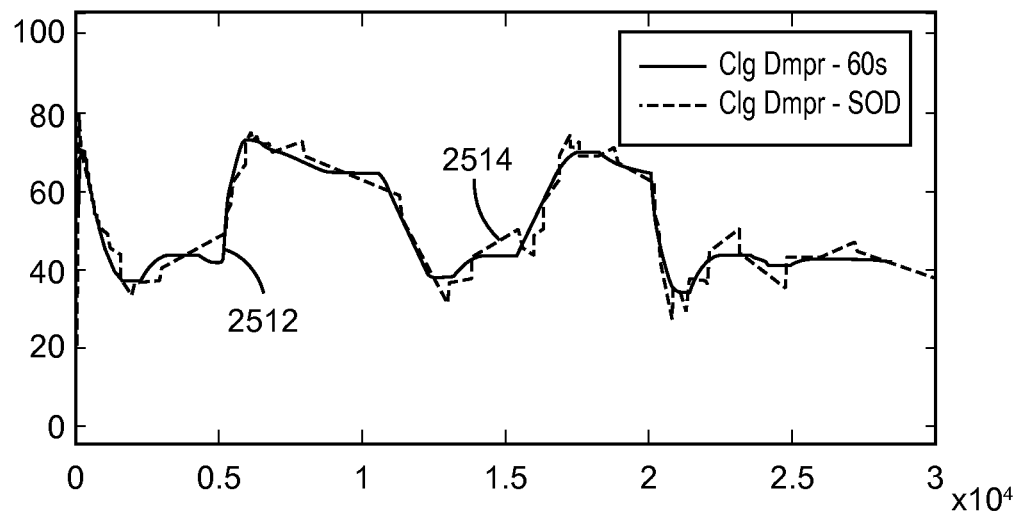
Figure 25D:
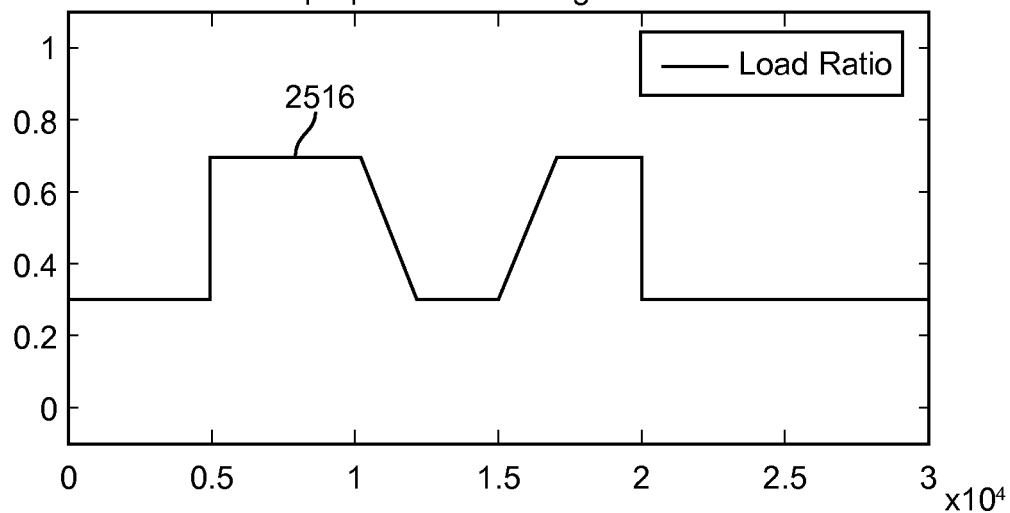
Figure 26A:
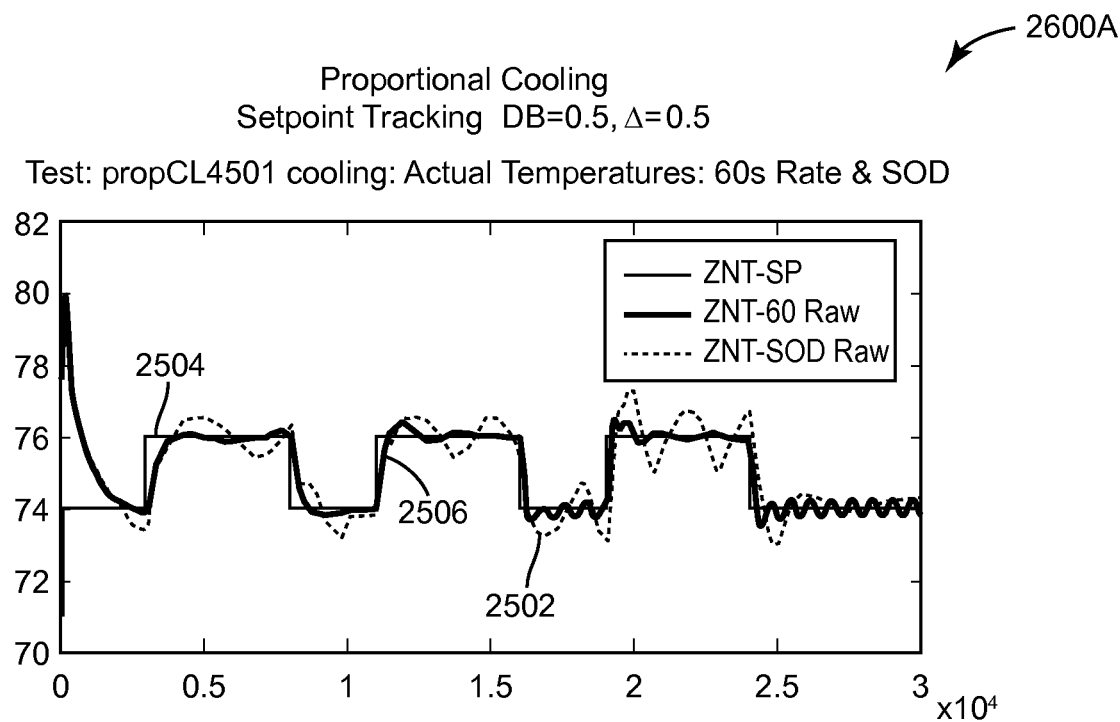
FIGS. 26A-D are graphs illustrating setpoint tracking results of the model of FIG. 24 for proportional cooling, according to an exemplary embodiment.
Figure 26B:
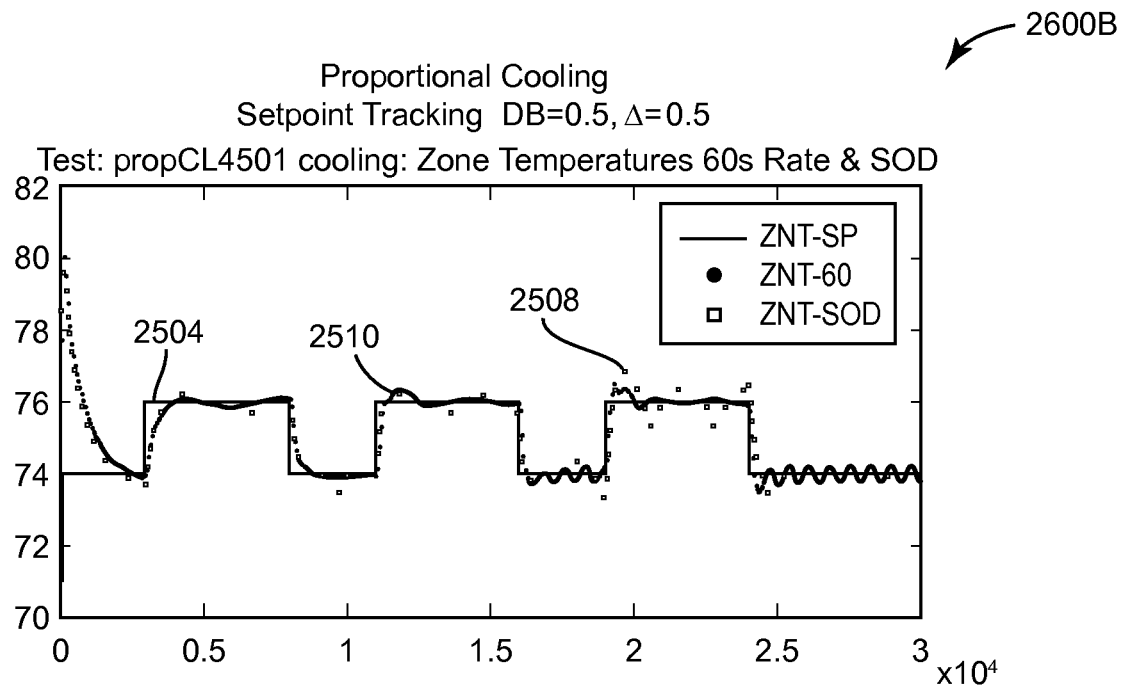
Figure 26C:
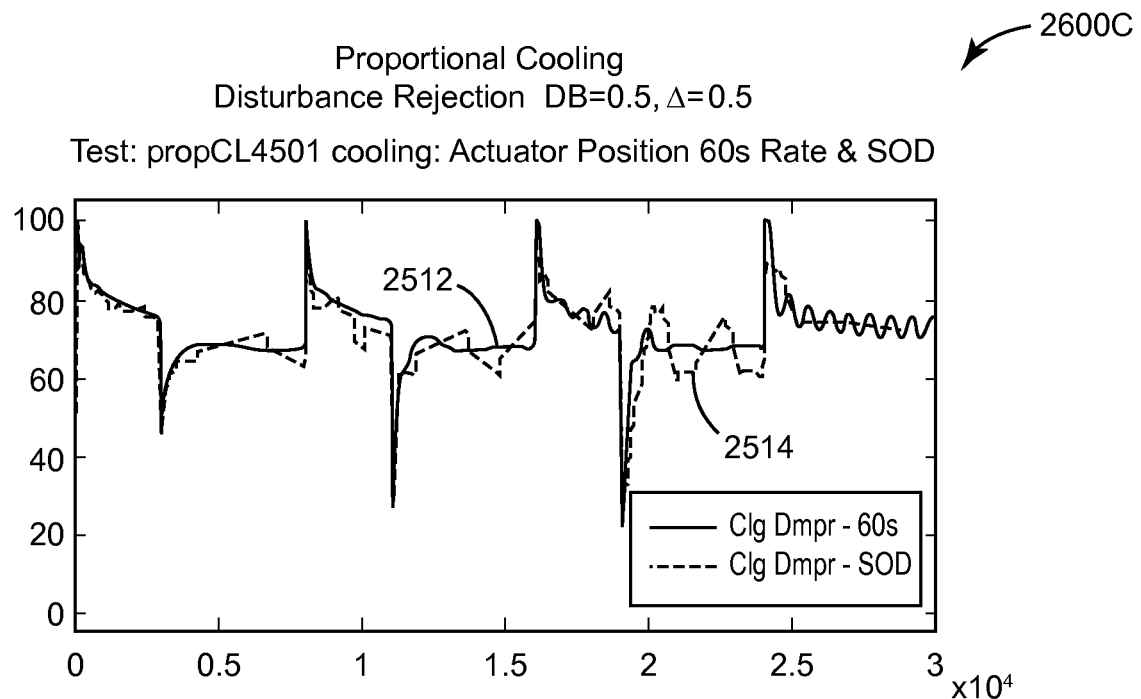
Figure 26D:
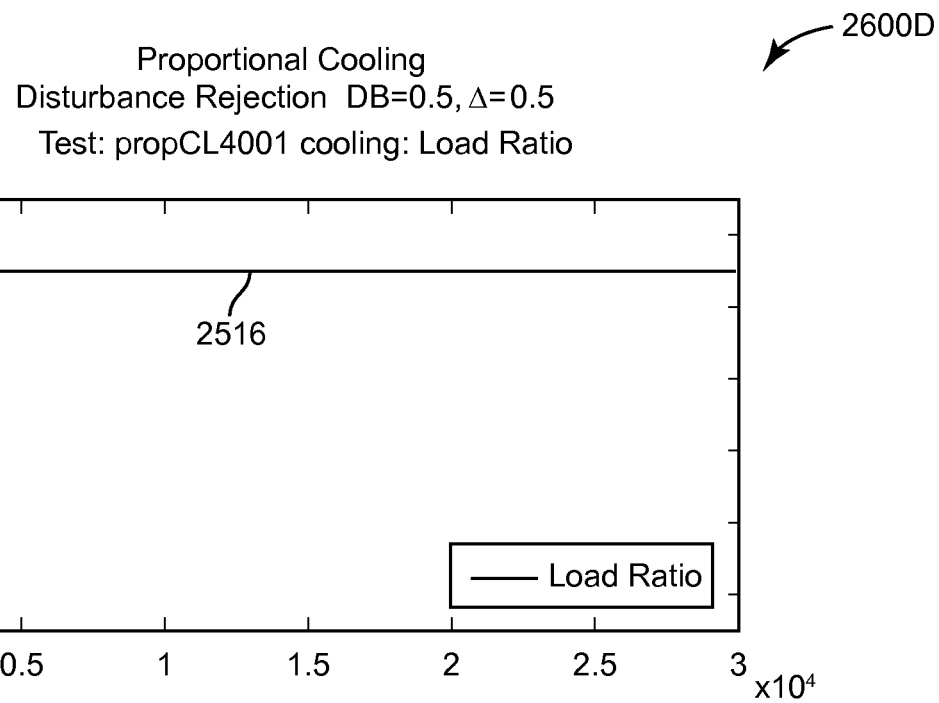
Figure 27A:
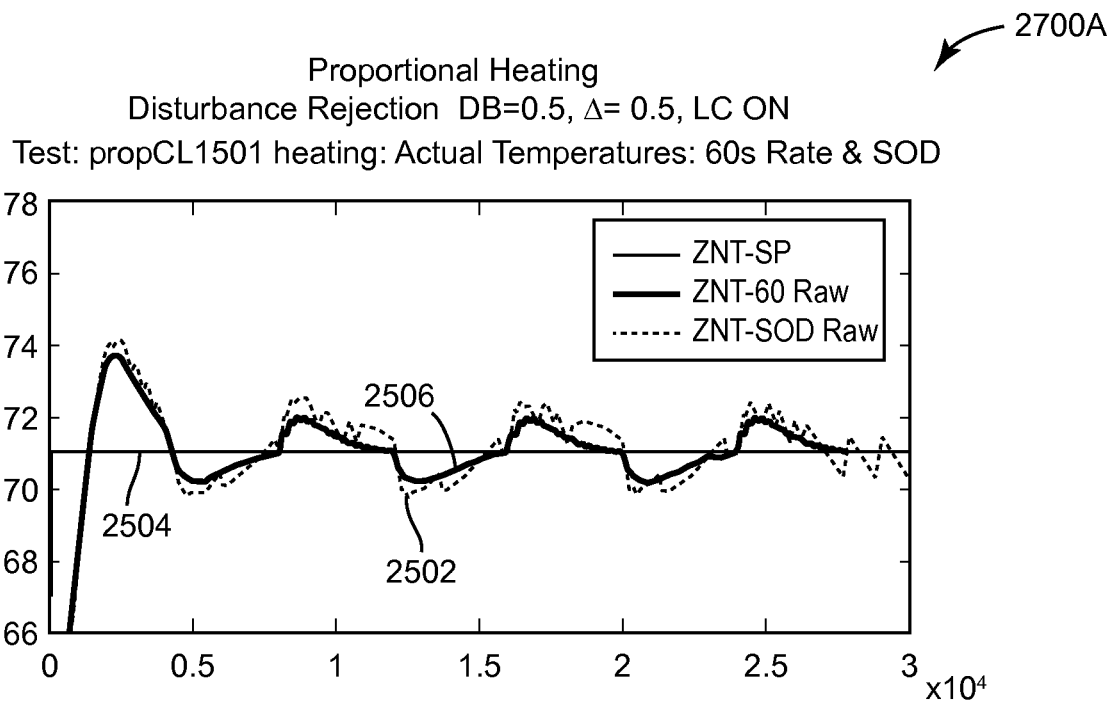
FIGS. 27A-D are graphs illustrating disturbance rejection results of the model of FIG. 24 for proportional heating with a lead compensator on, according to an exemplary embodiment.
Figure 27B:
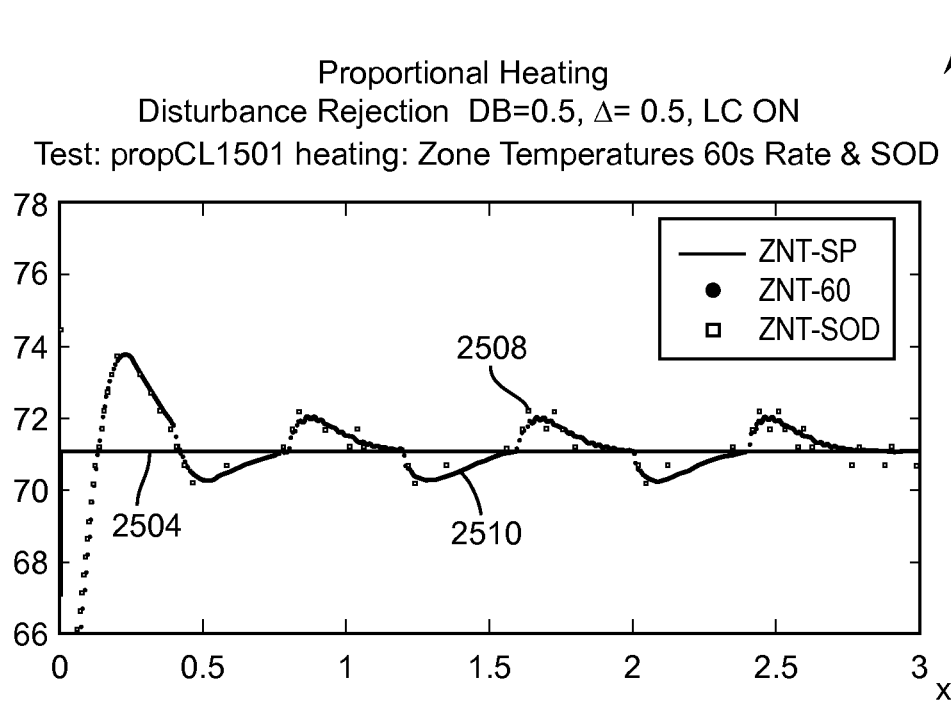
Figure 27C:
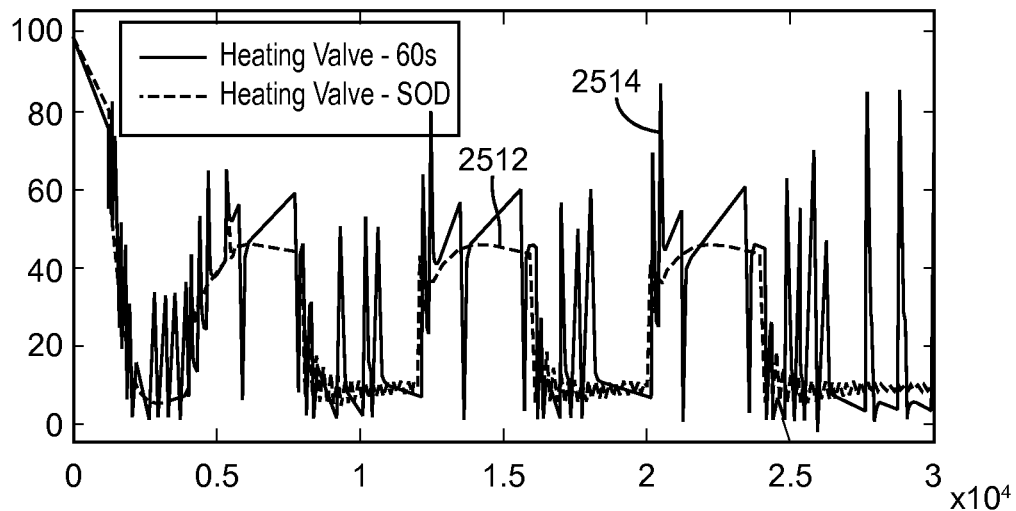
Figure 27D:
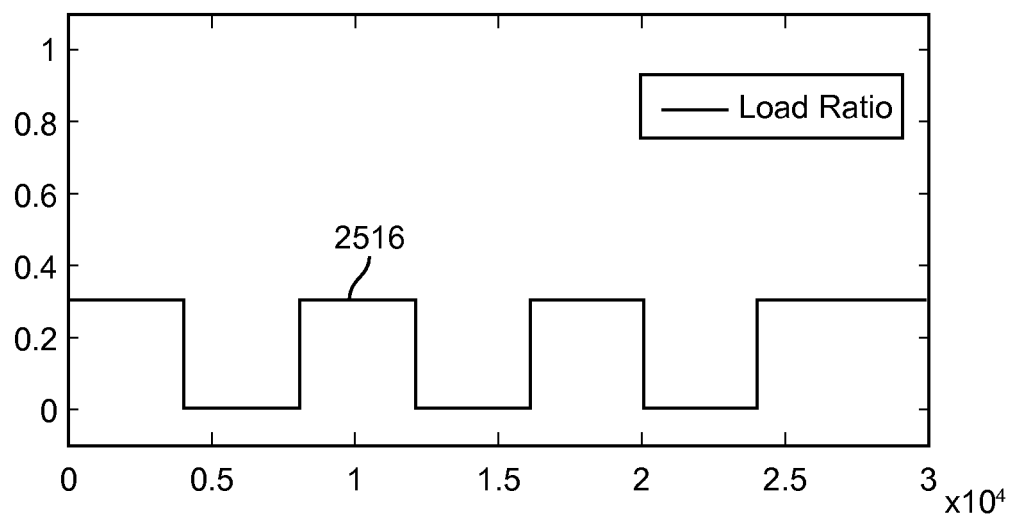
Figure 28A:
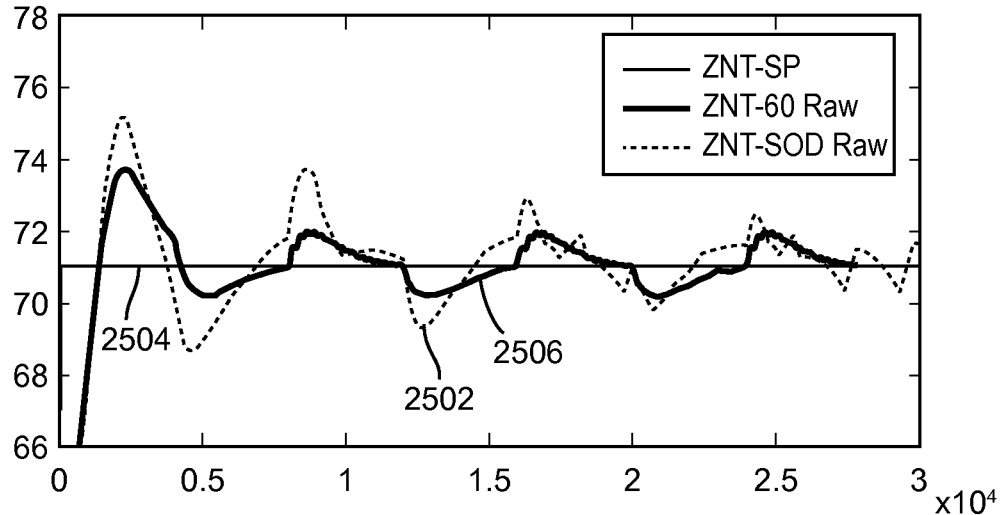
FIGS. 28A-D are graphs illustrating disturbance rejection results of the model of FIG. 24 for proportional heating with a lead compensator off, according to an exemplary embodiment.
Figure 28B:
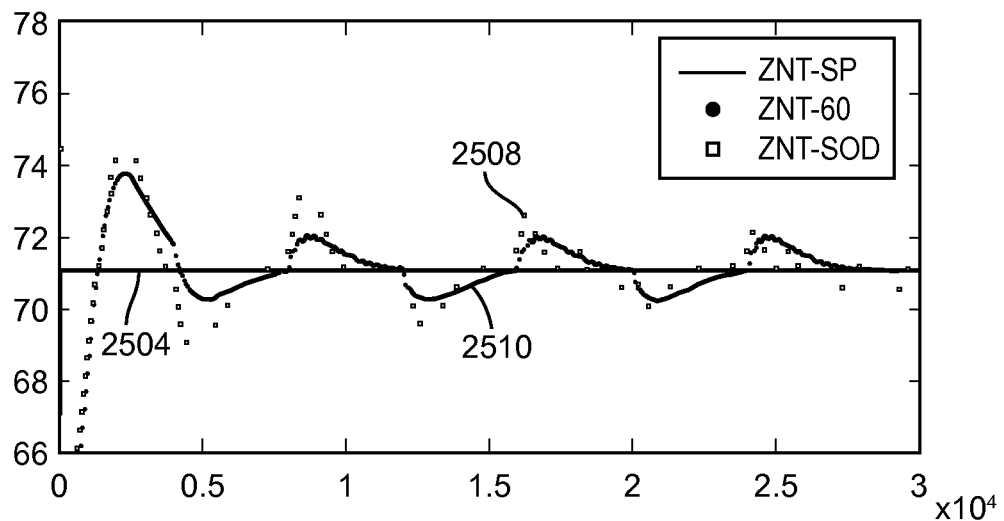
Figure 28C:
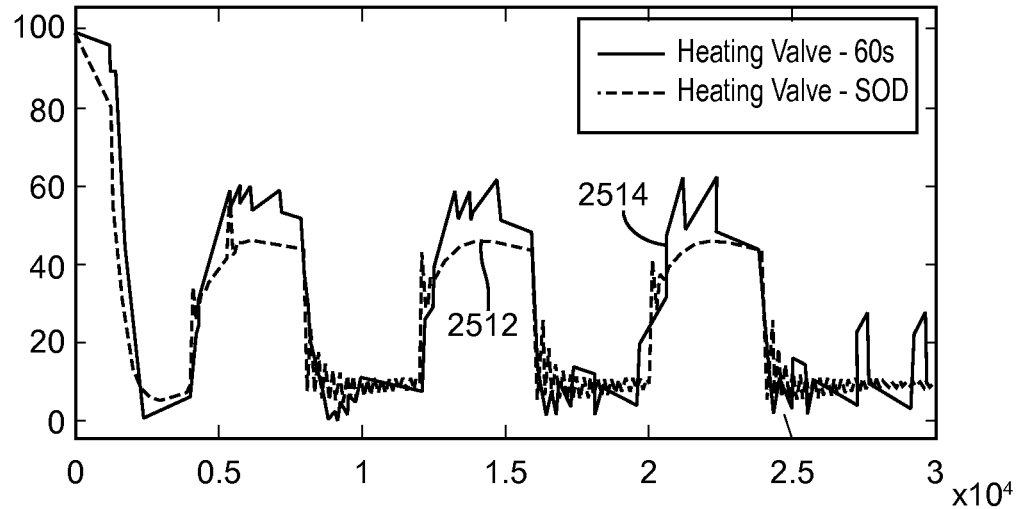
Figure 28D:
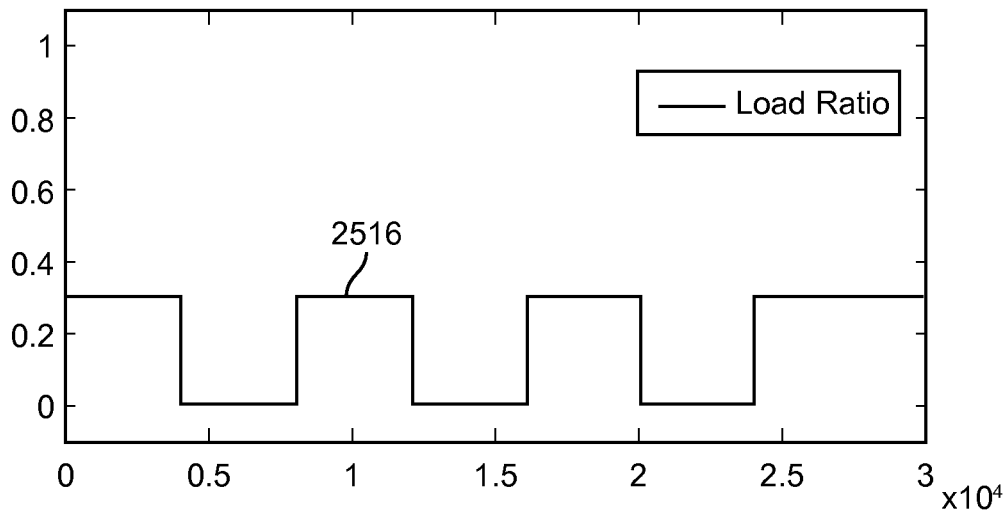
Figure 29A:
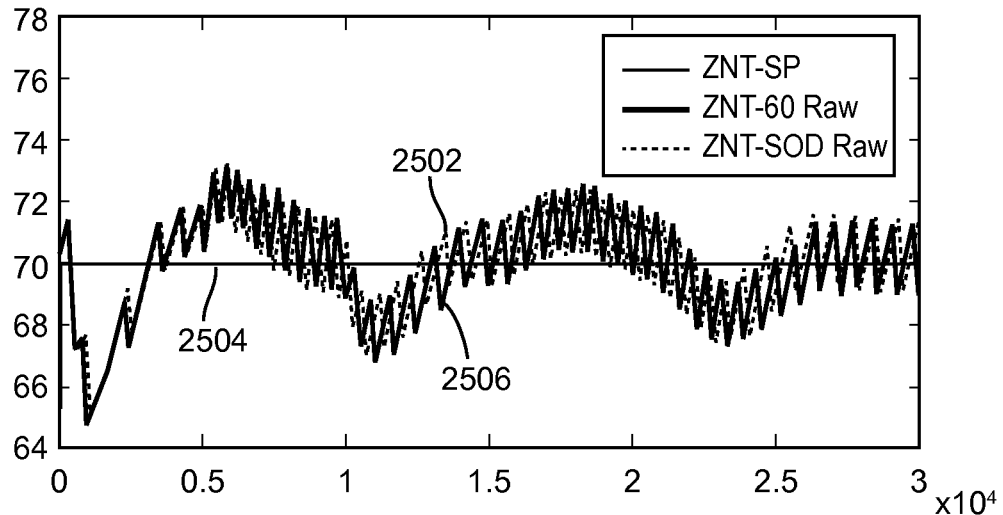
FIGS. 29A-E are graphs illustrating disturbance rejection results of the model of FIG. 24 for one-stage heating with a first delta value, according to an exemplary embodiment.
Figure 29B:
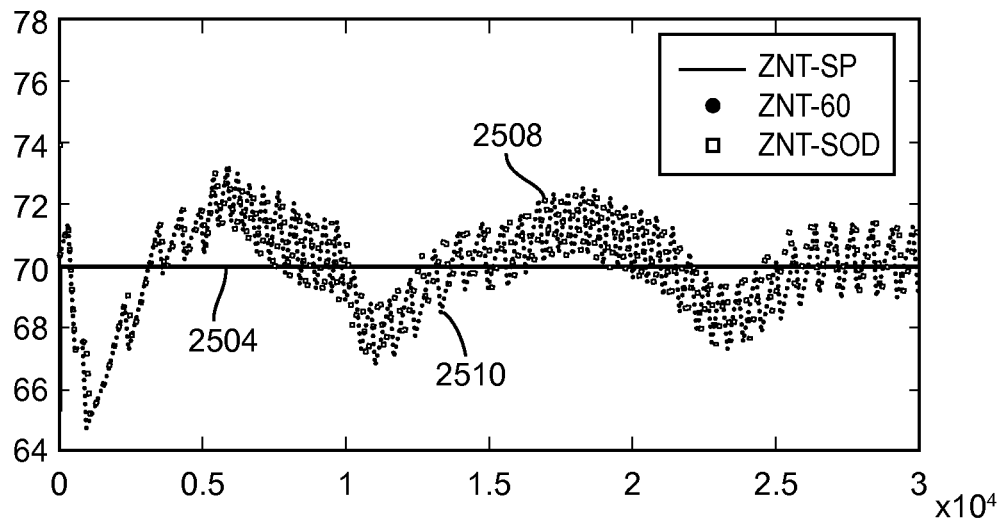
Figure 29C:
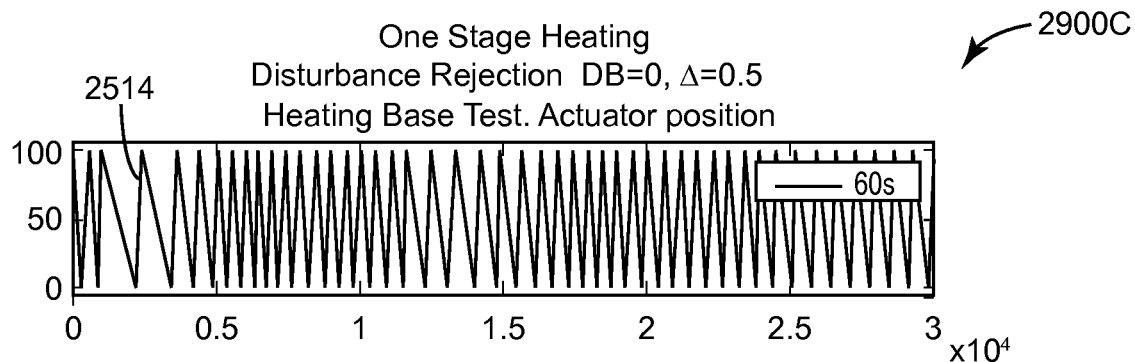
Figure 29D:
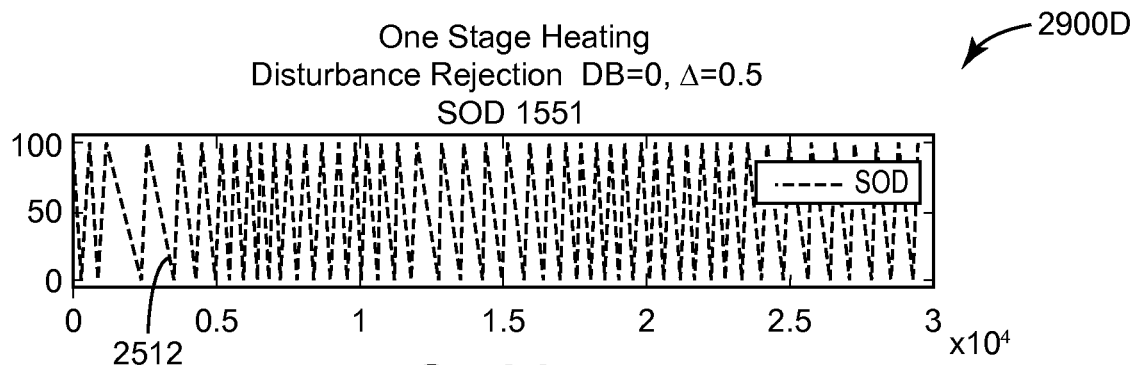
Figure 29E:
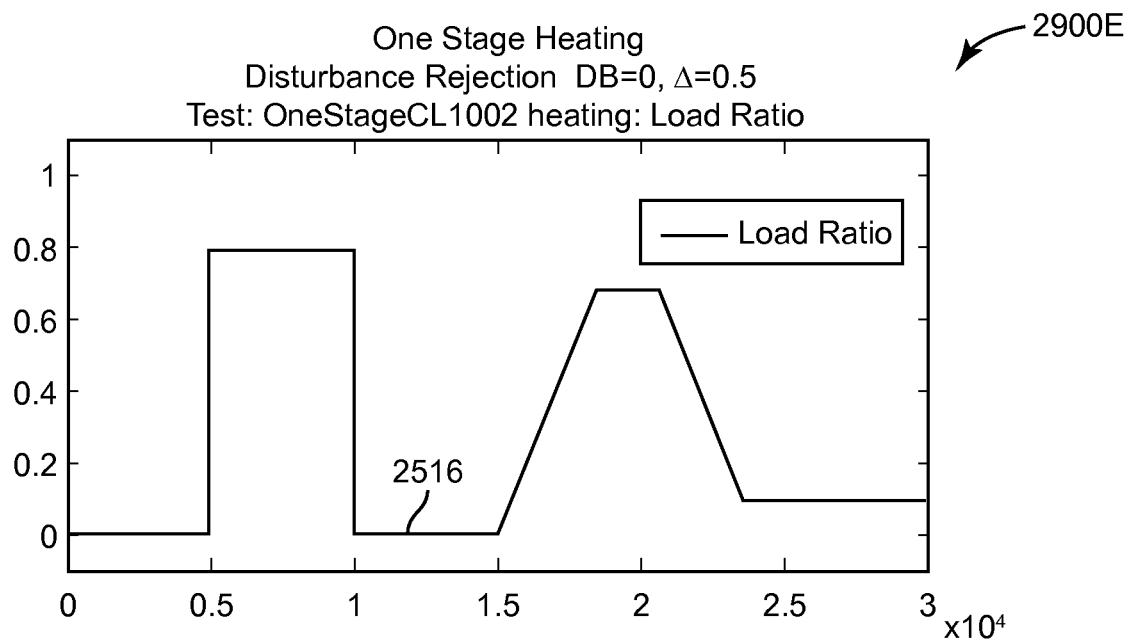
Figure 30A:
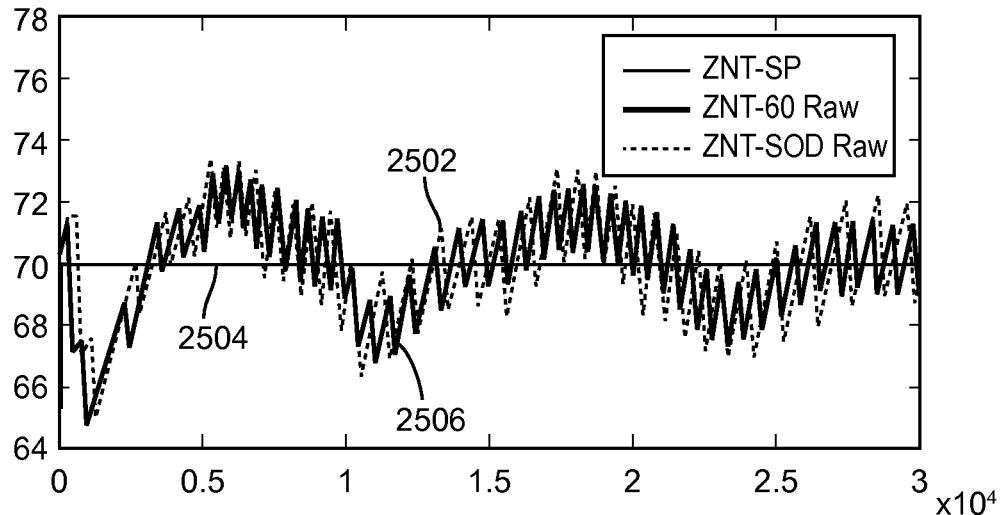
FIGS. 30A-E are graphs illustrating disturbance rejection results of the model of FIG. 24 for one-stage heating with a second delta value, according to an exemplary embodiment.
Figure 30B:
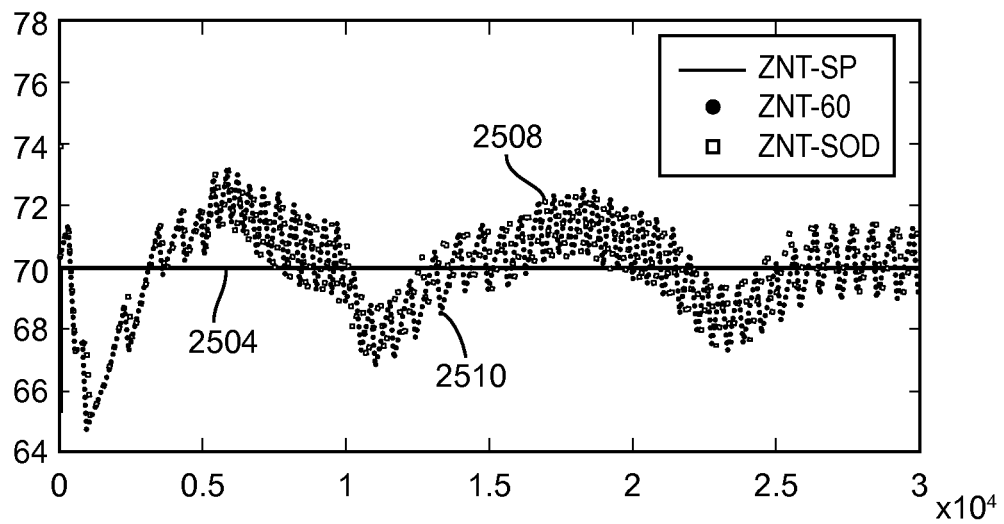
Figure 30C:
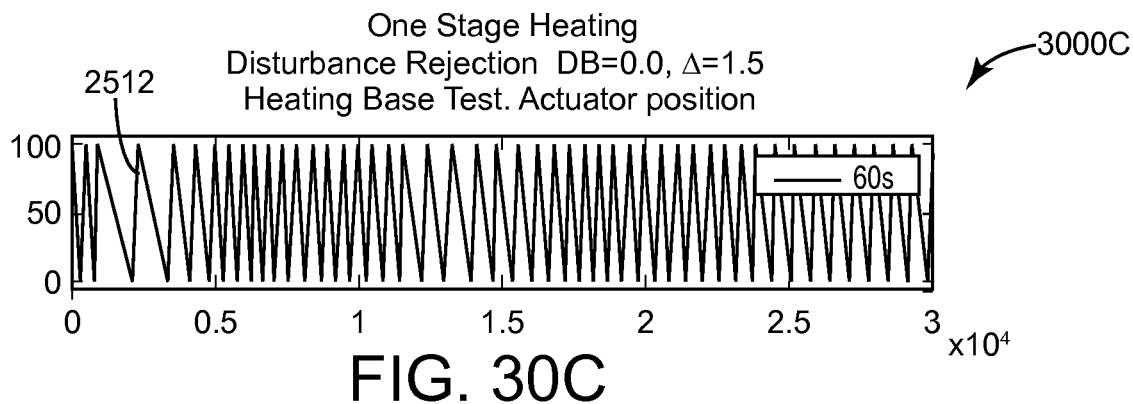
Figure 30D:
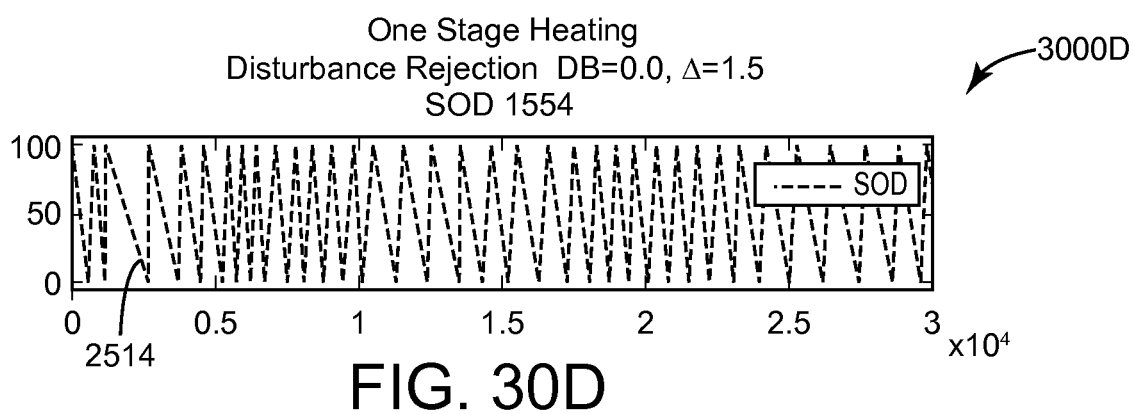
Figure 30E:
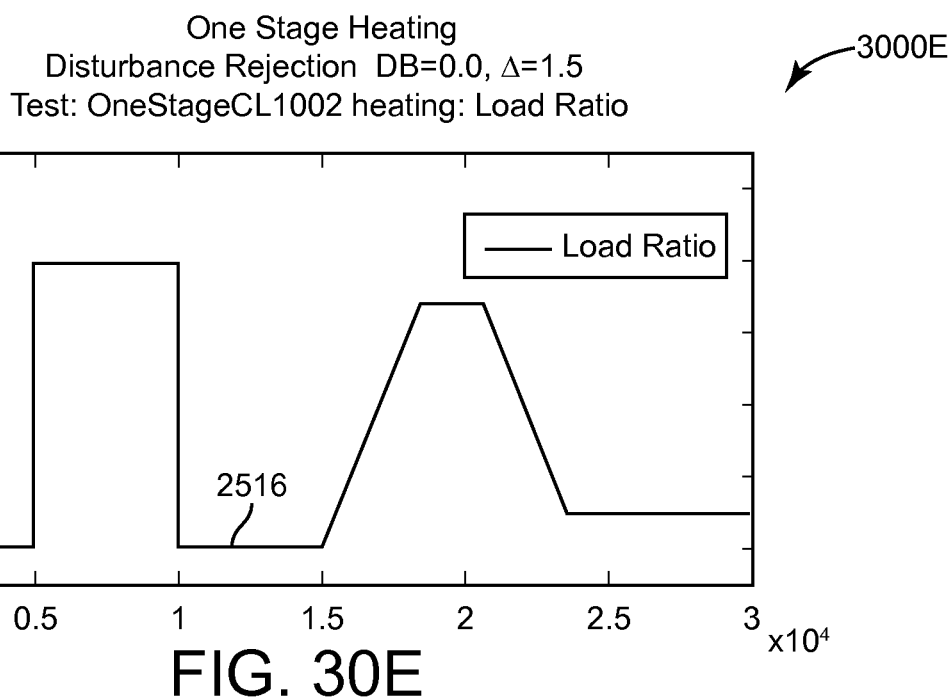
Figure 31A:
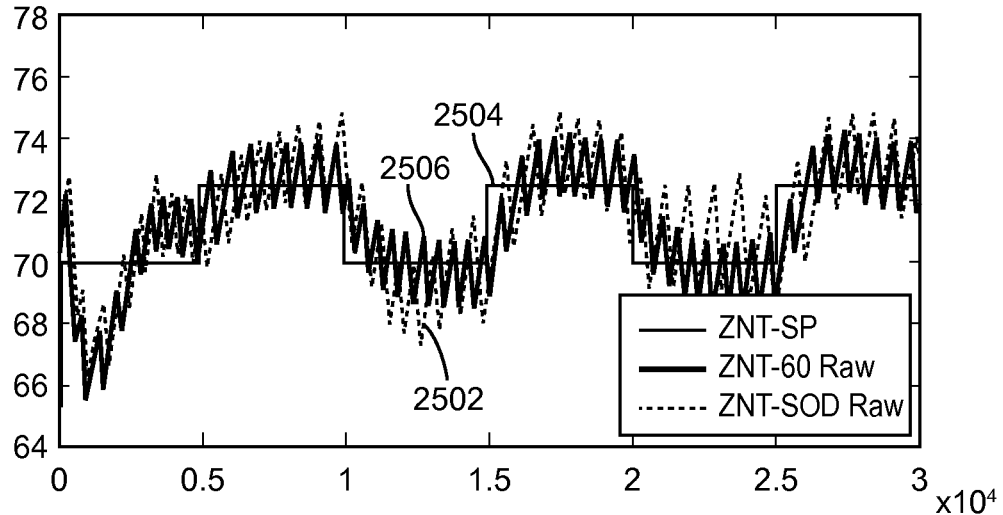
FIGS. 31A-E are graphs illustrating setpoint tracking results of the model of FIG. 24 for one-stage heating, according to an exemplary embodiment.
Figure 31B:
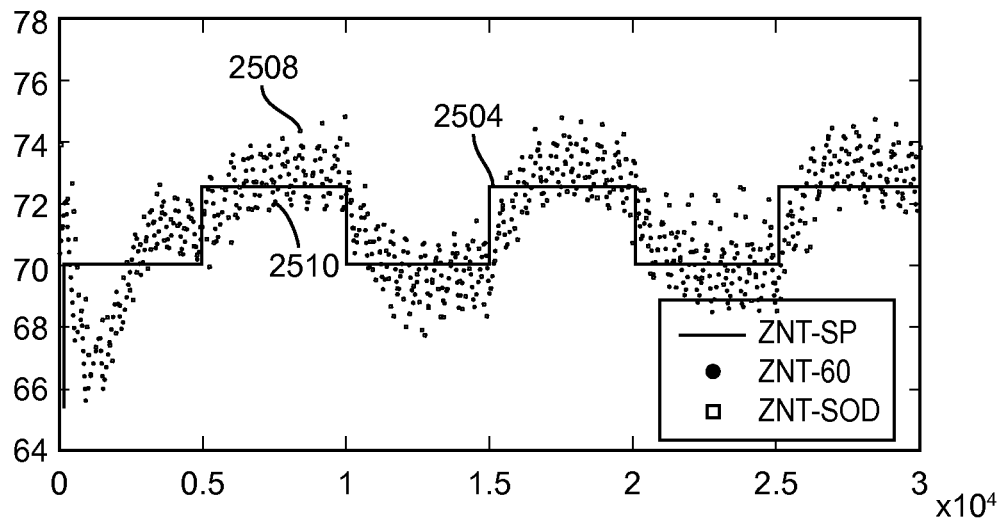
Figure 31C:
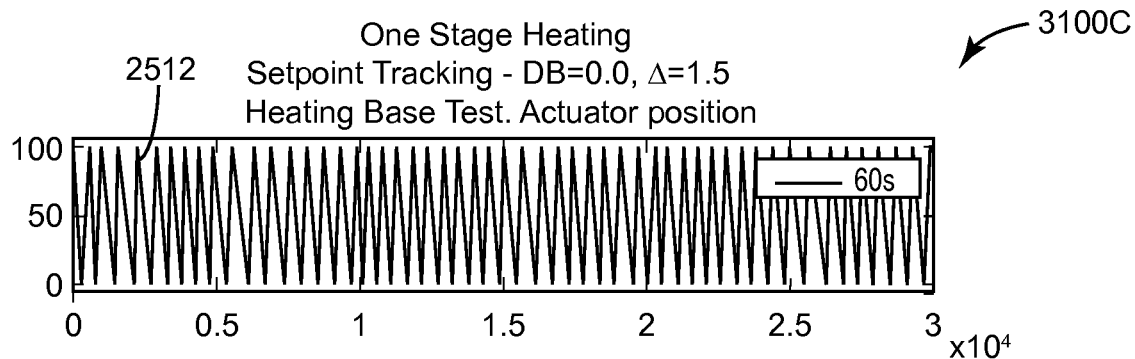
Figure 31D:
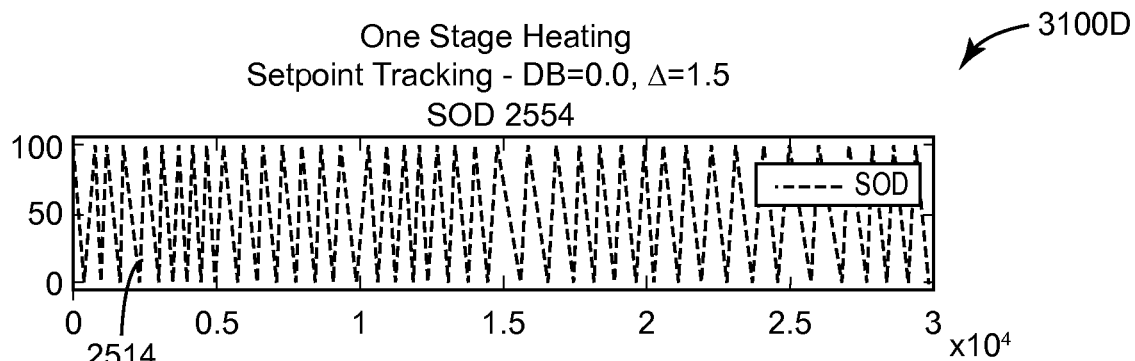
Figure 31E:
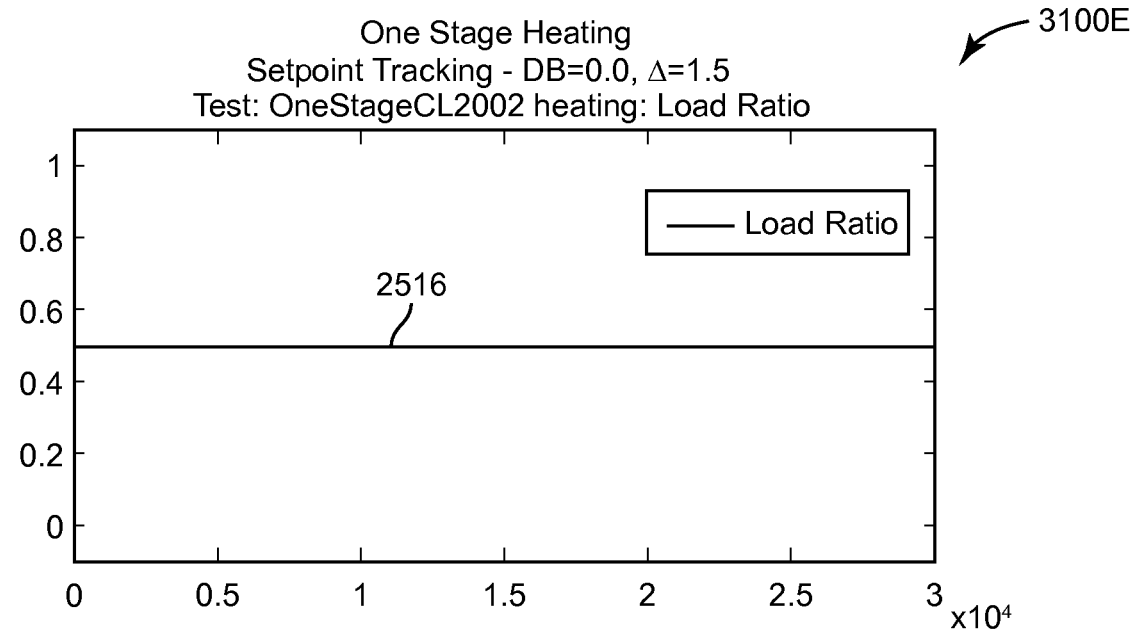

Referring more particular to FIG. 23, graph 2300 illustrates the ratio of average actuator effort of $SOD_2$ and $SOD_3$ as compared to $SOD_1$. In graph 2300, it can be seen that the actuator effort between $SOD_2$ and $SOD_1$ is almost identical, i.e., $SOD_2$ is at 1 for almost all average transmission intervals. Further, the average actuator effort, as compared to $SOD_1$, for $SOD_3$ is higher i.e., $SOD_3$ is generally above 1.25 in graph 2300.

As can be seen in FIGS. 20-23, the SOD methods may have similar setpoint error performance regardless of the use of a deadband filter. However, the actuator effort for SOD methods that use a deadband (i.e., $SOD_1$ and $SOD_2$) may be better than the SOD method where no deadband is used (i.e., $SOD_3$). Thus, it may be beneficial for actuator effort to have a deadband filter in either Wi-Fi sensor 1404 or controller 1408. The most effective configurations may be a Wi-Fi sensor 1404 with setpoint information and a deadband filter and a Wi-Fi sensor 1404 without setpoint information where the deadband filter is located in controller 1408.

Proportional and One-Stage Simulation and Results

Referring now to FIG. 24 a block diagram of a simulation model 2400 for simulating heating and cooling for proportional and staged control is shown, according to an exemplary embodiment. Model 2400 is shown to include plant 2402. Plant 2402 may be a plant model of a 2000 square foot zone controlled by a single VAV box. The VAV box model may be a model of a VAV that is being fed conditioned air at a fixed temperature of 55 degrees Fahrenheit. The VAV box model may be a model of a VAV that contains a damper that can be modulated to maintain a cooling setpoint and further may include a modulated heating device such as a hot water heating coil with a proportional valve or an on-off heating device.

Application 2404 can be configured to perform proportional control of plant 2402. Application 2404 may control plant 2402 in a cooling mode. This may include closing a heating valve and modulating a damper of plant 2402 in a cascaded loop. The outer loop of the cascaded loop may be a supply flow setpoint control module that sets the flow setpoint to control to zone temperature using a PI controller. The inner loop of the cascaded loop may be a proportional varying dead zone control (PVDC) block controller that controls a damper to maintain the flow setpoint. Application 2404 can control plant 2402 in a heating mode with proportional control. In the heating mode, the damper of plant 2402 may be modulated to maintain a minimum ventilation flow and the heating valve may be modulated by the PI controller to maintain the temperature of the zone at a heating temperature.

Application 2404 can be configured to perform one-stage control of plant 2402. Application 2402 can be configured to perform one-stage heating by controlling plant 2402. Application 2404 may operate in a similar manner when performing one-stage control as when performing proportional control of plant 2402. For one-stage heating, application 2404 can additionally generate a signal from a heating PID controller that may be sent to a multi stage controller (MSC) module that optimizes control of plant 2402 to minimize a number of on-off commands sent to plant 2402.

Test automation interface 2406 can be configured to read settings and configuration values from inputs 2408. Inputs 2408 may be inputs in a file such as an excel document. Closed loop adjust 2410 can be configured to merge the inputs 2408 with feedback of plant 2402. This merged information can be provided to application 2404. Application 2404 can use the merged information to control zone temperature to either a cooling or a heating setpoint. Any commands generated by application 2404 can be sent to plant 2404. Model 2400 can determine airflows and temperatures as a result of the control actions that application 2404 sends to plant 2402.

Tables 1 and 2 below illustrate the tests that were conducted with model 2400. As mentioned, application 2404 can be configured to perform either proportional or one-stage control. For this reason, plant 2402 may include either a model of a proportional device or a one-stage device. The plant may include either a cooling damper or a heating valve for proportional control while a heating device may be used for one-stage control. The tests run with model 2400 were a disturbance rejection test and a setpoint racking test. For the tests run with model 2400, a baseline case was established. The baseline case was periodically transmitting measured temperature (e.g., every sixty seconds). This is illustrated as the "60s" in Tables 1 and 2 below.

The tests run varied a Δ parameter (e.g., 0.5 and 0.25). The A parameter may indicate the maximum amount of temperature change or the maximum amount of error used in the SOD method that is described herein. Further, various deadband ranges were tested (e.g., 0.25, 0.5, 1, 1.5) in addition to the use of a lead compensator. In the tables below (e.g., Tables 1-9), the units of Δ and DB may be degrees Fahrenheit.

TABLE 1

Proportional Device Tests

| Number | Heating or Cooling | Setpoint Tracking or Disturbance Rejection | 60 s | SOD Δ = 0.5 | SOD Δ = 0.25 | Lead Compensator |
|---|---|---|---|---|---|---|
| 1001 | Heating | Disturbance Rejection | X | | | X |
| 1501 | Heating | Disturbance Rejection | | X | | X |
| 1502 | Heating | Disturbance Rejection | | | X | X |
| 1503 | Heating | Disturbance Rejection | | | X | |
| 1504 | Heating | Disturbance Rejection | | X | | |
| 3001 | Heating | Setpoint Tracking | X | | | X |
| 3501 | Heating | Setpoint Tracking | | X | | X |
| 3502 | Heating | Setpoint Tracking | | | X | X |
| 3503 | Heating | Setpoint Tracking | | | X | |
| 3504 | Heating | Setpoint Tracking | | X | | |
| 2001 | Cooling | Disturbance Rejection | X | | | |
| 2501 | Cooling | Disturbance Rejection | | X | | |
| 2502 | Cooling | Disturbance Rejection | | | X | |
| 4001 | Cooling | Setpoint Tracking | X | | | |
| 4501 | Cooling | Setpoint Tracking | | X | | |
| 4502 | Cooling | Setpoint Tracking | | | X | |

TABLE 2

One-stage Heating Device Tests

| Number | Setpoint Tracking or Disturbance Rejection | 60 s | Deadband (DB) | Δ |
|---|---|---|---|---|
| 1001 | Disturbance Rejection | X | 0.5 | NA |
| 1501 | Disturbance Rejection | | 0.5 | 0.5 |
| 1502 | Disturbance Rejection | | 0.25 | 0.25 |
| 1503 | Disturbance Rejection | | 1 | 1 |
| 1504 | Disturbance Rejection | | 1.5 | 1.5 |
| 1002 | Disturbance Rejection | X | 0 | NA |
| 1551 | Disturbance Rejection | | 0 | 0.5 |
| 1552 | Disturbance Rejection | | 0 | 0.25 |
| 1553 | Disturbance Rejection | | 0 | 1 |
| 1554 | Disturbance Rejection | | 0 | 1.5 |
| 2001 | Setpoint Tracking | X | 0.5 | NA |
| 2501 | Setpoint Tracking | | 0.5 | 0.5 |
| 2502 | Setpoint Tracking | | 0.25 | 0.25 |
| 2503 | Setpoint Tracking | | 1 | 1 |
| 2504 | Setpoint Tracking | | 1.5 | 1.5 |
| 2002 | Setpoint Tracking | X | 0 | NA |
| 2551 | Setpoint Tracking | | 0 | 0.5 |
| 2552 | Setpoint Tracking | | 0 | 0.25 |
| 2553 | Setpoint Tracking | | 0 | 1 |
| 2554 | Setpoint Tracking | | 0 | 1.5 |

In Tables 3-9 below, the performance of the various tests run (the tests of Tables 1 and 2) are shown. In Tables 3-4, which illustrate proportional cooling, the baseline case has a transmission rate of one minute while the transmission rates the SOD method range approximately between 8 minutes and 16 minutes for the proportional testing. In Tables 5-6, which illustrates proportional heating, it can be seen that turning the lead compensator off (Table 6), the effort of the actuator is significantly reduced for the SOD method. This may happen because the signal in a controller abruptly changes whenever a new signal arrives and the lead compensator may magnify this change in the control action. It may be beneficial for non-cascaded feedback control loops to turn off their lead compensator. The solution to this problem may be to turn off a lead compensator of a controller when the SOD method is being used.

Regarding the one-stage testing of Tables 7-9, it can be observed that the value of Δ can be increased without significantly affecting performance. Further, if there is a deadband filter in a controller, the DB of a deadband filter in a sensor can be set to zero.

Proportional Cooling

TABLE 3

Disturbance Rejection, DB = 0.5, Δ = 0.5
Average Error, Effort, And Transmission times

| Sampler | Average Error | Average Effort | Average Δt (minutes) |
|---|---|---|---|
| Baseline (60 seconds) | 0.17 | 0.01 | 1.00 |
| SOD (Δ = 0.5) | 0.16 | 0.01 | 16.67 |

TABLE 4

Setpoint Tracking, DB = 0.5, Δ = 0.5
Average Error, Effort, And Transmission times

| Sampler | Average Error | Average Effort | Average Δt (minutes) |
|---|---|---|---|
| Baseline (60 seconds) | 0.04 | 0.02 | 1.00 |
| SOD (Δ = 0.5) | 0.12 | 0.02 | 8.65 |

Proportional Heating

TABLE 5

Disturbance Rejection, DB = 0.5, Δ = 0.5, LC ON
Average Error, Effort, And Transmission times

| Sampler | Average Error | Average Effort | Average Δt (minutes) |
|---|---|---|---|
| Baseline (60 seconds) | 0.22 | 0.04 | 1.00 |
| SOD (Δ = 0.5, LC On) | 0.27 | 0.12 | 11.40 |

TABLE 6

Disturbance Rejection, DB = 0.5, Δ = 0.5, LC OFF
Average Error, Effort, And Transmission times

| Sampler | Average Error | Average Effort | Average Δt (minutes) |
|---|---|---|---|
| Baseline (60 seconds) | 0.22 | 0.04 | 1.00 |
| SOD (Δ = 0.5, LC ON) | 0.27 | 0.12 | 11.40 |
| SOD (Δ = 0.5, LC OFF) | 0.34 | 0.03 | 10.07 |

One-Stage Heating

TABLE 7

Disturbance Rejection, DB = 0, Δ = 0.5
Average Error, Effort, And Transmission times

| Sampler | Average Error | Average Effort | Average Δt (minutes) |
|---|---|---|---|
| Baseline (60 seconds) | 1.07 | 0.34 | 1.00 |
| SOD (Δ = 0.5) | 1 | 0.32 | 1.57 |

TABLE 8

Disturbance Rejection, DB = 0, Δ = 1.5
Average Error, Effort, And Transmission times

| Sampler | Average Error | Average Effort | Average Δt (minutes) |
|---|---|---|---|
| Baseline (60 seconds) | 1.07 | 0.34 | 1.00 |
| SOD (Δ = 0.5) | 1 | 0.32 | 1.57 |
| SOD (Δ = 1.5) | 1.19 | 0.24 | 6.04 |

TABLE 9

Setpoint Tracking, DB = 0, Δ = 1.5
Average Error, Effort, And Transmission times

| Sampler | Average Error | Average Effort | Average Δt (minutes) |
|---|---|---|---|
| Baseline (60 seconds) | 0.78 | 0.35 | 1.00 |
| SOD (Δ = 0.5) | 0.84 | 0.33 | 1.49 |
| SOD (Δ = 1.5) | 1.06 | 0.26 | 5.71 |

Referring now to FIGS. 25-31, graphs 2500A-3100E are shown illustrating the tests performed with model 2400 of FIG. 24, according to an exemplary embodiment. FIGS. 25A-D illustrate results for a disturbance rejection test for proportional cooling with a deadband of 0.5 and a delta of 0.5. FIGS. 26A-D illustrate results for a setpoint tracking test for proportional cooling with a deadband of 0.5 and a delta of 0.5. FIGS. 27A-D illustrate results for a disturbance rejection test for proportional heating with a deadband of 0.5, a delta of 0.5, and a lead compensator on. FIGS. 28A-D illustrate results for a disturbance rejection test for proportional heating with a deadband of 0.5, a delta of 0.5, and a lead compensator off. FIGS. 29A-E illustrate results for a disturbance rejection test for proportional cooling with a deadband of 0 and a delta of 0.5. FIGS. 30A-E illustrate results for a disturbance rejection test for one-stage heating with a deadband of 0 and a delta of 1.5. FIGS. 31A-E illustrate results for a setpoint tracking test for one stage heating with a deadband of 0 and a delta of 1.5.

FIGS. 25A, 26A, 27A, 28A, 29A, 30A, and 31A illustrate the setpoint and actual temperatures when using the baseline sampling and using the SOD method. Line 2504 represents a setpoint value, line 2502 represents the temperature values for the SOD method, and line 2506 represents temperature values for the baseline case. FIGS. 25B, 26B, 27B, 28B, 29B, 30B, and 31B illustrate the signals that are transmitted by the baseline case and the SOD method. The transmitted values of SOD method are marked by dots 2508 and the transmitted values for the baseline case are marked by dots 2510. FIGS. 25C, 26C, 27C, 28C, 29C, 29D, 30C, 30D, 31C, and 31D illustrate actuator behavior for both the baseline case and the SOD method. The actuator behavior for the baseline case is illustrated by line 2514 while the actuator behavior for the SOD method is illustrated by line 2512. FIGS. 25D, 26D, 27D, 28D, 29E, 30E, and 31E illustrate a load used to disturb the system of the test, it is illustrated by line 2516.

Referring now to FIGS. 32-40, graphs 3200-4000 illustrate statistical summaries of the tests performed with model 2400 of FIG. 24. Graphs 3200-4000 illustrate the metrics of transmission rate, controller error, and actuator effort. Graphs 3200-3900 illustrate these metrics in boxplots while graph 4000 uses a bar graph.

Figure 32:
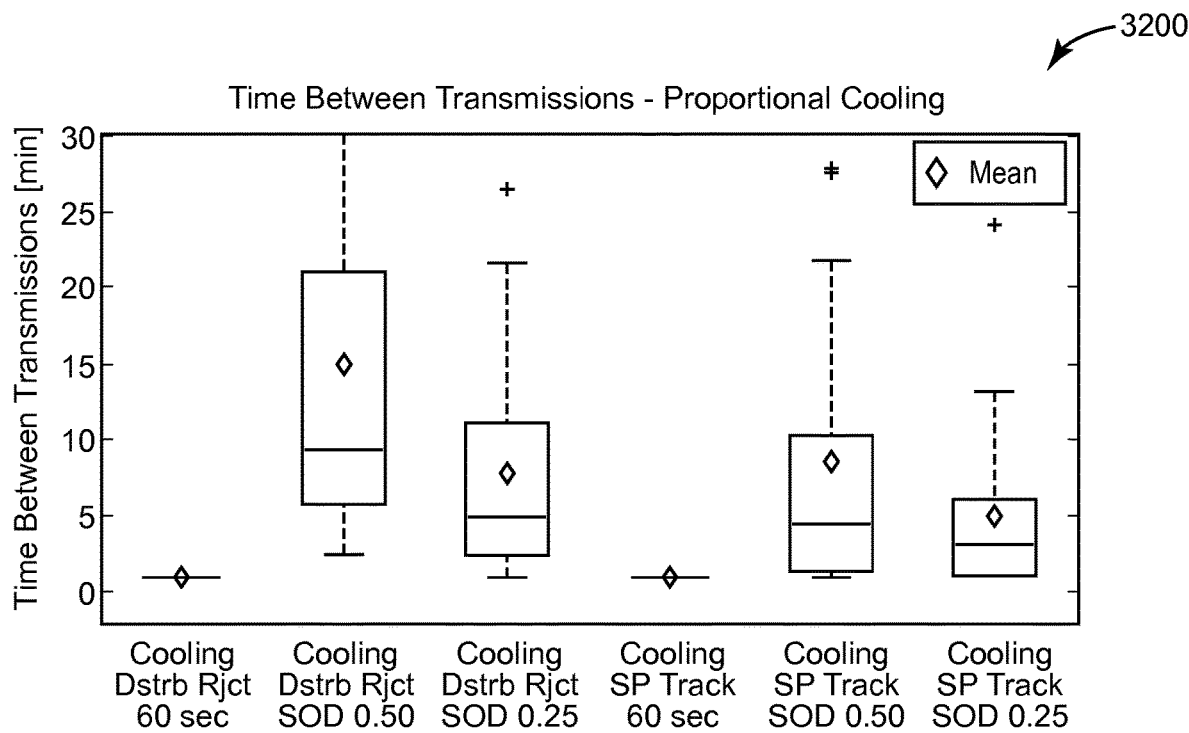
FIG. 32 is a graph illustrating transmission time interval results of the model of FIG. 24 for various data transmission methods used with proportional cooling, according to an exemplary embodiment.
Figure 33:
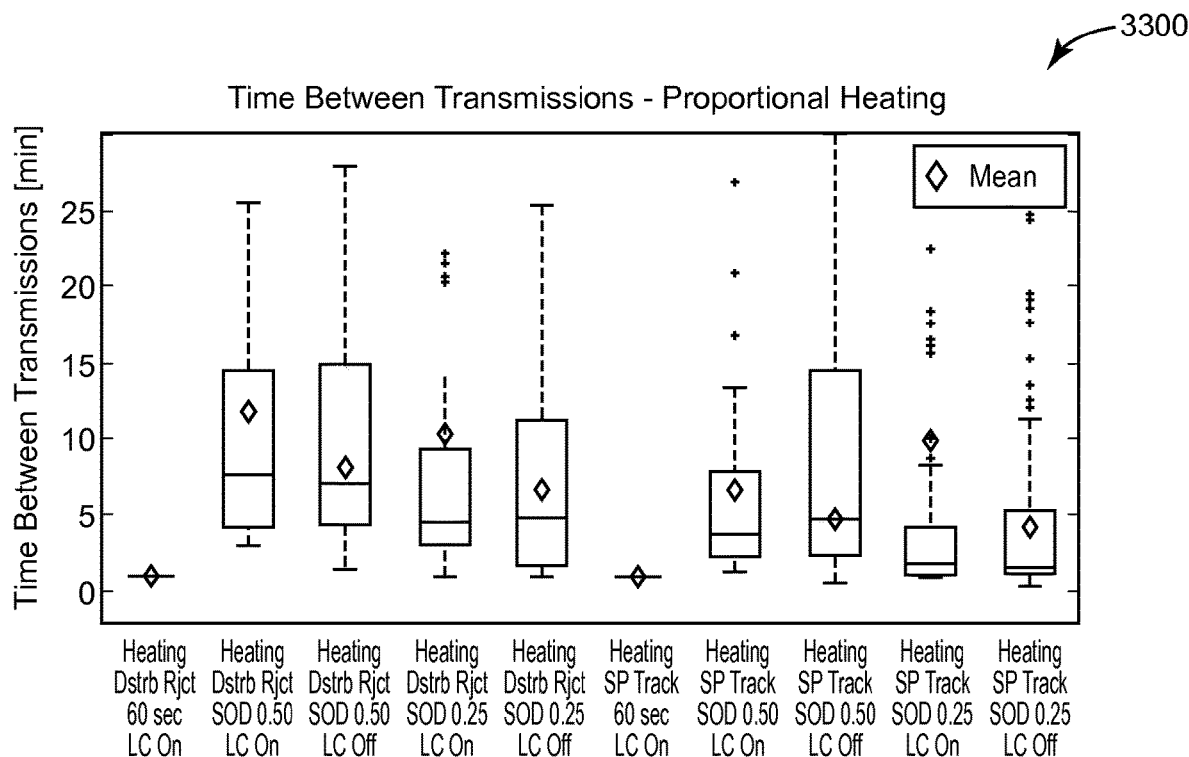
FIG. 33 is a graph illustrating transmission time intervals results of the model of FIG. 24 for various data transmission methods used with proportional heating, according to an exemplary embodiment.
Figure 34:
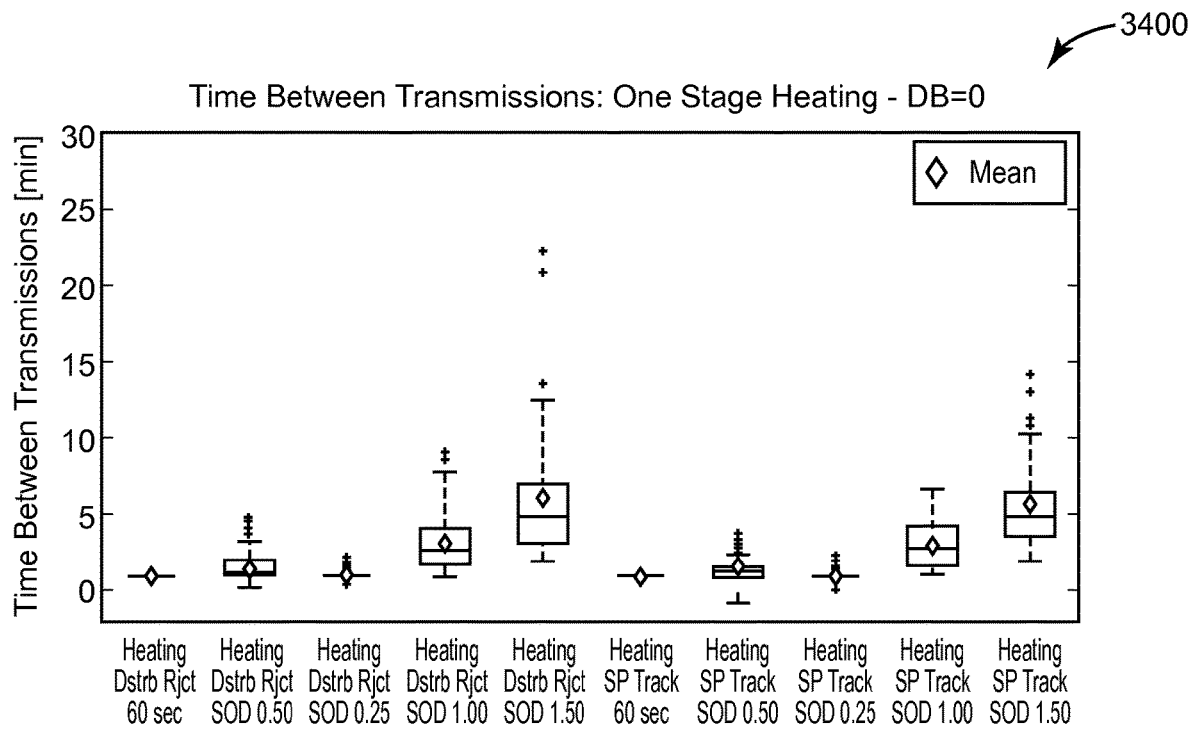
FIG. 34 is a graph illustrating transmission time intervals results of the model of FIG. 24 for various data transmission methods used with one-stage heating, according to an exemplary embodiment.
Figure 35:
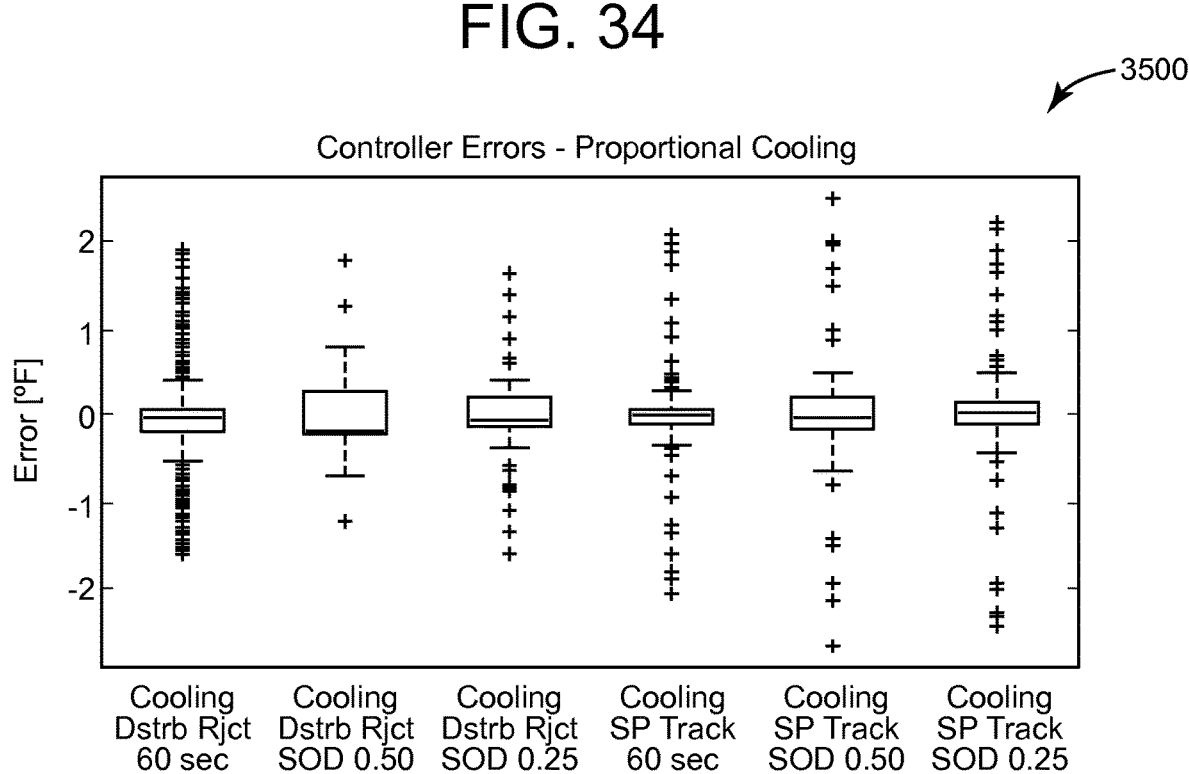
FIG. 35 is a graph illustrating errors of the model of FIG. 24 for various data transmission methods used with proportional cooling, according to an exemplary embodiment.
Figure 36:
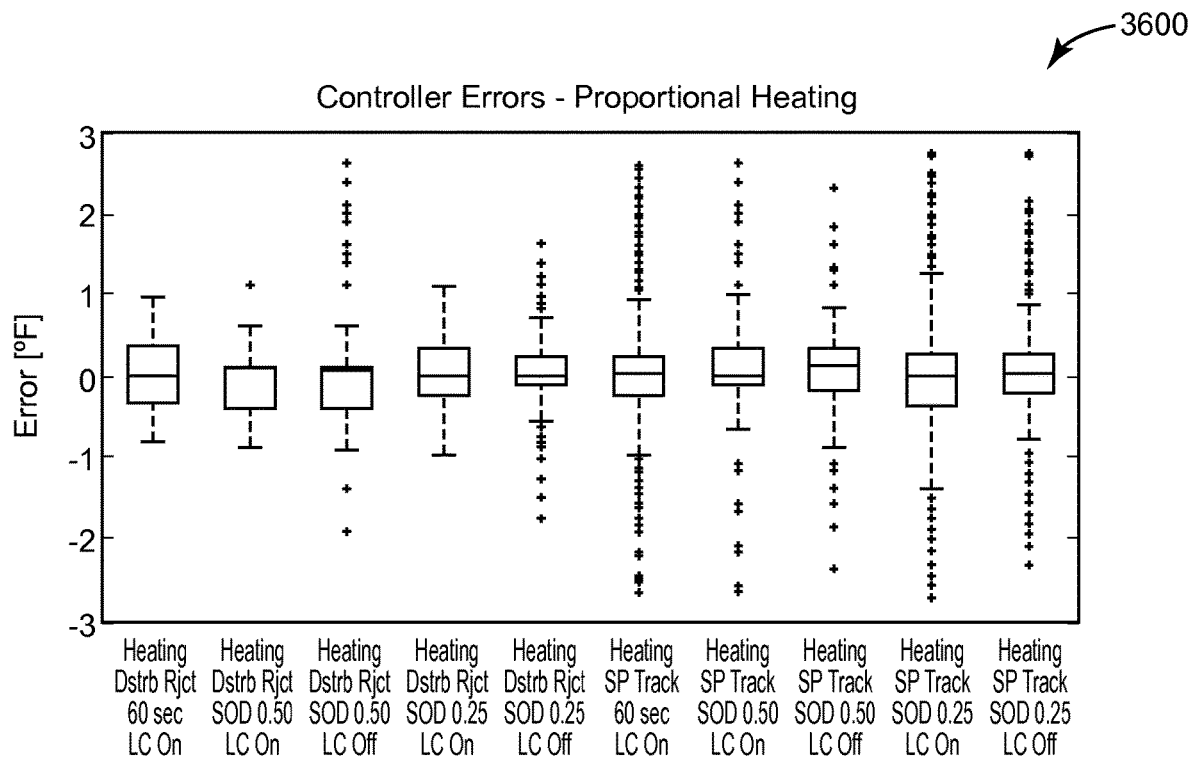
FIG. 36 is a graph illustrating errors of the model of FIG. 24 for various data transmission methods used with proportional heating, according to an exemplary embodiment.
Figure 37:
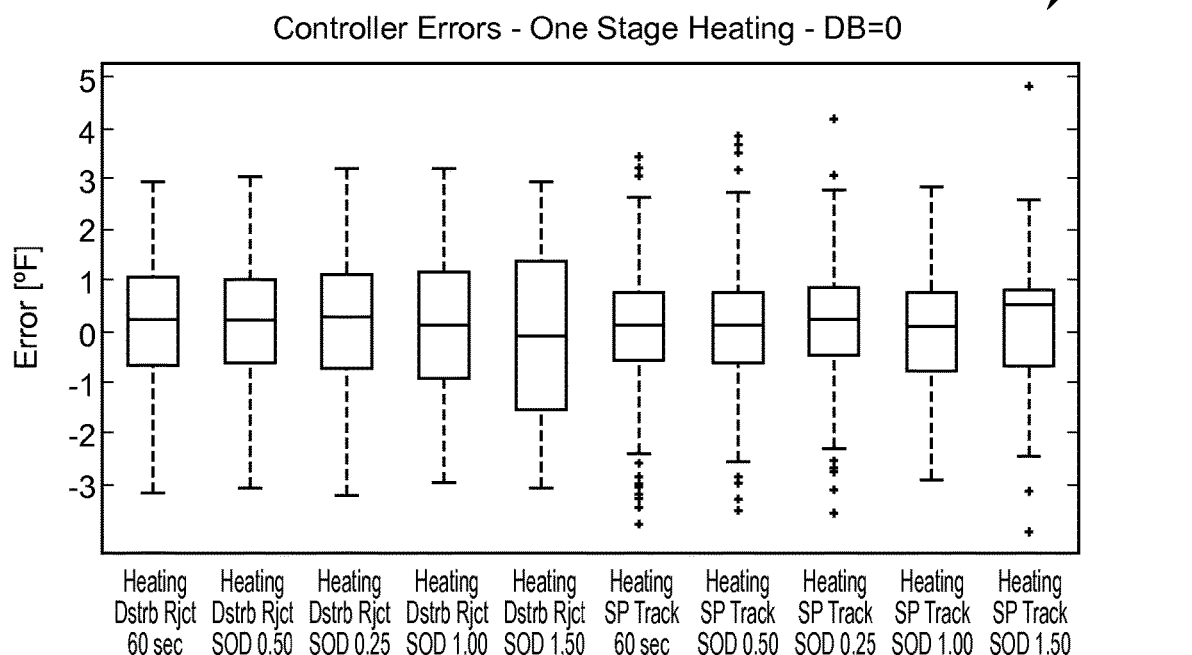
FIG. 37 is a graph illustrating errors of the model of FIG. 24 for various data transmission methods used with one-stage heating, according to an exemplary embodiment.
Figure 38:
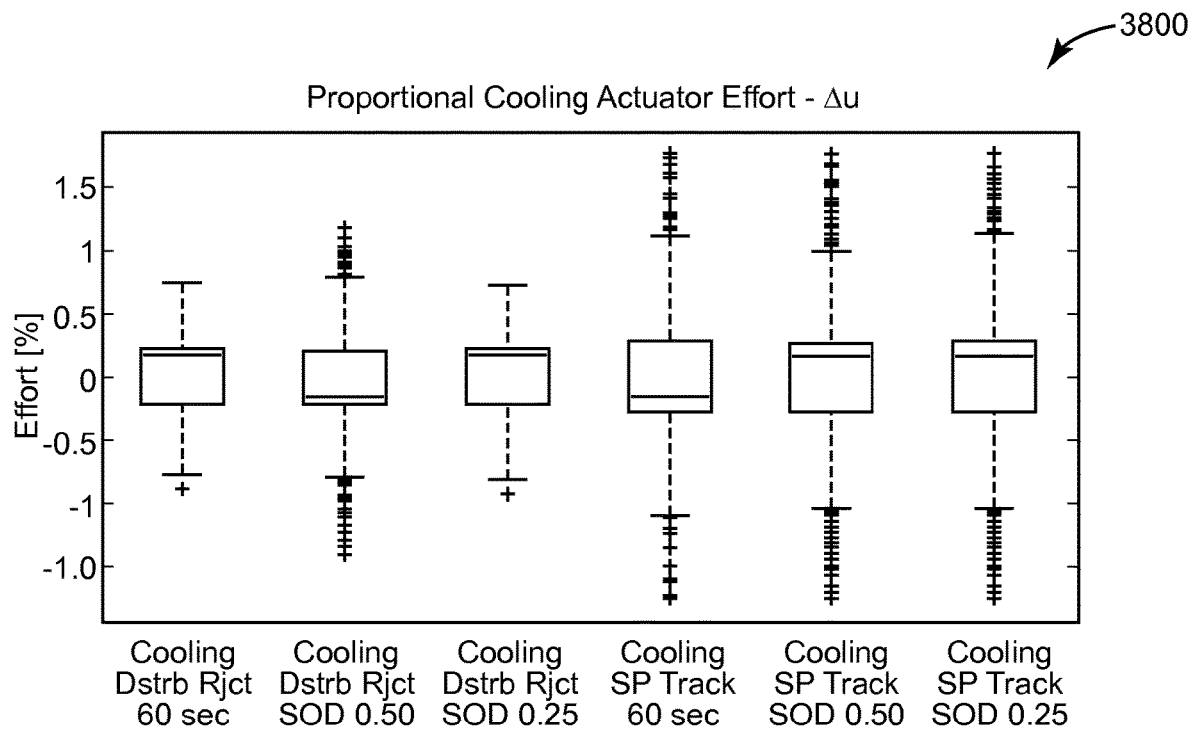
FIG. 38 is a graph illustrating actuator effort of the model of FIG. 24 for various data transmission methods used with proportional cooling, according to an exemplary embodiment.
Figure 39:
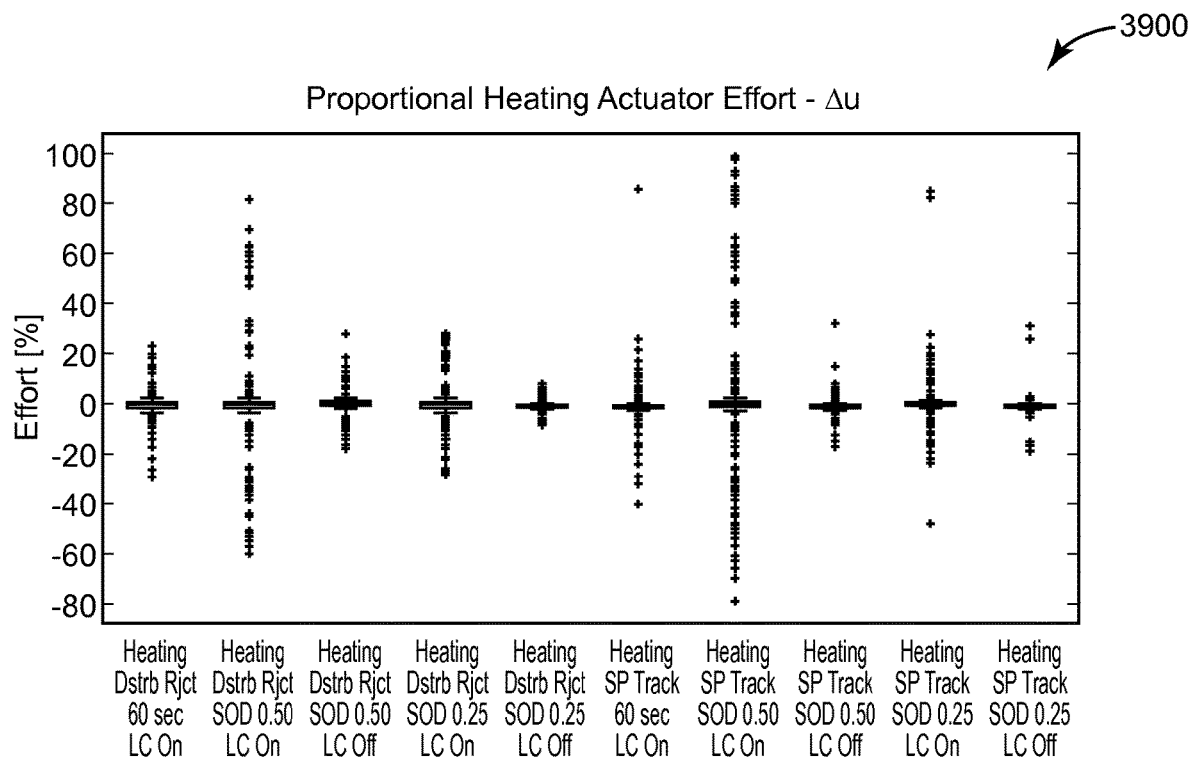
FIG. 39 is a graph illustrating actuator effort of the model of FIG. 24 for various data transmission methods used with proportional heating, according to an exemplary embodiment.
Figure 40:
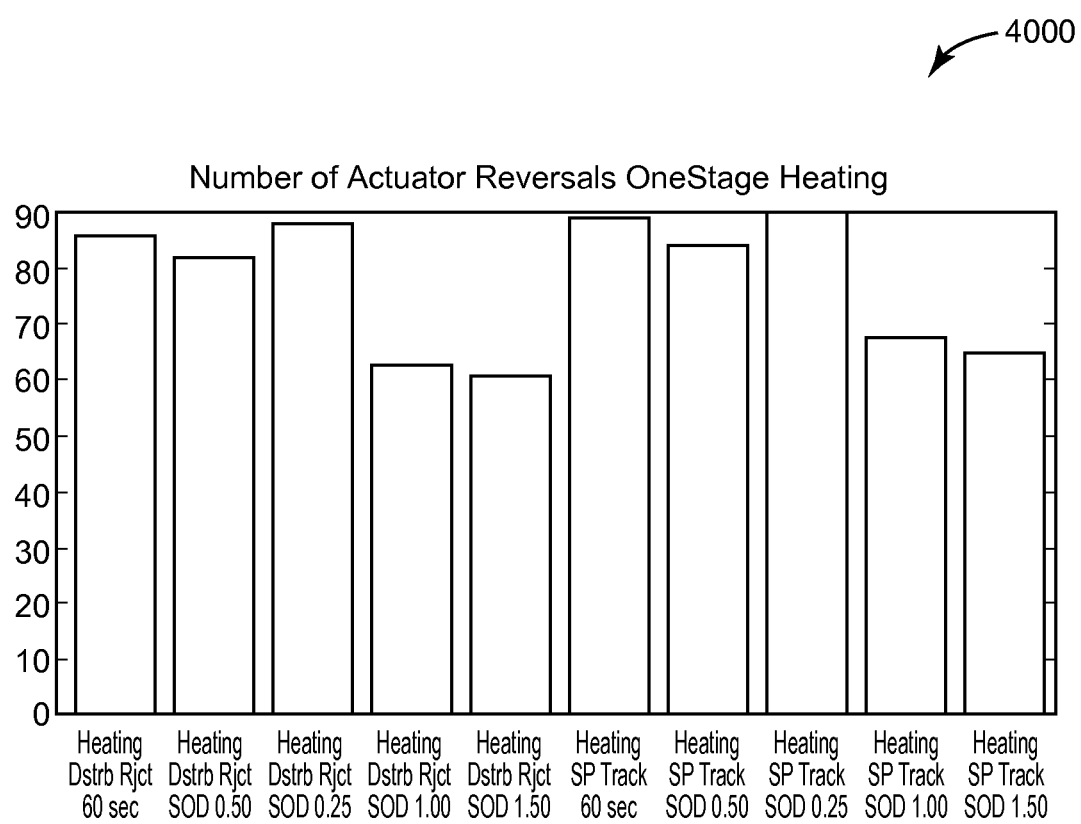
FIG. 40 is a graph illustrating a number of actuator reversals of the model of FIG. 24 for various data transmission methods used with one-stage heating, according to an exemplary embodiment.

Graph 3200 of FIG. 32 illustrates transmission times for proportional cooling. Graph 3300 of FIG. 33 illustrates transmission times for proportional heating. Graph 3400 of FIG. 34 illustrates transmission times for one-stage heating. Graph 3500 of FIG. 35 illustrates error for proportional cooling, graph 3600 of FIG. 36 illustrates error for proportional heating, while graph 3700 of FIG. 37 illustrates error for one-stage heating. Graph 3800 of FIG. 38 illustrates actuator effort for proportional cooling while graph 3900 of FIG. 39 illustrates actuator effort for proportional heating. Finally, graph 4000 of FIG. 40 illustrates actuator effort (e.g., number of reversals) for one-stage heating.

Graph 3200 illustrates that SOD with A=0.5 has an average transmission time of 15 minutes for a disturbance rejection test and 8 minutes for setpoint tracking when the system tested was a proportional cooling system. For proportional heating, graph 3300 illustrates an average transmission interval of 7 minutes for disturbance rejection testing and 5 minutes for setpoint tracking when the lead compensator was off and Δ=0.5. For the one-stage heating testing, graph 3400 illustrates an average transmission interval of about 6 minutes for disturbance rejection testing and setpoint tracking and a Δ=1.5.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A thermostat for transmitting data wirelessly to a controller in a building, the thermostat comprising:
   a temperature sensor configured to measure a current temperature value of the building;
   a wireless radio configured to transmit data from the thermostat to the controller; and
   a processing circuit configured to:
      receive a current measured temperature value of the building from the temperature sensor;
      determine a current temperature error based on the current measured temperature value and a setpoint temperature;
      transmit the current measured temperature value to the controller via the wireless radio in response to determining that both:
         a difference between the current temperature error and a previous temperature error is greater than an error threshold; and
         a length of time since the thermostat transmitted a temperature value to the controller is greater than a time threshold.

2. The thermostat of claim 1, wherein the processing circuit is configured to:
   determine whether a maximum amount of time has passed since transmitting the temperature value to the controller; and
   transmit the current measured temperature value to the controller via the wireless radio in response to determining that the maximum amount of time has passed.

3. The thermostat of claim 1, wherein the temperature value transmitted by the wireless radio is a filtered temperature value that is a filtered version of the current measured temperature value, wherein the processing circuit is configured to:
   determine the filtered temperature value by providing the current measured temperature value as an input to a deadband filter and calculating the filtered temperature value as a function of the current measured temperature value using one or more equations of the deadband filter; and
   transmit the filtered temperature value to the controller via the wireless radio.

4. The thermostat of claim 3, wherein the processing circuit is configured to determine the filtered temperature value based on the current measured temperature value and the deadband filter by:
   setting the filtered temperature value equal to the setpoint temperature in response to determining that the current measured temperature value is within a temperature band, wherein the temperature band comprises temperature values between the setpoint temperature plus half a deadband threshold and the setpoint temperature minus half the deadband threshold; and
   setting the filtered temperature value equal to a shifted temperature value in response to determining that the current measured temperature value is not within the temperature band.

5. The thermostat of claim 4, wherein the processing circuit is configured to determine the shifted temperature value by:
  subtracting half the deadband threshold from the current measured temperature value if the current measured temperature value is greater than a maximum of the temperature band; or
  adding half the deadband threshold to the current measured temperature value if the current measured temperature value is less than a minimum of the temperature band.

6. The thermostat of claim 1, wherein the processing circuit is configured to:
  cause the wireless radio to operate in an operating power mode in response to determining that the current measured temperature value should be sent to the controller; and
  cause the wireless radio to operate in a low power mode after transmitting the current measured temperature value to the controller.

7. The thermostat of claim 1, wherein the processing circuit is configured to:
  filter the current measured temperature value with a deadband filter by providing the current measured temperature value as an input to the deadband filter and calculating a filtered current measured temperature value as a function of the current measured temperature value using one or more equations of the deadband filter;
  use the filtered current measured temperature value to:
    determine a filtered current temperature error based on the filtered current measured temperature value and the setpoint temperature; and
    determine whether a difference between the filtered current temperature error and a previous filtered temperature error is greater than the error threshold; and
  transmit the filtered current measured temperature value to the controller via the wireless radio in response to determining that both:
    the difference between the filtered current temperature error and the previous filtered temperature error is greater than the error threshold; and
    the length of time since the thermostat transmitted the temperature value to the controller.

8. A method for efficiently transmitting data wirelessly to a controller in a building, the method comprising:
  receiving, by a thermostat, a current measured temperature value of the building from a temperature sensor;
  determining, by the thermostat, a current temperature error based on the current measured temperature value and a setpoint temperature; and
  transmitting, by the thermostat, the current measured temperature value to the controller via a wireless radio in response to determining, by the thermostat, that both:
    a difference between the current temperature error and a previous temperature error is greater than an error threshold; and
    a length of time since the thermostat transmitted a temperature value to the controller is greater than a time threshold.

9. The method of claim 8, the method further comprising:
  determining, by the thermostat, whether a maximum amount of time has passed since transmitting the temperature value to the controller; and
  transmitting the current measured temperature value to the controller via the wireless radio in response to determining that the maximum amount of time has passed.

10. The method of claim 8, the method further comprising:
  determining, by the thermostat, a filtered temperature value by providing the current measured temperature value as an input to a deadband filter and calculating the filtered temperature value as a function of the current measured temperature value using one or more equations of the deadband filter, wherein the temperature value transmitted by the wireless radio is the filtered temperature value that is a filtered version of the current measured temperature value; and
  transmitting, by the thermostat, the filtered temperature value to the controller via the wireless radio.

11. The method of claim 10, wherein determining, by the thermostat, the filtered temperature value based on the current measured temperature value and the deadband filter comprises:
  setting, by the thermostat, the filtered temperature value equal to the setpoint temperature in response to determining that the current measured temperature value is within a temperature band, wherein the temperature band comprises temperature values between the setpoint temperature plus half a deadband threshold and the setpoint temperature minus half the deadband threshold; and
  setting, by the thermostat, the filtered temperature value equal to a shifted temperature value in response to determining that the current measured temperature value is not within the temperature band.

12. The method of claim 11, wherein determining, by the thermostat, the shifted temperature value by:
  subtracting, by the thermostat, half the deadband threshold from the current measured temperature value if the current measured temperature value is greater than a maximum of the temperature band; or
  adding, by the thermostat, half the deadband threshold to the current measured temperature value if the current measured temperature value is less than a minimum of the temperature band.

13. The method of claim 8, the method further comprising:
  causing, by the thermostat, the wireless radio to operate in an operating power mode in response to determining that the current measured temperature value should be sent to the controller; and
  causing, by the thermostat, the wireless radio to operate in a low power mode after transmitting the current measured temperature value to the controller.

14. The method of claim 8, wherein the method further comprises:
  filtering, by the thermostat, the current measured temperature value with a deadband filter by providing the current measured temperature value as an input to the deadband filter and calculating a filtered current measured temperature value as a function of the current measured temperature value using one or more equations of the deadband filter;
  using, by the thermostat, the filtered current measured temperature value to:
    determine a filtered current temperature error based on the filtered current measured temperature value and the setpoint temperature;

determine whether a difference between the filtered current temperature error and a previous filtered temperature error is greater than the error threshold; and transmitting, by the thermostat, the filtered current measured temperature value to the controller via the wireless radio in response to determining, by the thermostat, that both:

the difference between the filtered current temperature error and the previous temperature error is greater than the error threshold; and a minimum amount of time has passed since transmitting the temperature value to the controller.

15. The method of claim 8, wherein the transmitted current measured temperature value is an unfiltered temperature value and the method further comprises:

filtering, by the controller, the unfiltered temperature value with a deadband filter by providing the unfiltered temperature value as an input to the deadband filter and calculating a filtered temperature value as a function of the unfiltered temperature value using one or more equations of the deadband filter; and controlling, by the controller, an HVAC device to affect a change in temperature of the building based on the filtered temperature value and a control method, wherein an execution time of the control method is longer than a rate at which a processing circuit of the thermostat receives a measured temperature of the building from the temperature sensor.

16. A system for transmitting data wirelessly in a building, the system comprising a thermostat and a controller, the thermostat comprising:

a temperature sensor configured to measure a current temperature value of the building;

a wireless radio configured to transmit data from the thermostat to the controller; and a processing circuit configured to:

receive a current measured temperature value of the building from the temperature sensor; and transmit the current temperature value to the controller via the wireless radio in response to determining that both:

a difference between a current temperature error and a previous temperature error is greater than a threshold;

a length of time since the thermostat transmitted a temperature value to the controller.

17. The system of claim 16, wherein the temperature value transmitted by the wireless radio is a filtered temperature value that is a filtered version of the current measured temperature value, wherein the processing circuit of the thermostat is configured to:

determine the filtered temperature value by providing the current measured temperature value as an input to a deadband filter and calculating the filtered temperature value as a function of the current measured temperature value using one or more equations of the deadband filter by:

setting the filtered temperature value equal to a setpoint temperature in response to determining that the current measured temperature value is within a temperature band, wherein the temperature band comprises temperature values between the setpoint temperature plus half a deadband threshold and the setpoint temperature minus half the deadband threshold; and setting the filtered temperature value equal to a shifted temperature value in response to determining that the current measured temperature value is not within the temperature band; and transmit the filtered temperature value to the controller via the wireless radio.

18. The system of claim 17, wherein the processing circuit of the thermostat is configured to determine the shifted temperature value by:

subtracting half the deadband threshold from the current measured temperature value if the current measured temperature value is greater than a maximum of the temperature band; or adding half the deadband threshold to the current measured temperature value if the current measured temperature value is less than a minimum of the temperature band.

19. The system of claim 16, wherein the processing circuit of the thermostat is configured to:

cause the wireless radio to operate in an operating power mode in response to determining that the current measured temperature value should be sent to the controller; and cause the wireless radio to operate in a low power mode after transmitting the current measured temperature value to the controller.

20. The thermostat of claim 16, wherein the transmitted current measured temperature value is an unfiltered temperature value and the controller comprises a processing circuit configured to:

filter the unfiltered temperature value with a deadband filter by providing the unfiltered temperature value as an input to the deadband filter and calculating a filtered temperature value as a function of the unfiltered temperature value using one or more equations of the deadband filter; and control an HVAC device to affect a change in temperature of the building based on the filtered temperature value and a control method, wherein a rate at which the control method executes is longer than a rate at which the processing circuit of the thermostat receives a measured temperature of the building from the temperature sensor.

21. A thermostat for transmitting data wirelessly to a controller in a building, the thermostat comprising:

a temperature sensor configured to measure a current temperature value of the building;

a wireless radio configured to transmit data from the thermostat to the controller; and a processing circuit configured to:

receive a current measured temperature value of the building from the temperature sensor;

determine a current temperature error based on the current measured temperature value and a setpoint temperature;

determine whether a difference between the current temperature error and a previous temperature error is greater than an error threshold;

determine whether a length of time since the thermostat transmitted a previous measured temperature value to the controller is greater than a time threshold;

determine a filtered measured temperature value based on the current measured temperature value and a deadband filter; and transmit the filtered measured temperature value to the controller via the wireless radio.

\* \* \* \* \*